United States Patent [19]
Bixby et al.

[11] Patent Number: 5,317,568
[45] Date of Patent: May 31, 1994

[54] METHOD AND APPARATUS FOR MANAGING AND FACILITATING COMMUNICATIONS IN A DISTRIBUTED HETERGENEOUS NETWORK

[75] Inventors: Joy P. Bixby, Castle Rock, Colo.; Michael C. Eorgoff, Glen Ellyn, Ill.; Bruce N. Gagne; Richard D. Houser, both of Littleton, Colo.; Mario J. Ivanoff, Denver, Colo.; Daniel W. Osband, Evergreen, Colo.; Darrel D. Richardson, Littleton, Colo.; Mary Z. Skaates, Englewood, Colo.

[73] Assignee: Galileo International Partnership, Rosemount, Ill.

[21] Appl. No.: 685,073

[22] Filed: Apr. 11, 1991

[51] Int. Cl.$^5$ .......................................... H04L 12/48
[52] U.S. Cl. .................... 370/85.6; 370/85.13
[58] Field of Search .............. 370/85.6, 60, 54, 94.1, 370/85.13, 85.14; 340/825.5, 825.51

[56] References Cited

U.S. PATENT DOCUMENTS

| | | | |
|---|---|---|---|
| 4,706,081 | 11/1987 | Hart et al. | 340/825.03 |
| 4,736,369 | 4/1988 | Barzilai et al. | 370/82 |
| 4,811,337 | 3/1989 | Hart | 370/85.13 |
| 4,893,307 | 1/1990 | McKay et al. | 370/94.1 |
| 5,016,248 | 5/1991 | Kudoh | 370/85.6 |
| 5,058,110 | 10/1991 | Beach et al. | 370/85.6 |
| 5,107,492 | 4/1992 | Roux et al. | 370/85.6 |
| 5,163,042 | 11/1992 | Ochiai | 370/54 |

FOREIGN PATENT DOCUMENTS

WO90/06027 5/1990 European Pat. Off. .

OTHER PUBLICATIONS

IBM Publication No. SC23-0759-O, "Document Interchange Architecture: Concepts and Structure," Jun. 1983.
IBM Publication No. SC23-0763-0, "Document Interchange Architecture: Transaction Programmer's Guide," Jun. 1983.
IBM Publication No. GG24-1584-0, "An Introduction to Advanced Program-To-Program Communication (APPC)," Jul. 1983.
IBM Publication No. GC30-0384-1, "Systems Network Architecture-Transaction Programmer's Reference Manual for LU Type 6.2," May 1983.
*IBM Systems Journal*, vol. 22, No. 4, 1983, pp. 296-343.
ISO/IEC JTC 1 DIS 9595, "Information Processing Systems-Open Systems Interconnection-Management Information Service Definition-Part 2: Common Management Information Service," Dec. 1988.

(List continued on next page.)

*Primary Examiner*—Douglas W. Olms
*Assistant Examiner*—Min Jung
*Attorney, Agent, or Firm*—Arnold, White & Durkee

[57] ABSTRACT

A data communication method and apparatus is presented that allows communication in a distributed heterogeneous network. Communications managers reside in local processing environments and are responsible for interfacing local end users with the remainder of the heterogeneous network. Each communications manager receives distribution units from end users, the distribution units being assigned various priority levels and levels of assurance. Within each communications manager, an adjacent communications manager is determined in accordance with a communications path to a destination for the distribution unit. The distribution unit is then configured according to a network protocol stack existing between the communications manager and the adjacent communications manager, and the distribution units are transmitted according to priority. Each communications manager can have any number of adjacent communications managers each communicating through different network protocol stacks. Also described is load distribution among a complex of processors that share common functions, as well as control of information flow between adjacent communications managers.

20 Claims, 21 Drawing Sheets

OTHER PUBLICATIONS

ISO/IEC JTC 1 DIS 9595 PDAD 1, "Information Processing Systems-Open Systems Interconnection--Common Management Information Service-Proposed Draft Addendum 1: Cancel Get Service," May 1989.

ISO/IEC JTC 1 DIS 9595 PDAD 2, "Information Processing Systems-Open Systems Interconnection--Common Management Information Service-Proposed Draft Addendum 2: Add/Remove Service," May 1989.

ISO/IEC JTC 1 DIS 9072-1.2, "Information Processing Systems-Text Communication-Remote Operations-Part 1: Model, Notation and Service Definition," Aug. 1989.

ISO/IEC JTC 1 DIS 9072-2.2, "Information Processing Systems-Text Communication-Remote Operations—Part 2: Protocol Specification," Aug. 1989.

ISO/IEC JTC 1 ISO 8824 with DAD 1, "Information Processing Systems—Open Systems Interconnection—Specification of Abstract Syntax Notation One (ASN.1)," 1987.

"Communications Manager Design Standard Version 1.0," Sep. 1984.

"Communications Manager Design Standard Version 1.4," Apr. 1, 1987.

Klerer, S. M., "The OSI Management Architecture: an Overview" pp. 20–29, *IEEE Network*, 2(2):20–29, Mar. 1988, published in U.S.A.

Sugarbroad; I., "An OSI-Based Interoperability Architecture for Managing Hybrid Networks." *IEEE Network*, 28(3):61–69, Mar. 1990, published in U.S.A.

| EU "A" | CM "A" | NETWORK | CM "B" | EU "B" |
|---|---|---|---|---|
| Wait | Receive/Wait | | Receive/Wait ◄---- | Pass DU to the ORIGIN-CM B |
| | | | Format DU into CMIUs | |
| | Receive ◄------------ CMIUs from ORIGIN-CM B | ----------- Send | CMIUs to DEST-CM A | |
| | Format CMIUs into DU | | Receive/Wait | |
| ◄--- | Pass DU to the DEST-EU A | | | |
| | Receive/Wait | | | |

Fig. 14

| ORIGIN EU | ORIGIN CM | DESTINATION CM | DESTINATION EU |
|---|---|---|---|

SEND DU
------▶

Format CMIU for Segment 1
        DELIVER-DISTRIBUTION
                        ------▶

Assemble CMIU 1

Format CMIU for Segment 2
        DELIVER-DISTRIBUTION
                        ------▶

Assemble CMIU 2

Assemble DU
                                                                       ---------▶

DELIVER-RESPONSE (COD)
                                                                  ◀----------

Notify EU
        ◀--------

Fig. 15A

| ORIGIN EU | ORIGIN CM | DESTINATION CM | DESTINATION EU |
|---|---|---|---|

SEND DU
------▶

DELIVER-DISTRIBUTION
                      ------▶

Assemble CMIU-Error-Unknown EU

DELIVER-RESPONSE (EX)
                                ◀----------

Notify EU
        ◀--------

Fig. 15B

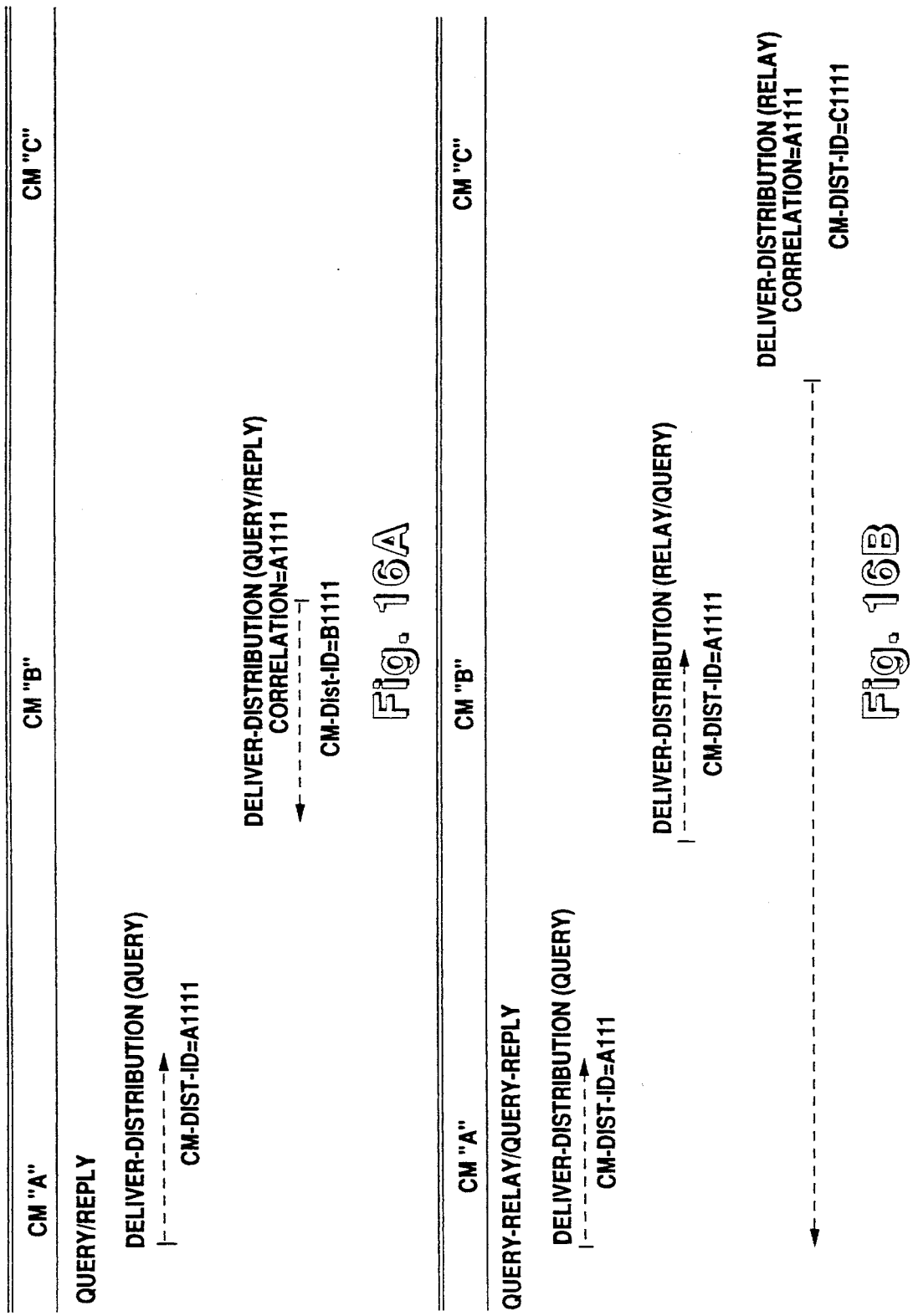

000012 08 00000A 00000B 00000C 00000D 00000E 00000F 000010 000011
— CM Complex Members (CMs 0A thru 11)
— Number of CMs In Complex
Virtual CM Number (CM 12)
00010005000200070001020304050607.....01020304050607
— Load Distribution Value Index Table (256 bytes long)
Fig. 17
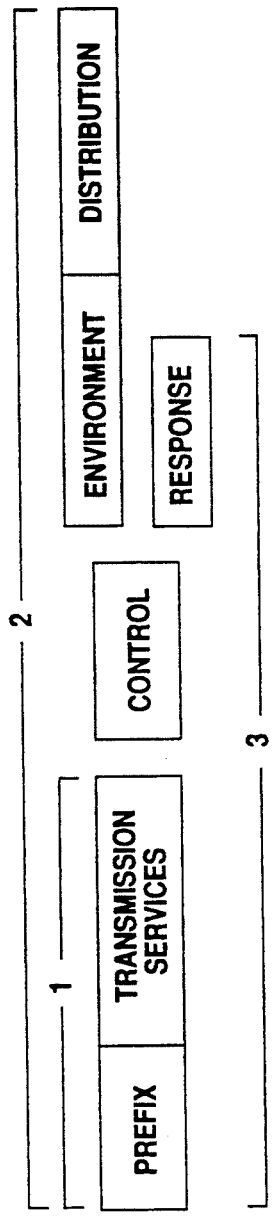
Fig. 18
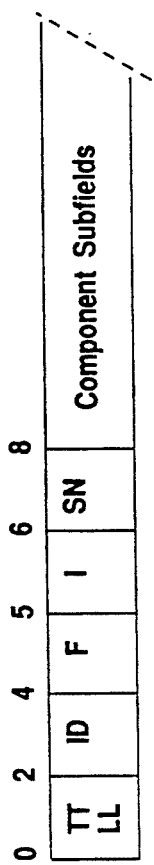
Fig. 19
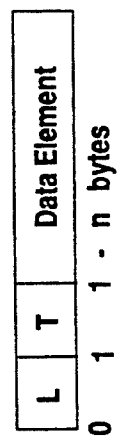
Fig. 20

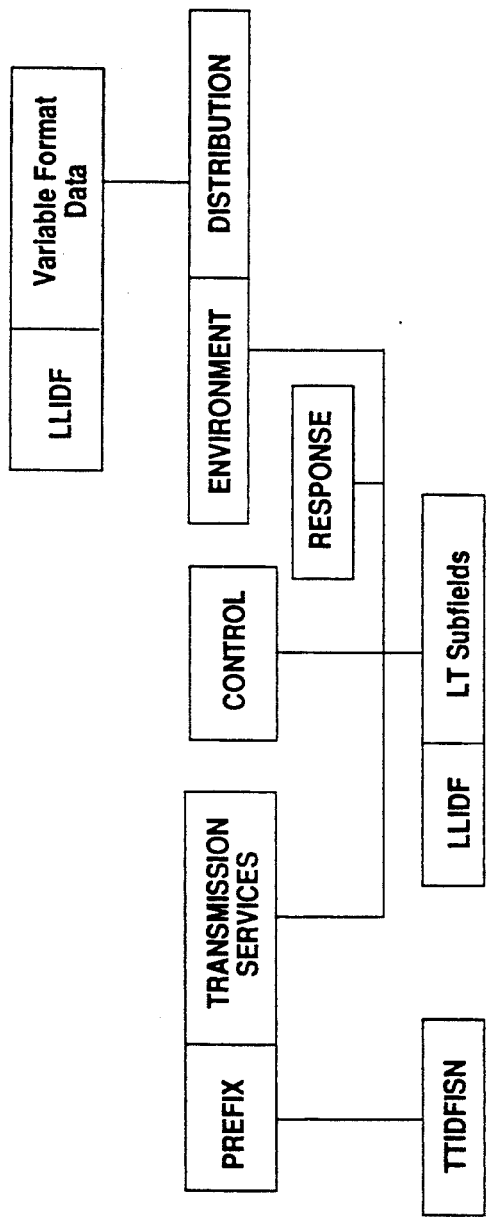
Fig. 21
Fig. 23
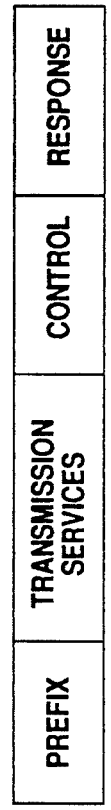
Fig. 24
Fig. 22

METHOD AND APPARATUS FOR MANAGING AND FACILITATING COMMUNICATIONS IN A DISTRIBUTED HETERGENEOUS NETWORK

BACKGROUND OF THE INVENTION

The invention relates to a method and apparatus for managing and facilitating communications in a distributed heterogeneous network.

Information system planners are faced with a wealth of new technology including powerful processes at every level of the system. Such processes include, for example, desktop systems, main frame systems, cooperative processing, graphical user interfaces, distributed data bases and so-called "open" operating systems, which are just a few of the technological advances that promise to propel computing even more fully into the daily activities of people in organizations. The proliferation of communication networks to connect these processes over the past several years has increased the potential for users of the information systems to share information.

Such computer networking resulted in gains in productivity and efficiency, and networked computer systems provide access to a vast information repository. Every major hardware and software vendor in the world has created networked platforms and applications. With such proliferation, connecting these disparate communication networks and operating platforms so that they can cooperate and interoperate to allow information in physically separate networks to be integrated seamlessly has been a problem.

Corporations are moving rapidly toward implementing large scale strategic computing systems that integrate all components of an enterprise. These complex computer systems will be based on networks capable of supporting large numbers of personal computers, file servers, and multiple links to disparate main frame systems. Data and processing will be distributed throughout the network in cooperative processing applications. In addition, such distributive cooperative processing will allow enterprises to keep pace with rapid technological change while protecting past investment in information structure. Enterprise connectivity, transparent seamless data transfer, and increased transaction processing are just some of the growing requirements facing modern enterprises.

In conjunction with the increased demand for distributed environments, there has been an increase in on-line transaction processing. With the advent of high performance hardware and improved operating systems, on-line, mission critical applications are being developed and implemented outside of the main frame environment. It has been projected by the Vertical Systems Group that local area network originated messages across Wide Area Network Systems will increase in size 690% (21K to 145K) by 1994 with a corresponding 30% reduction in transport time (1.5 seconds to 1.05 seconds).

In addition to these factors, there is an increasing requirement for interoperability among various vendor hardware platforms and across unlike networks. The desire for vendor independence without the associated costs (both in development and productivity), is driving the support of open systems and common communication interfaces.

In a traditional environment, applications are forced to perform the activities that are not only germane to the business needs, but also to the communications network needs. If an application were viewed as a column with the user interface at the top of the column, the interface development at the bottom of the column becomes a customization process specific to the communications network environment. This customization inhibits the movement of the application to other environments, and it limits change to the communications network or operating environment without impact to the application. Typically, this impact is two-fold, first the cost of the application rewrite, and second, the cost of supporting two applications performing the same tasks during cut-over. For a single platform change in a reasonably-sized environment, hundreds of applications may be affected, significantly impacting development and computing resources.

In order to avoid such customization of application, it would be desirable to have a standard communications network interface independent of the different types of communications networks used in the system.

SUMMARY OF THE INVENTION

The present invention solves the above-noted problems by providing an enterprise-wide virtual communications network with seamless access to applications across multiple communication networks. The present invention normalizes the application interface to the communications network, thus relieving the application of performing network-type services, allowing the application developer to concentrate on the business need and contributing to making the application portable across multiple environments which utilize the standard interface.

The present invention can be made to work with all major communications network architectures worldwide. With the present invention, the benefits of standard application interfaces, application portability, and virtual communication networks, can be applied on a global basis, across any number of disparate systems and architectures with end-to-end network management capability being provided, independent of the underlying networks.

The present invention normalizes application interaction with communications channels through a simplified three-verb interface: SEND, RECEIVE and STATUS. This allows applications to interact with a single communications interface, regardless of the number of underlying communications networks that exist. In addition, selectable levels of assurance and selectable levels of message priority are provided.

Also according to the present invention, virtual addresses for computing complexes can be created, and these virtual addresses can then be resolved to a physical address by an intermediate network node. This provides a simple, yet effective enterprise-wide scheme for resource management from within each complex. The present invention also provides priority queuing, message correlation, message segmentation and message reassembly.

These features, and others that will become apparent with reference to the following detailed description, provide several distinct benefits. First, the interface to applications is normalized across all environments. The application is not required to compensate for the existing network services, but instead only needs to interact with the SEND, RECEIVE and STATUS primitives. The primitives offer parameters for functional customization of the individual communications managers dependent upon the user needs, but this does not disrupt the applications in any way.

In addition, the present invention provides seamless, cross-system access to any user application on the network, and an end user application is no longer required to know where data and applications reside. The protocol interface function of the present invention handles the multi-system access specifics.

Further, because of the ability of the present invention to work across the major communications networks existing worldwide, it can be ported to any number of platforms, regardless of their individual communication traits. This portability of the present invention allows the benefits of the present invention to be applied to a system or systems of any size.

More particularly, the present invention includes a method and apparatus for communicating between communications managers of a distributed heterogeneous network. Within the network, at least one of the communications managers operates on an operating platform which is different from the operating platforms of other communications managers in the heterogeneous network.

To each communications manager are connected a number of end users including privileged end users and non-privileged end users. The privileged end users typically perform system management functions and communicate through the heterogeneous network by use of system management distribution units, whereas non-privileged end users typically transfer information or data distribution units between one another.

When sending distribution units, an origin end user transfers the distribution unit to an origin communications manager along with a priority designation for the distribution unit and an indication of the destination end user that is to receive the distribution unit. The priority designations available to privileged end users for application to distribution units include all of those available to non-privileged end users and additional designations of higher priority.

For each distribution unit, the communications manager determines an adjacent communications manager along a communication path within the heterogeneous network from the origin end user to the destination end user. After determining the adjacent communications manager, the distribution unit is configured according to the conventions of a network protocol stack existing between the two communications managers.

The distribution units are then transmitted from the origin communications manager to the adjacent communications manager with system management distribution units typically being transmitted before any data or information distribution units.

Within the adjacent communications manager, it is determined whether the destination end user is connected to the adjacent communications manager. This can be performed by comparing the identity of the destination communications manager with the identity of the adjacent communications manager.

If it is determined that the destination end user is connected to the adjacent communications manager, the distribution unit is forwarded to that destination end user. If, on the other hand, it is determined that the destination communications manager is not the adjacent communications manager, the adjacent communications manager determines a next adjacent communications manager along the path to the destination end user, and configures the distribution unit according to the conventions of a network protocol stack existing between the adjacent communications manager and the next adjacent communications manager. This procedure is repeated until the distribution unit arrives at the end user.

Within each communications manager there exists a management information base which includes system management information including, for example, tables used to assess the identity of adjacent communications managers, indicators of local resource usage, and the like. The management information base of each communications manager can only be modified by privileged end users either locally or through system management distribution units transmitted from remotely located privileged end users.

The present invention also contemplates load distribution among information processors that share common functions, for example, data base searching functions. Thus, the information processors which are distributed throughout the heterogeneous network can be collected into subsets or complexes of information processors when the information processors within a complex perform common functions. Each complex is assigned a load distribution record and is also assigned a virtual communications manager address.

Then, an origin end user which desires to use the functions common to the processors in a complex need only indicate the address of the virtual communications manager in distribution units being transmitted. Then, within one of the chain of communications managers between the origin information processor and the information processor which ultimately will perform the task, the virtual communications manager address is translated into an actual communications manager address by use of the information in a load distribution record corresponding to the complex of processors. Each load distribution record can be adjusted to reconfigure the distribution of processing load among processors in a complex. In addition, processors within a complex can themselves be grouped into subcomplexes, each with virtual communications manager addresses. In other words, a virtual communications manager address can either be resolved into an actual communications manager address, or into another virtual communications manager address.

The pacing of communications between adjacent communications managers is also contemplated by the present invention. To pace communications, pacing requests are formulated in a prior adjacent communications manager and appended to information packets being transmitted to a next adjacent communications manager. Those pacing requests typically include a request to increase the amount of information that can be transferred from the prior adjacent to next adjacent communications manager.

The prior adjacent communications manager then configures the information packet and pacing request in accordance with a convention of a network protocol stack existing between the prior adjacent and next adjacent communications managers. Pacing requests typically call for the increase in information flow from prior adjacent to next adjacent communications manager. The information packets with pacing requests are then transmitted from the prior adjacent to the next adjacent communications manager, and the next adjacent communications manager determines whether the request to increase transmission should be honored, or whether transmission should be reduced, based on availability of local resources. A pacing response is then formulated and configured according to the conventions of the network protocol stack existing between the next adjacent and prior adjacent communications manager, and the pacing response is transferred from next to prior adjacent communications manager over the network protocol stack.

If local resources are particularly scarce, the pacing response can indicate that the next adjacent communications manager refuses all communication from the prior adjacent communications manager, with the exception of the highest priority system management communications. In addition, since a particular communications manager can have a number of adjacent communications manager, a communications manager can apply different pacing restrictions on different adjacent communications managers, typically as a function of intensity of use of local resources by the adjacent communications managers.

The detailed features and functions of the present invention will be more clearly understood by those skilled in the art with reference to the drawings and detailed description.

BRIEF DESCRIPTION OF THE DRAWINGS

FIG. 14 shows synchronous traffic flow from one end user to another for a reply according to the present invention.

FIGS. 15A and 15B illustrate CM to CM protocol flow according to the present invention.

FIGS. 16A and 16B show query-reply and query-relay/query-reply correlation flow according to the present invention.

FIG. 17 is an example of a Load Distribution Record (LDR) according to the present invention.

FIG. 18 is the format of a communications manager Interchange Unit (CMIU) according to the present invention.

FIG. 19 is a diagram of the CMIU component field introducer according to the present invention.

FIG. 20 is a diagram of the CMIU element subfield introducer according to the present invention.

FIG. 21 is a diagram of the CMIU fields and subfields according to the present invention.

FIGS. 22, 23 and 24 are diagrams of the CMIU Formats 1, 2 and 3 in accordance with the present invention.

DETAILED DESCRIPTION OF THE PREFERRED EMBODIMENT

A. DEFINITIONS

Figure 1:
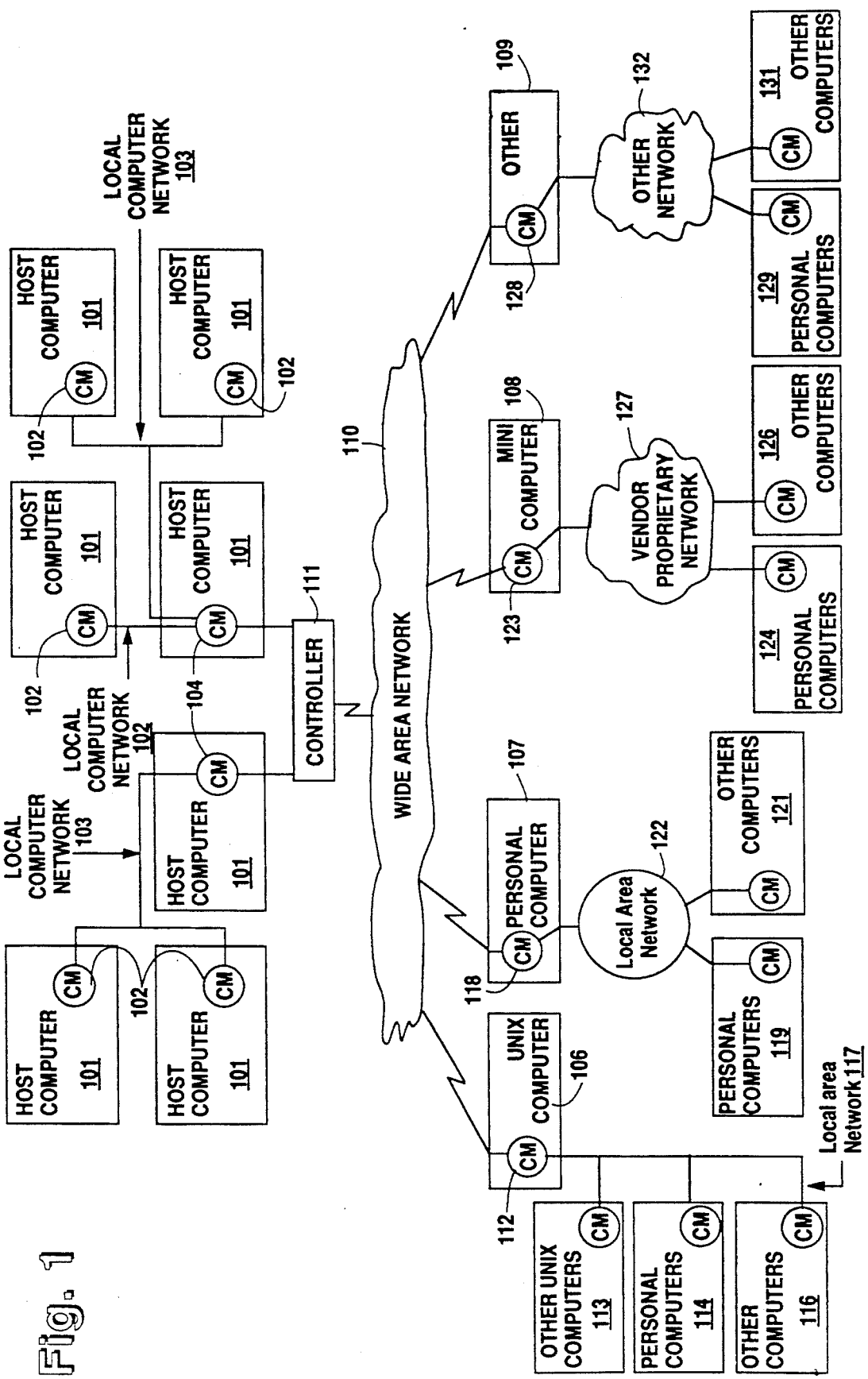
FIG. 1 is a distributed heterogeneous network embodying the communications manager of the present invention.

ACF/NCP—IBM's Advanced Communications Facility/Network Control Program
API—Application Program Interface
APPC—IBM's Advanced Program-to-Program Communications
AS—Application Services
CM—Communications Manager. An application level entity which manages the common Network Protocol Stack resource on behalf of the other applications in the invention. Communications between applications residing in separate physical systems are co-managed by the Communications Manager counterparts residing in the individual systems.
CM#—Communications Manager Number. A unique number assigned to each Communications Manager by which it is known by all other Communications Managers.

CMAPI—Communications Manager Applications Program Interface. The command boundary between the application and the Communications Manager.

CMIU—Communications Manager Interchange Unit. An envelope which the Communications Manager appends to a distribution or distribution segment.

DIA—IBM's Document Interchange Architecture

DU—Distribution Unit. Data which the End User has passed to the Communications Manager for delivery to a counterpart End User.

EU—End User. An applications program using the Communications Manager in order to communicate with a counterpart End User.

EU#—End User Number. A number assigned to each End User within the network.

GTID—Global Terminal ID

HLH—Host Link Handler

INET—Integrated Network

IRD—Intermediate Routing and Distribution Node

IWS—Intelligent Workstation

LAN—Local Area Network

LCN—Local Computer Network

LDR—Load Distribution Record

LU—Logical Unit within IBM's SNA

MIB—Management Information Base. CM operational data base containing routing information, CM local data elements and CM activity status.

MPIF—IBM's Multiprocessor Interconnect Facility

MVS—IBM's Multiple Virtual Storage

NPH—Network Protocol Header

NPS—Network Protocol Stack. Any set of network transport services which facilitates the ability of applications to communicate with other applications.

NPT—Network Protocol Trailer

PSAPI—Protocol Stack Applications Program Interface. The underlying transport mechanism interface utilized in Communications Manager network transfers.

SMAP—Systems Management Applications Program. The most significant privileged End User to be invoked in support of Communications Manager Management Command type functions. The SMAP is the single focal point through which to coordinate the management of the Communications Manager "Virtual Network" environment and resources.

SMAPI—Systems Management Applications Program Interface

SMDU—Systems Management Distribution Unit. A distribution which flows between partner SMAPs, and which is made up of a series of self-defining fields that may themselves be broken into self-defining subfields.

SNA—IBM's Systems Network Architecture

SSCP—System Services Control Point within IBM's SNA

TCP/IP—Transmission Control Protocol/Internet Protocol

TCU—Terminal Control Unit

TPF—IBM's Transaction Processing Facility

WANS—Wide Area Network Services

B. DESCRIPTION

1. Introduction

FIG. 1 illustrates, without reference to specific vendor products, a configuration of the Communications Manager of the present invention. It illustrates the Communications Manager as a connection facility for connecting any computing device to any other computing device on a peer-to-peer basis. FIG. 1 also illustrates that this connection can be carried over various communications networks. The only restriction to these connections being that two computing devices that are immediately adjacent, using the Communications Manager of the present "invention to communicate with each other, are required to use the same underlying network.

Referring to FIG. 1, host computers 101 using Communications Managers 102 communicate directly with other host computers 101 over an unspecified Local Computer Network 103. Host computers 101 using Communications Managers 104 communicate directly with each other and with computers with a Unix derivative operating system 106, personal computers 107, mini computers 108, and an unspecified computing device 109, each with their own Communications Managers, over an unspecified Wide Area Network 110 through controller 111.

Computer 106 with a Unix derivative operating system using Communications Manager 112, communicates directly with other computers 113 with Unix derivative operating systems, personal computers 114, and unspecified computing devices 116, each with their own Communications Managers, over an unspecified local area network 117 of bus technology.

Personal computer 107 using Communications Manager 118 communicates directly with other personal computers 119, and unspecified computing devices 121, each with their own Communications Managers, over an unspecified Local Area Network 122 of ring topology.

Minicomputer 108 uses Communications Manager 123 to communicate directly with personal computers 124 and unspecified computing devices 126, each with their own Communications Managers, over an unspecified vendor proprietary network 127.

An unspecified computing device 109 using Communications Manager 128 communicates directly with personal computers 129 and unspecified computing devices 131, each with their own Communications Managers, over an unspecified communications network 132.

Finally, FIG. 1 implicitly illustrates that any computer with a Communications Manager in accordance with the present invention can communicate with any other computer with a Communications Manager through the pass-through routing capabilities of the present invention. The various networks shown generically in FIG. 1 are illustrative of the networks with which the Communications Manager of the present invention can be used, and should not be construed to restrict the present invention to only those networks. The Communications Manager of the present invention can use any network that can pass data in octet format or that can simulate passing data in octet format.

Figure 2:
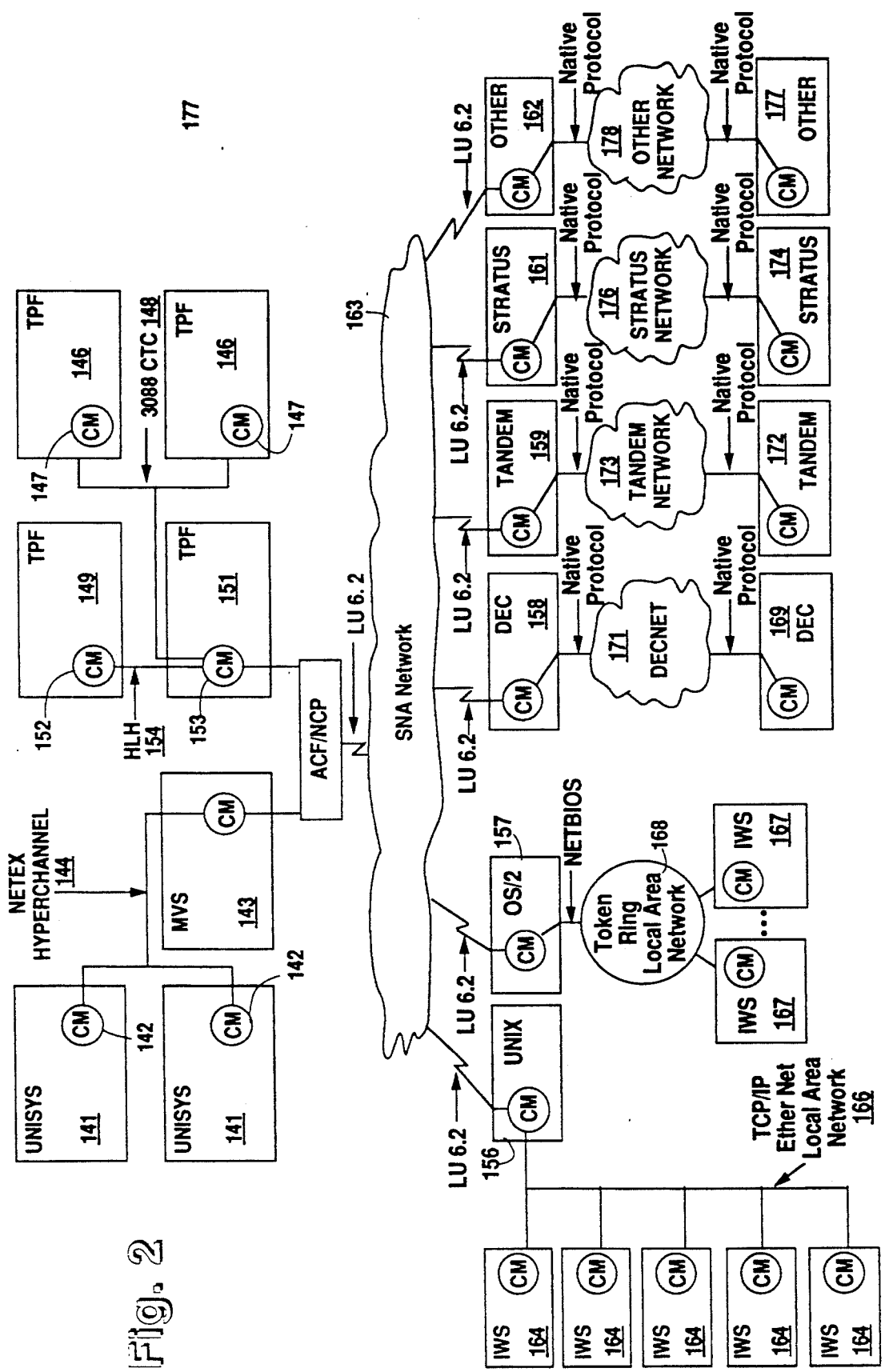
FIG. 2 is an exemplary configuration of vendor specific hardware and software embodying the communications manager of the present invention.

Referring now to FIG. 2, a more specific configuration of the Communications Manager of the present invention is presented with reference to specific vendor products. Specifically, with reference to FIG. 2, Unisys computers 141 using Communications Managers 142 communicate directly with each other and with computer 143 having IBM's MVS operating system over Netex Hyperchannel 144. Computers 146, having IBM's TPF operating system and using Communications Managers 147, communicate directly with each other over IBM's 3088 Channel-to-Channel communication facility 148. Computers 149, 151, operating with IBM's TPF operating system, using Communications Managers 152, 153, communicate directly with each other over Covia's HLH communication facility 154.

Computer 143, computer 151, Unix based computer 156, personal computer 157 using OS/2, DEC computer 158, Tandem computer 159, Stratus computer 161, and an unspecified computing device 162, each including a Communications Manager in accordance with the present invention, communicate directly with each other over IBM's LU6.2 SNA wide area network 163.

Unix based computer 156, and various personal computers 164 configured as intelligent work stations (IWS), each including a Communications Manager in accordance with the present invention, communicate over a TCP/IP Ethernet local area network 166.

Personal computer 157 using OS/2, and various personal computers 167 configured as intelligent workstations, each including a Communications Manager in accordance with the present invention, communicate over a NetBIOS Token Ring local area network 168.

DEC computers 158, 169, each using a Communications Manager in accordance with the present invention, communicate with each other over DECNET 171. Tandem computers 159, 172, each using a Communications Manager in accordance with the present invention, communicate with each other over a Tandem network 173. Stratus computers 161, 174, each using a Communications Manager in accordance with the present invention, communicate with each other over a Stratus network 176. Unspecified computing devices 162, 177, each using Communications Managers in accordance with the present invention, communicate with each other over an unspecified communications network 178.

FIG. 2 also illustrates that any computer with a Communications Manager in accordance with the present invention can communicate with any other computer with a Communications Manager through the pass-through routing capabilities of the present invention regardless of the manufacturer of those computers.

Figure 3:
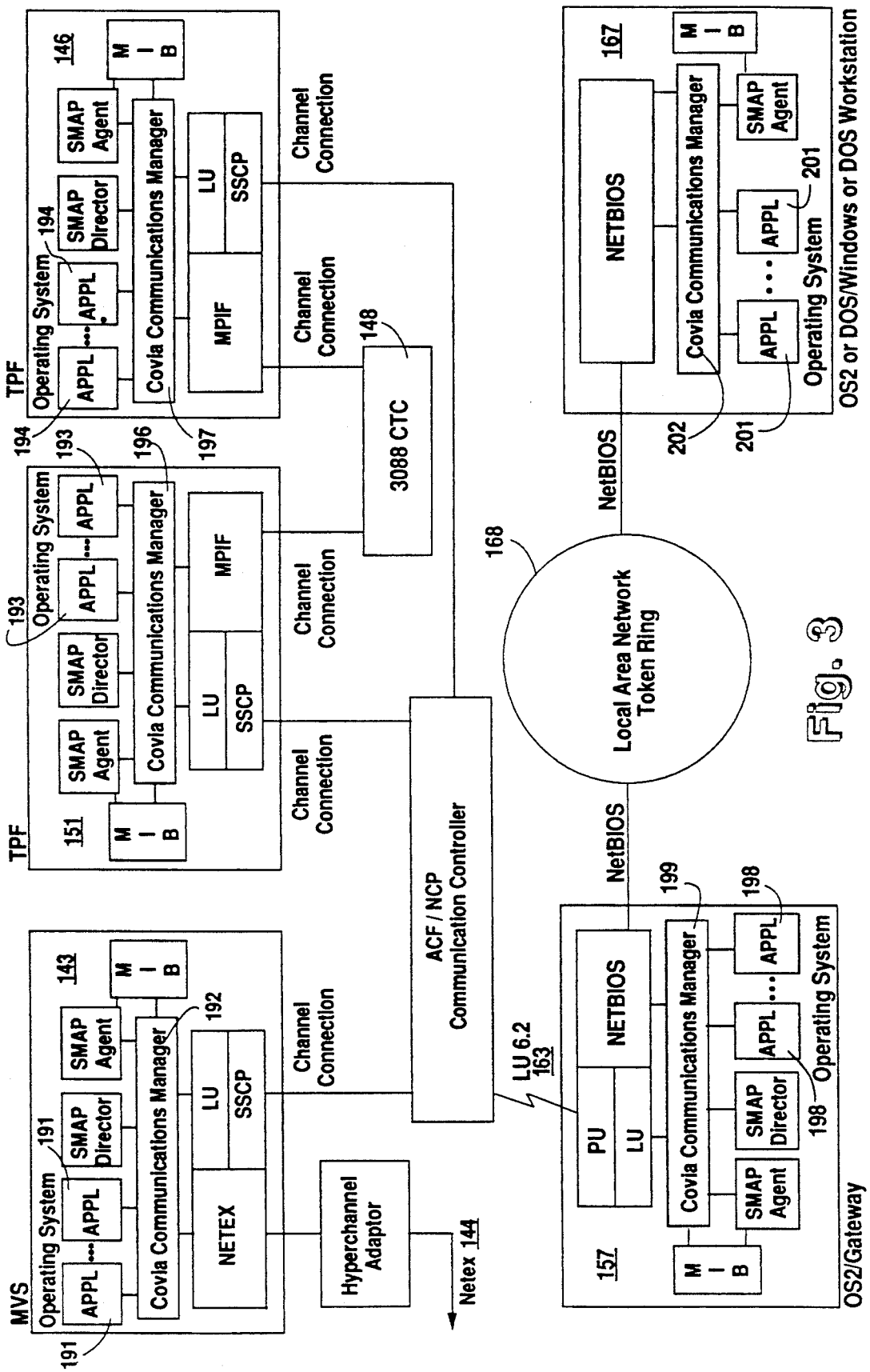
FIG. 3 is a more detailed exemplary configuration of hardware and software embodying the communications manager of the present invention.

FIG. 3 is a more detailed presentation of a portion of FIG. 2 showing various connection examples. In each case, the Communications Manager of the present invention is shown in its relationship to other software running in the computers.

In computer 143, individual applications 191 are shown connected to Communications Manager 192, and Communications Manager 192 is connected to network protocol stacks, Netex and LU6.2. In computers 151 and 146, individual applications 193 and 194 are shown connected to Communications Managers 196 and 197. Communications Managers 196 and 197 are connected to the network protocol stacks, MPIF and LU6.2. In computer 157, applications 198 are shown connected to Communications Manager 199, and Communications Manager 199 is connected to the network protocol stacks NetBIOS and LU6.2. Lastly, in computer 167, applications 201 are shown connected to Communications Manager 202, while Communications Manager 202 is connected to the NetBIOS network protocol stack.

Figure 4:
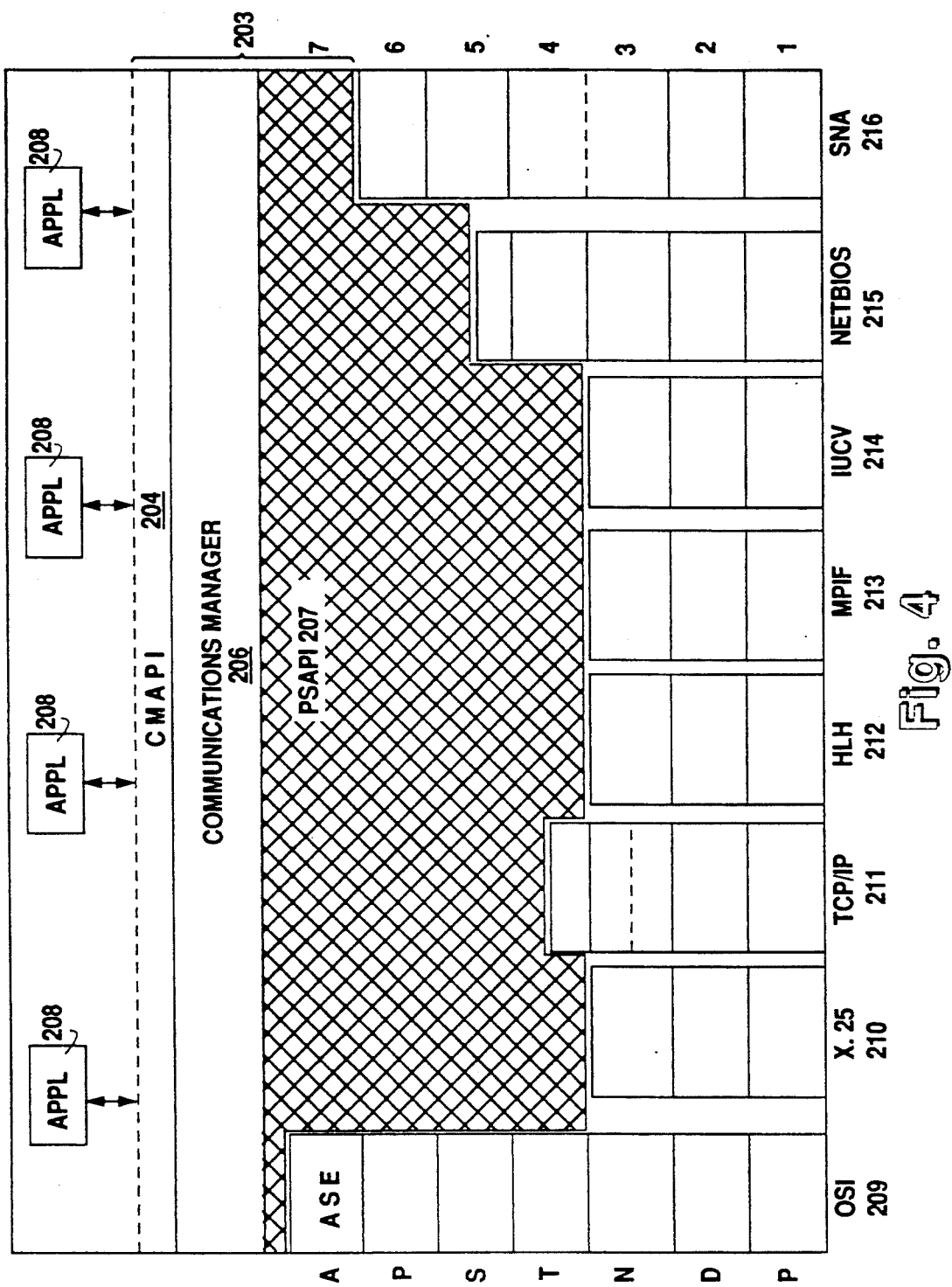
FIG. 4 illustrates the flexibility of the present invention to allow applications to communicate over various network transport services.

FIG. 4 illustrates in further detail the relationship of the Communications Manager of the present invention to other software components that reside within the same computer. In FIG. 4, Communications Manager 203 has been broken into three parts: the Communications Manager Application Program Interface (CMAPI) 204; the Communications Manager, proper, 206; and the Protocol Stack Application Program Interface (PSAPI) 207. Applications 208 are connected to Communications Manager 206 through CMAPI 204. All messages that applications 208 send to a peer application pass through Communications Manager 206 across CMAPI 204.

Communications Manager 206 is connected to the various network protocol stacks 209-216 through PSAPI 207. The listing of these specific network protocol stacks should be considered exemplary. All messages pass to network protocol stacks 209-216 through PSAPI 207 As described in more detail below, it is the responsibility of the PSAPI software to provide a generic interface for Communications Manager 206 to the various network protocol stacks 209-216, and to adapt to the differences among the network protocol stacks 209-216. FIG. 4 also illustrates that the Communications Manager of the present invention can use any underlying communications network.

For the purpose of this disclosure, the term network is used in the most expansive sense and can actually be comprised of various subnetworks, including, for example: an SNA network, Token Ring networks, Ethernet networks, Local Computer Networks (LCNs), and the like. According to the present invention, data exchange services and access to these networks is via a written Communications Manager software program(s) resident in each system.

Communications Manager implementations may support differing functional capabilities. Each implementation does not inhibit the ability of any Communications Manager to communicate with any other Communications Manager despite the fact some application services may not be supported. Communications Managers may reside at different types of nodes within the network. The type of node at which a Communications Manager may reside includes, for example, SNA Systems; Gateway Systems; Non-SNA Systems; LAN Gateways; LAN Based Intelligent Workstations; and Standalone Intermediate Routing and Distribution Nodes (IRDs, described in more detail below).

Figure 6:
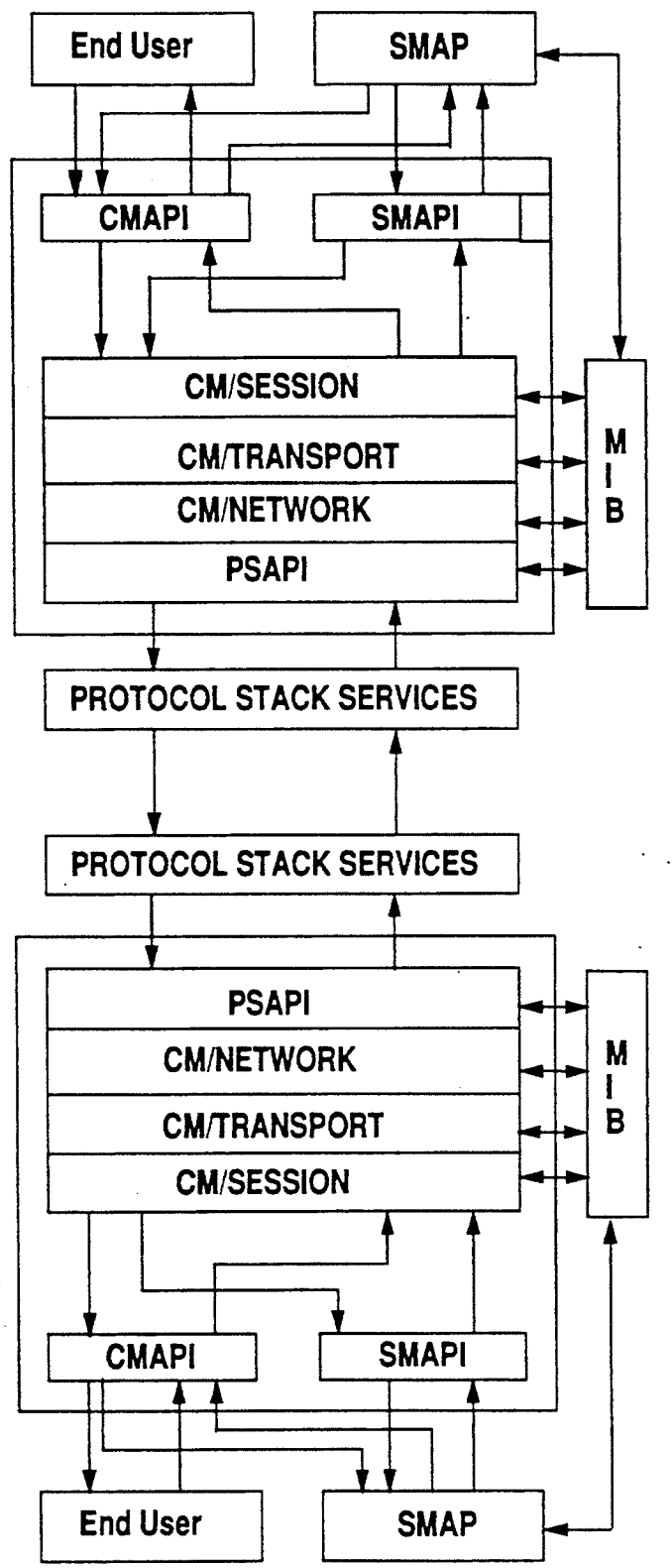
FIG. 6 is a schematic representation of the major functions of the communications manager of the present invention connecting end users to one another.

The Communications Manager of the present invention supports End User requirements not provided by the Network Protocol Stack and maintains a consistent, easy to use application program interface. In order to accomplish this, the Communications Manager resides between the services of the Network Protocol Stack and the End User. It functions as both a service providing program for the End User and as an application program to the Network Protocol Stack. In FIG. 6 (discussed in more detail below) the Layered Structure of the CM is represented as mediating between Local EUs and Remote EUs via the Network Protocol Stack or as providing a vehicle for Local EUs to communicate with other Local EUs within the same local environment.

2. The CM Reference Model 2.1. The EU-CM Relationship

The CM provides the ability to transport data across diverse networks transparently to applications (End Users, or EUs) on a peer-to-peer basis. It creates a virtual network that transcends the subnets and processor types that have and will continue to be coalesced into a single network view. Three components are necessary to accomplish this: 1) a user application (an EU) written to call the CM Applications Program Interface (CMAPI); 2) a Communications Manager; and 3) a Network Protocol Stack common to Adjacent CMs.

Figure 5:
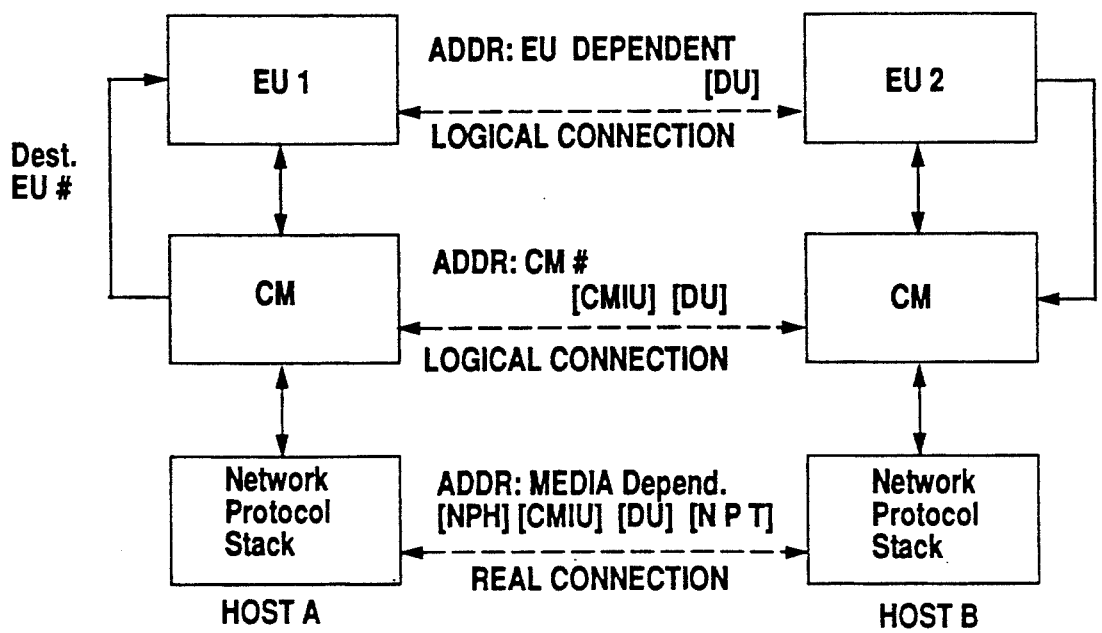
FIG. 5 is a block diagram illustrating the layering of the communications manager environment according to the present invention.

FIG. 5 illustrates the basic layering of these three distinct pieces. Data flows logically between each of the top two layers and their corresponding layers in an adjacent stack. Data flows physically between adjacent Network Protocol Stacks.

As depicted in FIG. 5, an EU flows data logically across the network to its counterpart EU and is completely unaware and unconcerned with the mode or mechanics of the layers below it. All communication between EUs is accomplished through the CM. Similarly, the CM logically interacts with a corresponding adjacent CM. All communication between CMs is accomplished through the Network Protocol Stack. Although the CM is aware of the API to the EU and to the Network Protocol Stack, it is, however, unaware of the function and structure of the layers above and below it.

The Network Protocol Stack accomplishes the actual data transfer using its own protocols and buffering schemes. Except for the initialization done by the CM to establish the protocol-to-protocol connections and subsequent error handling, the actual transfer of the CM data by the Network Protocol Stack is transparent to the CM itself.

At each layer below the EU (in FIG. 5), the Distribution Unit (DU) is simply data. Its structure and function is completely unknown and irrelevant to the CM and the Network Protocol Stack. The CM accepts a DU from the EU, segments it as necessary, envelopes the segmented data by converting it to a Communications Manager Interchange Unit (CMIU), and passes it to the Network Protocol Stack. In the Network Protocol Stack, the CMIU may be further segmented, it is enveloped as required by the protocol stack by a Network Protocol Header (NPH) and a Network Protocol Trailer (NPT), and sent out on the local communications media to the appropriate adjacent node. Incoming data from the Network Protocol Stack is stripped of its protocol envelope, reassembled if necessary, and a complete CMIU is presented to the CM. The CM will strip off the CMIU envelope, assemble the DU, and present it to the EU in the same form as it was presented to the originating CM.

As with all other aspects of the layered EU-CM-Protocol relationship, each layer through which the DU flows utilizes an addressing structure which is relevant only to that specific layer. For instance, addressing at the EU layer must be resolved by companion EUs through address information contained in the DU. This level of addressing could be of the nature of a Global Terminal ID (GTID).

For both the Network Protocol Stack and the CM the address will be part of the envelope put around the data. A fully qualified address at the CM layer is comprised of a unique CM number and an EU number (notated as a "CM.EU"), both of which are carried in the CMIU.

Addressing in the Network Protocol Stack is entirely dependent on the requirements of the communication protocol in question.

If one can think of the underlying Network Protocol Stack as being layered, that same concept can also be superimposed on the CM. It is important to keep in mind, that, as was mentioned above, the fundamental assumption regarding the CM is the existence of a complete, functioning Network Protocol Stack beneath it. Regardless of the protocol stack involved, it will be layered according to some type of conceptual scheme or another.

For the sake of conciseness and to facilitate conceptualization of CM functions, the CM has also been layered. It is conceptually divided into three layers. These are, from the lowest: the CM/Network Layer, the CM/Transport Layer, and the CM/Session Layer. In layers above the CM other components can be coupled to the CM, such as a data management EU, and a virtual terminal EU, that are users of the CM Virtual Network.

The names of the various CM layers are loosely analogous to the names of layers in other network models. However, the CM does not depend on the Network Protocol Stack to be layered in any particular fashion, only that it exists. It should not be assumed that any CM Layer incorporates the functionality provided within a similarly named layer in other network models.

Figure 7:
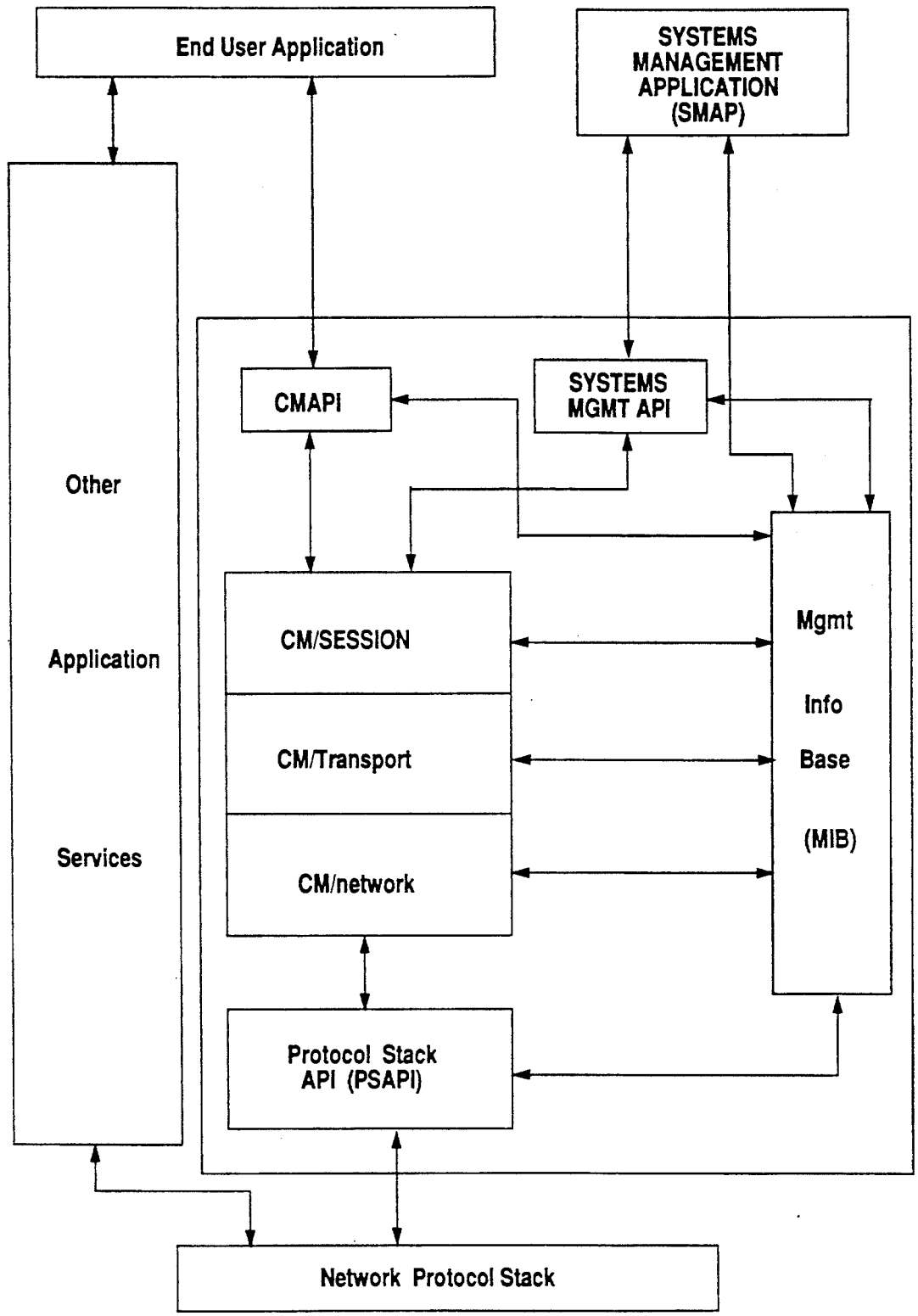
FIG. 7 is a more detailed schematic representation of the functions of the communications manager of the present invention.

FIGS. 6 and 7 illustrate the layered nature of the CM and its relationship to the underlying Network Protocol Stack and EUs. More will be said about the functionality of the various layers of the CM in the sections that follow. As can be seen in FIGS. 6 and 7, the CM resides at the application services layer in relationship to the Network Protocol Stack. The CM is not alone at this layer. Other services that can reside at this layer include, for example, CICS on an MVS mainframe or file redirection (PC LAN) on a LAN. The designer of an EU could choose, for instance, to utilize one or more of the non-CM application services to access local resources, and use the CM to gain access to some remote resource. If an application (EU) is written to only communicate within its local homogeneous network environment (e.g. device to device on a single LAN) there is no requirement to use the CM to accomplish this. The Application Services of the Network Protocol Stack specific to that local environment may be used. However, if the application (EU) must communicate with remote applications across heterogeneous Network Protocol Stacks then the facilities of the CM of the present invention must be used.

Figure 8:
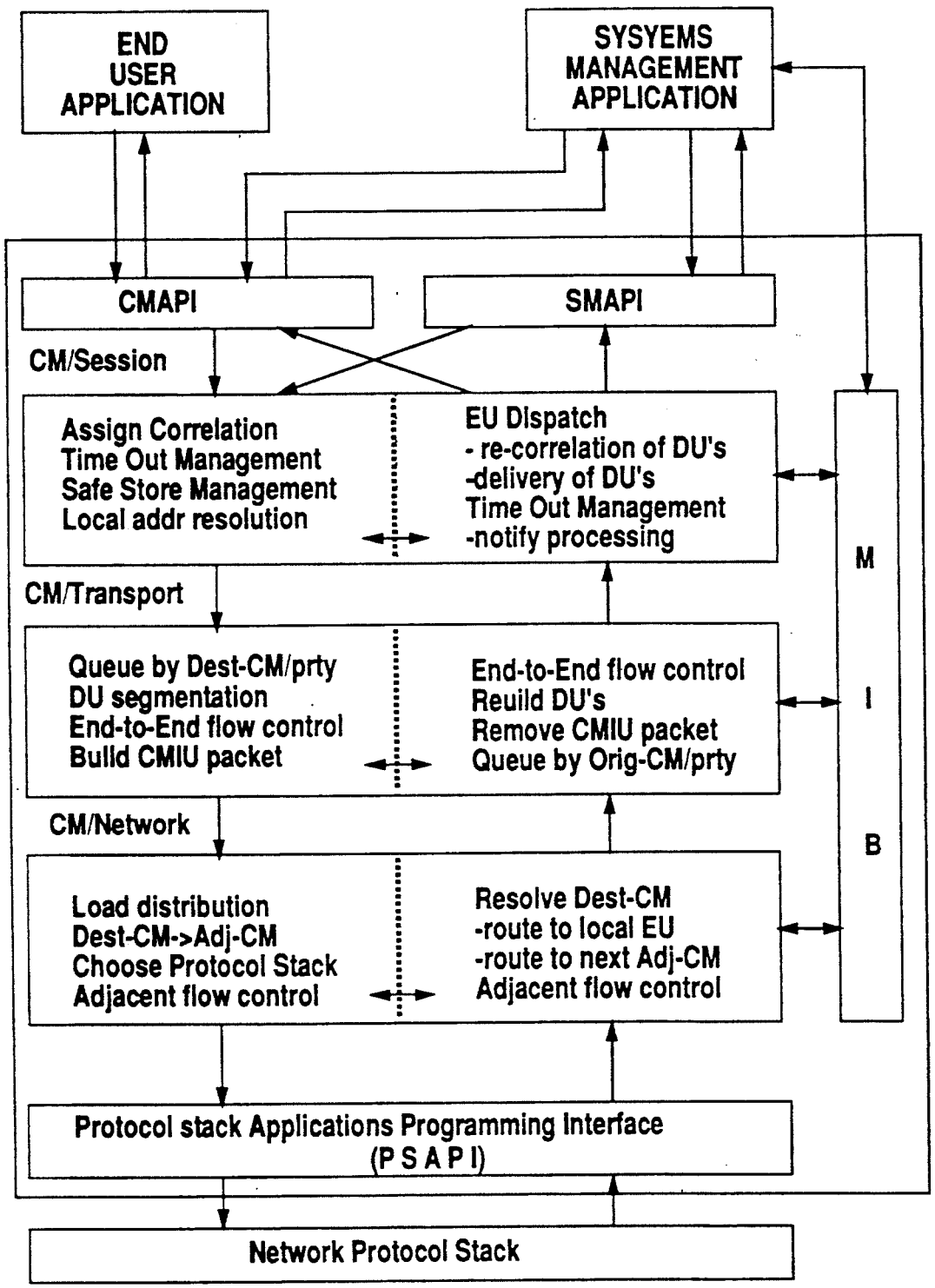
FIG. 8 is yet another detailed schematic representation of the functions of the communications manager of the present invention.

FIG. 8 provides a block diagram of the Communications Manager layers and their associated functions. The preceding portion of this section has outlined the EU to CM and the CM to Network Protocol Stack functional relationships. FIG. 8 depicts the internal CM functions and their relationships.

A CM performs services as requested by EUs in the exchange of distributions. In support of this process, the CM environment is controlled by a set of structured commands which are generated and interpreted by a "privileged EU" via a predefined methodology to execute CM Management Commands (described in more detail below), measure performance and handle error situations. FIG. 7 also depicts the relationships between the CM and its Management Elements.

CM Management functions are provided by a "privileged EU" known as the Systems Management Application Program (SMAP) which communicates with the CM via a "privileged" API known as the Systems Management Application Program Interface (SMAPI).

If any layer in the local CM identifies the need for the services of a CM Management Command type function (for example, the CM/Transport layer needs segment size for Distribution Unit transmission), the request is initiated from the CM/Layer via its linkages to the Management Information Base (MIB). The SMAP will either act upon this request immediately, or, if necessary, will build a Systems Management Distribution Unit (SMDU) and pass it to the SMAPI for forwarding to either a remote SMAP or a remote Privileged EU.

A CM Management Command from a remote SMAP arrives as a Systems Management Distribution Unit (SMDU), or SMDU segment, embedded within a CMIU and is sent directly up the CM Layers (e.g., CM/Network to CM/Transport to CM/Session to SMAPI) to the Local SMAP for processing.

Some of the types of activities which the SMAP may perform on behalf of the CM include, for example, Queue Monitor (Threshold Out-of-Service); Stop/Resume; Termination/Restart; Queue Status; CM Status; Routing Display; and Performance Statistics.

Other Privileged EUs may be required to communicate with the SMAP. These types of EUs may perform functions on behalf of the SMAP and may exist either locally or remotely. The methodology for Privileged EUs which exist remotely to communicate with the local SMAP does not differ from remote SMAPs which need to communicate with the local SMAP. That is, the remote Privileged EU will format an SMDU and pass it to its local SMAPI for forwarding to the remote SMAP.

In the event that the Privileged EU is required to communicate with a locally resident SMAP the methodology is slightly different. In this case the Privileged EU still builds an SMDU and passes it to the local SMAPI. However, when the routing for the SMDU is resolved within the CM proper, the particular SMDU in question is sent back up the CM Layers to the same SMAPI and then to the local SMAP.

The Communications Manager is composed of major functions as illustrated in FIG. 6. The functions described in FIG. 6 exist within the conceptual layers of the CM. More specific details of the functions contained within the layers are described in FIG. 8.

2.2. End Users

This section defines the term, End User (EU), along with the different types of End Users within the CM environment and highlights the differences between them.

An End user is any application that uses the services of the CM to communicate with a counterpart End User. Different types of End Users have been identified based upon their functionality and the method of interface with the CM. These types of EUs should be considered exemplary and not limiting.

2.2.1. Unique End User

A Unique End User is an application that uses CM transport services to exchange distributions with a counterpart End User. These End Users interface and request services of the CM through the standard CM Application Program Interface (CMAPI). CM Applications Services (CM/AS) when available. Unique End Users have a globally unique EU# assigned.

2.2.2. Functional End User

Equivalent end user services in different CM environments are performed by "Functional" End Users which interface with the CM through either the standard CM Application Program Interface (CMAPI) or through the "privileged" Systems Management API (SMAPI). Functional EUs which perform the same services have the same EU#.

2.2.3. Privileged End User

A "privileged" End User has the capability to execute functions on behalf of the CM. The Privileged EU (whether or not a "Functional" EU) interfaces with the CM via a "Privileged" API, the Systems Management Application Program Interface, (SMAPI).

2.2.4. Systems Management

A Systems Management Application Program (SMAP) is a "Privileged" and "Functional" EU and interfaces with the CM via the SMAPI. A SMAP has the ability to: 1) access a Table Server Application; 2) initiate/process SMAP to SMAP commands used to manage and control the CM and its environment; 3) process operational commands issued from a management console to manage and control the CM and its environment; and 4) process remote "Privileged" EU requests. Privileged EU functions include, for example, Configuration/Name, Accounting, Fault, Performance, Alert/Notification and Security management.

The SMAP has direct access to the Management Information Base (MIB) for interrogation and updating of the MIB contents. SMAPs and the CM Layers can communicate directly through MIB linkages thus avoiding going through the CM Layer Stack.

SMAPs exchange requests and responses in a predefined Systems Management Exchange Protocol which is carried in the Systems Management Distribution Unit (SMDU).

2.2.5 End User Linkages

Table 2.1 portrays the linkages between the various types of End Users and the two APIs used for accessing the CM.

TABLE 2.1

| COMPONENT | END USER LINKAGES LINKAGES |
|---|---|
| UNIQUE EU | CMAPI |
| FUNCTIONAL EU | CMAPI; and if also a Privileged EU, SMAPI |
| PRIVILEGED EU | SMAPI |
| SMAP | MIB, SMAPI |
| CMAPI | EU, CM/Session Layer |
| SMAPI | SMAP, CM/Session Layer, Privileged EU |

3. The CM to EU Interface 3.1. User Application Services

This section contains the definitions of the services provided to user application programs for exchange of DUs by the Communications Manager. The services are consistent within all implementations.

Communications Manager distributions are limited to application-to-application (program-to-program) data exchange. The origin and destination for the exchange are End Users, each having a unique identifier (name) within their local Communications Manager environment.

3.1.1. Assurance

There are two levels of DU Assurance against data loss.

The first is Full Assurance which protects the DUs against communication and system failures (except media failures such as a disk head crash). DUs are placed on safe store and are fully recoverable. Implementation specific internal timers and retry counts may limit the extent to which DU may be "fully" recoverable. Restricted to asynchronous DUs on priorities four (4) through seven (7) (see Section 3.1.4.4).

The second is Limited Assurance, with which a DU is protected against normal communications errors but may be lost in the event of repeated communication errors or a system failure.

3.1.2. Data Formats

The Communications Manager supports two data formats, character and binary. The binary data transfer provides bit level transparency (i.e., no special bit patterns-are prohibited within the data). This allows for the transmission of data in binary form regardless of the data content. Data is however restricted to multiples of full octets. No code translation is performed on binary data. The core image presented to the Communications Manager by the originating End User is presented to the destination End User.

The character data may contain the graphic characters. Code translation may be performed if the originating and destination End Users have different native codes.

Both formats may be transported in either mapped or unmapped data structures. Data identified as unmapped is assembled at the origin point into a single contiguous data string and delivered to the destination End User as contiguous data. Data identified as mapped is assembled from a logical set of data elements at the origin point into a single contiguous data string for transport, but is disassembled into the original logical data elements for presentation to the destination End User.

3.1 3. Delivery Notification

End Users may request one of three (3) levels of Distribution delivery notification. The notification may be returned to the originating End User or to another designated End User. They are:

3.1.3.1. CONFIRMATION OF DELIVERY (COD)-Restricted to Asynchronous Distributions With COD, the originating End User, or other specified End User, will receive positive notification of delivery, along with the original Distribution identification, after the Communications Manager has delivered the Distribution to the destination End User Application Program Interface.

A negative notification of the delivery will be provided along with the original Distribution identification if the Communications Manager is unable to deliver the Distribution to the destination End User application program interface.

3.1.3.2. EXCEPTION NOTIFICATION (EX-NOT)-Available for both Asynchronous Distributions and Query Distributions With EX-NOT, the originating End User, or other specified End User, will receive a negative notification of the delivery, along with the original Distribution identification, if the Communications Manager is unable to deliver the Distribution to the destination End User application program interface. No notification indicates a successful delivery.

3.1.3.3. No Notification—No Restrictions

The originating End User is not notified of the delivery status of the Distribution. If the Communications Manager is unable to deliver the Distribution to the destination CMAPI, the Distribution is handled according to the local conventions.

3.1.4. Distribution Types

3.1.4.1. ASYNCHRONOUS

Those distributions which do not require responses or which do not require the CM to correlate the associated responses on behalf of the EU may be originated as ASYNCHRONOUS Distributions by an EU. Although these Distributions flow in only one direction (e.g., from the Origin to the Destination), if the EU specifies either EXCEPTION NOTIFICATION or CONFIRMATION OF DELIVERY NOTIFICATION, any CM along the path of the Distribution must respond with the appropriate ERROR NOTIFICATIONS.

3.1.4.2. QUERY/REPLY

The Communications Manager will provide for the correlation of QUERY/REPLY Distributions. The End User originating a QUERY must designate the End User to receive the correlated REPLY from the destination End User. If a REPLY is not received within an End User specified time frame, the designated End User will receive a time out notification from the Communications Manager. The End User may specify LIMITED ASSURANCE with either NO DELIVERY NOTIFICATION or with EXCEPTION NOTIFICATION on QUERY Distributions. The Query/Reply data flow description is presented below in more detail in Section 10.

3.1.4.3. Relay/Query

Relay/Query allows an End User to relay a Query through any number of additional End User processes. The last processing EU returns the Reply directly to the End User designated in the original Query (bypassing the intermediate End User processes on the return path). A Relay/Query is exemplified by the following situation: A transaction is launched as a Query from End User "A" to End User "B". End User "B" cannot fully satisfy the transaction request and must relay the Query to End User "C" (using Relay/Query). End User "C" completes the transaction processing and returns a Reply to End User "A".

3.1.4.4. Priority Levels

The Communications Manager supports eight (8) priority levels, two (2) being reserved for Privileged EUs such as the SMAP, and six (6) for any End User. The highest non-privileged End User priority is restricted in size and assurance. Table 3.1 presents priority level detail information.

TABLE 3.1

| | CM PRIORITY LEVELS | | | |
| --- | --- | --- | --- | --- |
| Priority | Use | Size (bytes) | Segments (Allowed) | Assurance |
| 0 | Privileged Users | 100 | NO | Limited Only |
| 1 | Privileged Users | 1,800 | YES | Limited Only |
| 2 | User Priority | 4,000 | YES | Limited Only |
| 3 | User Priority | 32,000 | YES | Limited Only |
| 4 | User Priority | 32,000 | YES | Full or Limited |
| 5 | User Priority | 32,000 | YES | Full or Limited |
| 6 | User Priority | 32,000 | YES | Full or Limited |
| 7 | User Priority | 32,000 | YES | Full or Limited |

Maximum format 2 CMIU size is detailed in Section 13.

3.1.4.5. Sequencing

Delivery of the Distributions to a given destination End User and within a given priority, is in the same order which the originating End User presented the Distributions to the Communications Manager provided that 1) the destination End User does not reside in more than one physical location, 2) both originating and destination End Users reside within the same network environment, and 3) all Distributions are at the same assurance level.

3.1.4.6. Size

The Distributions; preferably have a maximum data size of 32,000 bytes, although other maximum sizes can be sued. An End User with the requirement to send/receive larger Distributions will be responsible for segmenting those Distributions into 32,000 byte or smaller segments (depending on priority) before handoff to the Communications Manager. Larger or smaller distributions are possible without departing from the invention.

3.1.4.7. Queuing

Distributions are queued within the originating End User's system by the Communications Manager. Queues are maintained by destination Communications Manager and priority. The Distributions are dequeued, segmented into CMIUs as needed and sent in priority order but are interruptible at CMIU boundaries by CMIUs of higher priority distributions. The form of queuing actually implemented will be dependent on the specific capabilities of the local environment.

3.1.4.8. Queue Status

The Communications Manager provides the End User with the ability to request status of Distributions and Distribution queues. Queues are ordered within the originating End User system by destination Communications Manager and priority only. Status requests, therefore, reflect only the local priority queue state for the destination Communications Manager as defined by End User destination mnemonic (see Section 3.2.1). Two types of status request are provided: Count with which the count supplied is a total count of all the Distributions on the specified End User destination priority queue; and Purge with which one or all of the requesting End User's Distributions on the designated End User destination priority queue are purged. Distributions can only be purged by the original enqueuing End User.

3.2. CM Application Program Interface (CMAPI)

This section contains the non-privileged Communications Manager Application Program Interface (CMAPI) commands and parameter values which End User applications may use to request services of the Communications Manager. The function of each command is explained and followed by a description of each operand. Optional operands are enclosed within brackets; required operands are shown without brackets.

The services provided the applications End Users will be the same in all systems. However, each implementation will adhere to the local system conventions under which the Communications Manager is to operate. Each implementation of the CM must therefore document how its applications program interface maps to the Communications Manager Applications Program Interface.

3.2.1. SEND

The SEND command, presented in Table 3.2 and described in more detail below, is used to request a Distribution of data from one application End User to another application End User.

TABLE 3.2

| CMAPI SEND COMMAND PARAMETERS | | | |
|---|---|---|---|
| Supplied parameters: | | | |
| SEND | TYPE | (QUERY, TIME-FRAME | ( XSHORT )) |
| | | | ( SHORT ) |
| | | | ( MEDIUM ) |
| | | | ( LONG ) |
| | | | ( XLONG ) |
| | | | ( VARIABLE ) |
| | | (REPLY, CM-DISTRIBUTION-ID (variable)) | |
| | | (RELAY-QUERY, CM-DISTRIBUTION-ID (variable)) | |
| | | (ASYNC) | |
| [ DATA (variable) ] | | | |
| LENGTH (variable) | | | |
| DESTINATION (variable) | | | |
| SOURCE (variable) | | | |

TABLE 3.2-continued

| CMAPI SEND COMMAND PARAMETERS | | | |
|---|---|---|---|
| [ RETURN (variable) ] | | | |
| DELIVERY NOTIFICATIONS | | ( COD ) | |
| | | ( EXCEPTION ) | |
| | | ( NONE ) | |
| ASSURANCE | ( LIMITED ) | | |
| | ( FULL ) | | |
| PRIORITY (variable) | | | |
| FORMAT | (BINARY | [ MAPPED ] | ]) |
| | | [ UNMAPPED ] | ] |
| | (CHARACTER, | [ MAPPED ] | ]) |
| | | [ UNMAPPED ] | ] |
| [ EU-DISTRIBUTION-ID (EU-DID) (variable) ] | | | |
| [ LOAD-DISTRIBUTION-VALUE (L-D-V) ] | | | |
| Returned parameters: | | | |
| RETURN-CODE (variable) | | | |
| CM-DISTRIBUTION-ID (variable) | | | |

SEND (Supplied Parameters):

TYPE specifies the type of Distribution.

QUERY specifies LIMITED Assurance with optional EXCEPTION NOTIFICATION and that the Distribution is an original request. The SOURCE-EU expects a REPLY from the DESTINATION-EU (or from another EU if the QUERY requires RELAY) within the specified TIME-FRAME. If a REPLY is not received within the specified TIME-FRAME the SOURCE-EU will receive a timeout notification from the local Communications Manager. The specific time frames are implementation dependent, however, there are presently six time frames allowed for:

XSHORT specifies the SOURCE-EU expects the REPLY within less than a couple of seconds.

SHORT specifies the SOURCE-EU expects the REPLY within a couple of seconds.

MEDIUM specifies the SOURCE-EU expects the REPLY within a matter of a few seconds.

LONG specifies the SOURCE-EU expects the REPLY within minutes.

XLONG specifies the SOURCE-EU expects the REPLY within more than minutes.

VARIABLE specifies the SOURCE-EU expects the REPLY within a user definable time period.

If an EXCEPTION-NOTIFICATION is received before the user defined timeout expires, the ORIGIN CM may retransmit (based on its own internal timer value and retry counts) as many times as desired before the time out expires or it may notify the ORIGIN EU that the distribution could not be delivered. Once the user time out expires, the ORIGIN EU must be notified that the distribution was not delivered. Any subsequently received EXCEPTION-NOTIFICATIONS or REPLIES to the QUERY will be discarded. Local system conventions will decide on statistical logging of these types of events.

REPLY specifies LIMITED Assurance with no DELIVERY NOTIFICATION and that the Distribution is a REPLY in response to a previous QUERY (or RELAY-QUERY). The CM-DISTRIBUTION-ID must be the same as the CM-DISTRIBUTION-ID received with the QUERY (or RELAY-QUERY) for the Communications Manager correlation of a REPLY to the original QUERY.

CM-DISTRIBUTION-ID is a variable containing the identification of the original QUERY Distribution as assigned by the Communications Manager of the originating End User.

RELAY-QUERY specifies LIMITED Assurance with no DELIVERY NOTIFICATION. RELAY-QUERY is used instead of REPLY when an End User determines that further processing must be accomplished (by another End User) before a REPLY may be returned to the End User identified by the original QUERY. A RELAY-QUERY is delivered to the SEND API with:

The CM-DISTRIBUTION-ID associated with the original QUERY;

A SOURCE as the currently processing End User;

A DESTINATION as the End User to continue the transaction processing;

A RETURN designating the End User to receive the REPLY as identified by the original QUERY (i.e., RETURN if present, else SOURCE).

The Communications Manager interprets the RELAY-QUERY at the SEND API, then formats and sends a CMIU to relay the query to the designated Destination End User. The environment associated with the original QUERY (or RELAY-QUERY), if any, is released.

ASYNC specifies the Distribution is an unsolicited Distribution and that the SOURCE-EU does not expect a REPLY from the DESTINATION-EU. The End User may specify any level of Assurance and Delivery Notification.

DATA specifies the variable containing the data to be distributed. An EU may optionally choose to issue a CM SEND without DATA. In the event there is no DATA there must be an EU-DISTRIBUTION-ID.

LENGTH specifies the variable containing the length in octets, of the data to be distributed. A length of zero indicates that there is no associated data. LENGTH is preferably less than or equal to 4,000 for PRIORITY 2, and must be less than or equal to 32,000 for priorities 3-7.

DESTINATION is a variable containing the locally known DESTINATION MNEMONIC of the targeted EU. The Communications Manager resolves this MNEMONIC to a DESTINATION ADDRESS in the form of a "CM.EU". The DESTINATION MNEMONIC is preferably limited to 1 to 8 octets.

SOURCE is a variable containing the identification of the End User requesting the SEND function at the Communications Manager API The SOURCE MNEMONIC is preferably limited to 1 to 8 octets.

RETURN is a variable containing the identification of the End User to receive the requested delivery notification or reply. The RETURN IDENTIFICATION is assumed to be the same as the SOURCE IDENTIFICATION unless this variable specifies otherwise. RETURN is a required parameter with a distribution TYPE of RELAY-QUERY. The DESTINATION is in the form of a DESTINATION MNEMONIC. The RETURN MNEMONIC is preferably limited to 1 to 8 octets.

DELIVERY-NOTIFICATION specifies the desired level of delivery notification. The delivery notification will be an asynchronous Distribution returned to the specified RETURN.

COD specifies that the RETURN is to get a positive notification when the Distribution is delivered to the DESTINATION application program interface. A negative notification will be delivered along with the original EU-DISTRIBUTION-ID if the Communications Manager is unable to deliver the Distribution at the DESTINATION applications program interface or if an Intermediate CM is unable to forward the Distribution. COD applies only to ASYNCHRONOUS Distributions.

EXCEPTION specifies the RETURN is to receive a negative notification along with the original EU-DISTRIBUTION-ID if the Distribution cannot be delivered to the DESTINATION application program interface or if an Intermediate CM is unable to forward the Distribution. No notification indicates a successful delivery. EXCEPTION applies only to QUERY or ASYNCHRONOUS Distributions.

NONE specifies the RETURN is not to be notified of the delivery status of the Distribution. If the Communications Manager is unable to deliver the Distribution to the DESTINATION-EU application program interface, local system conventions of the DESTINATION will apply.

ASSURANCE specifies the level of assurance the Distribution is to receive.

LIMITED specifies the Distribution is to receive protection against transient communications failures. However, it may be lost in the event of a system failure.

FULL specifies the Distribution is to receive protection against communications and system failures (except media failures such as a disk head crash). Individual implementations may choose to "time out" undeliverable Fully Protected distributions. In this case, the Origin CM will log the event using local system conventions. FULL can be used only on asynchronous Distributions with a PRIORITY of 4-7.

PRIORITY specifies the variable containing the priority the Distribution is to receive, and preferably has a value of 2 through 7. Priority 2 maximum LENGTH is preferably less than or equal to 4,000 bytes and ASSURANCE of LIMITED. Priority 3 maximum LENGTH is preferably less than or equal to 32,000 bytes and ASSURANCE of LIMITED. Priorities 4-7 maximum LENGTH is preferably less than or equal to 32,000 bytes and ASSURANCE of FULL or LIMITED.

FORMAT specifies the format of the data.

BINARY specifies the data is in binary form. No code translation will be performed. The Distribution is provided bit level transparency (i.e. no special bit patterns are prohibited within the data). Data must be in multiples of full octets.

MAPPED specifies the data comprises a logical set of data elements.

UNMAPPED specifies the data comprises a single logical sequence of data.

CHARACTER specifies the data is in graphic character form.

MAPPED specifies the data comprises a logical set of data elements

UNMAPPED specifies the data comprises a single logical sequence of data.

EU-DISTRIBUTION-ID is a variable containing information specific to a given Distribution as known by the originating End User. The EU-DISTRIBUTION-ID, if supplied, is delivered intact to the destination End User. The format of the EU-DISTRIBUTION-ID is assumed to be in the same format as the data (BINARY/CHARACTER). EU-DISTRIBUTION-ID preferably has a length of 1 to 44 octets with the first octet containing the size of the EU-DID inclusive of the first octet.

LOAD-DISTRIBUTION-VALUE, if supplied, is preferably a 1 octet field containing an offset into a Load Distribution Record (LDR) resident in an Intermediate Routing and Distribution (IRD) node. See sections 12 and 13.2 for additional information concerning the mechanics of Load Distribution.

SEND (Returned Parameters):

RETURN-CODE specifies the variable in which a return code is returned to the requesting application. The return code indicates the result of the command execution.

OK—Distribution accepted for delivery. When the RETURN-CODE is anything other than 'OK', the Distribution is not accepted for delivery. Error RETURN-CODES include: LENGTH error, DESTINATION error, SOURCE error, RETURN error, PRIORITY error, FORMAT error, and REPLY Correlation error.

CM-DISTRIBUTION-ID is a variable in which the identification of the Distribution as known by the local Communications Manager is returned. The CM-DISTRIBUTION-ID may be used by the End User in the STATUS command to identify the referenced Distribution. This CM-DISTRIBUTION-ID is used by the Communications Manager to correlate REPLY's, COD, and EXCEPTION Notifications to their originating End User. CM-DISTRIBUTION-ID preferably have length of 1 to 16 octets.

3.2.2. RECEIVE

The RECEIVE command, presented in Table 3.3, and discussed in more detail below, is a request for Distributions from the Communications Manager. End Users may or may not actually execute the command, however each implementation will make provisions for delivering the Returned parameters to the End User. Distributions will be delivered on a first in first out basis, unless a specific distribution is requested.

TABLE 3.3

| CMAPI RECEIVE COMMAND PARAMETERS |
|---|
| Supplied parameters: |
| RECEIVE [ CM-DISTRIBUTION-ID (variable) ] |
| Returned Parameters: |
| TYPE (QUERY, CM-DISTRIBUTION-ID (variable)) |
| (RELAY-QUERY, CM-DISTRIBUTION-ID (variable)) |
| (REPLY, CM-DISTRIBUTION-ID (variable)) |
| (ASYNC) |
| (COD, CM-DISTRIBUTION-ID (variable)) |
| (EXCEPTION, CM-DISTRIBUTION-ID (variable)) |
| DATA (variable) |
| LENGTH (variable) |
| SOURCE (variable) |
| [ RETURN (variable) ] |
| [ EU-DISTRIBUTION-ID (variable) ] |
| PMD-INDICATION (YES) (NO) |

RECEIVE (Supplied Parameters):

CM-DISTRIBUTION-ID is a variable containing the Identification of the specific Distribution that the End User wishes to RECEIVE. If that specific Distribution has been received by the Communications Manager, it will be passed to the End User. If it has not been received, but the CM-DISTRIBUTION-ID is for an expected REPLY to a QUERY, the End User will wait for the REPLY. If the specific Distribution has not been received, and is not an expected REPLY, then it is an error condition.

RECEIVE (Returned Parameters):

The returned parameters may be defined by local conventions as to location, rather than the End User actually receiving them by executing a command.

TYPE specifies which type of Distribution is returned.

QUERY specifies the Distribution is an original request and that the originating End User expects a REPLY. It is the responsibility of the End User to preserve and return the received CM-DISTRIBUTION-ID unchanged when SENDing the REPLY in response to this QUERY.

RELAY-QUERY specifies the distribution is not an original request and that the RETURN expects a REPLY to the original QUERY. The End User must either SEND a REPLY to the designated RETURN or SEND an additional RELAY-QUERY to yet another End User. It is the responsibility of the End User to preserve and return the received CM-DISTRIBUTION-ID unchanged when SENDing the RELY or RELAY-QUERY.

REPLY specifies the Distribution is a reply in response to a previous QUERY.

CM-DISTRIBUTION-ID is a variable containing the Identification of the Distribution as known by the Communications Manager of the originating End User.

ASYNC specifies the Distribution is an unsolicited Distribution and that the SOURCE does not expect a REPLY.

COD specifies the Distribution is a positive delivery notification of a previous Distribution.

CM-DISTRIBUTION-ID is a variable containing the Identification of the Distribution as known by the Communications Manager of the originating End User.

EXCEPTION specifies the Distribution is a negative delivery notification of a previous Distribution.

CM-DISTRIBUTION-ID is a variable containing the Identification of the Distribution as known by the Communications Manager of the originating End User.

DATA specifies the variable in which the data is to be returned.

LENGTH specifies the variable in which the length of the data is to be returned.

SOURCE is a variable containing the identification of the Origin. This variable is presented in the form of a locally known DESTINATION MNEMONIC of the source EU. The SOURCE MNEMONIC is preferably limited to 1 to 8 octets.

RETURN is a variable containing the identification of the End User to receive a reply. This variable is presented in the form of the locally known DESTINATION MNEMONIC of the return EU. The RETURN MNEMONIC is preferably limited to 1 to 8 octets. RETURN must be provided for RECEIVE TYPE=RELAY-QUERY.

EU-DISTRIBUTION-ID is a variable containing the identification of the distribution as known by the originating End User. For COD or EXCEPTION Notifications the EU-DISTRIBUTION-ID will be the same EU-DISTRIBUTION-ID as in the original distribution. EU-DISTRIBUTION-ID preferably has a length of 1 to 44 octets.

PDM-INDICATION specifies whether the Distribution is a Possible Duplicate Message (PDM) or not.

YES specifies the Distribution may be a duplicated Distribution. A Distribution containing a PDM indication may not be in sequence.

NO specifies the Distribution is not a duplicated Distribution.

3.2.3. STATUS

The STATUS command, presented in Table 3.4 and discussed in to request the status, by priority and more detail below, is used destination, of Distribution queues maintained by the Communications Manager.

TABLE 3.4

| CMAPI STATUS COMMAND PARAMETERS |
| --- |
| Supplied parameters: |
| STATUS DIRECTION<br>    (OUT)<br>        TYPE  (COUNT)<br>                   (PURGE, [CM-DISTRIBUTION-ID<br>                   (variable)])<br>        DESTINATION (variable)<br>        SOURCE (variable)<br>        PRIORITY (variable)<br>    (IN)<br>        TYPE  (COUNT)<br>                   (PURGE, [CM-DISTRIBUTION-ID<br>                   (variable)])<br>        DESTINATION (variable)<br>        SOURCE (variable)<br>        PRIORITY (variable) |
| Returned parameters: |
| RETURN-CODE (variable)<br>RETURN-STATUS (variable) |

STATUS (Supplied Parameters):

DIRECTION specifies whether the status returned is for that of the inbound or outbound (relative to the EU) queues. The extent to which queues in either direction are supported is dependent on the individual implementations.

TYPE specifies the type of status request.

COUNT specifies a request for the total count of the Distributions on the local Communications Manager's inbound or outbound PRIORITY queue destined for the DESTINATION's Communications Manager.

PURGE specifies that the SOURCE's Distributions on the local Communications Manager's inbound or outbound PRIORITY queue destined for the DESTINATION's Communications Manager be purged from the system. The CM-DISTRIBUTION-ID is an optional parameter. If present, the Distribution identified by the CM-DISTRIBUTION-ID will be purged, if not present, all SOURCE Distributions on the identified queue will be purged.

DESTINATION is a variable containing the locally known DESTINATION MNEMONIC of the targeted EU. The DESTINATION MNEMONIC is preferably limited to 1 to 8 octets.

SOURCE is a variable, in the form of a SOURCE MNEMONIC, containing the identification of the End User making the request. The SOURCE MNEMONIC is preferably limited to 1 to 8 octets, and must be identical to the original enqueing (SOURCE) End User.

PRIORITY specifies the variable containing the priority of the Distribution queue referenced in the request, and preferably has a value of 2 to 7.

STATUS (Returned Parameters):

RETURN-CODE specifies the variable in which a return code is returned to the requesting application. The return code indicates the result of the command execution. RETURN-CODEs include, for example, OK; DESTINATION error; SOURCE error; and PRIORITY error.

RETURN-STATUS specifies the variable in which the requested status is returned. For a COUNT request the value is a count of the total Distributions on the specified queue. For a PURGE request the value is a count of the total number of Distributions purged.

3.3. Systems Management Application Program Interface (SMAPI)

This section contains the Communications Manager Systems Management API (SMAPI) commands and parameter values which Privileged End User applications may use to request services of the Communications Manager. Only those commands or functions which are different than those defined in section 3.2 are delineated here. That is to say that the Systems Management API (SMAPI) actually comprises all the commands and parameters defined in the non-Privileged Communications Manager API (CMAPI) in addition to all the commands and parameters defined in this section. The function of each command is explained and followed by a description of each operand. Optional operands are enclosed within brackets; required operands are shown without brackets.

The services provided the applications End Users will be the same in all systems. However, each implementation will adhere to the local system conventions under which the Communications Manager is to operate. Each implementation of the CM must therefore document how its applications program interface maps to the Communications Manager Applications Program Interface.

3.3.1. SEND

The SEND command, presented in Table 3.5, and described in more detail below, is used to request a Distribution of data from one Privileged Application End User to another Privileged Application End User.

TABLE 3.5

| SMAPI SEND COMMAND PARAMETERS |  |
| --- | --- |
| Supplied parameters: | |
| SEND | DESTINATION {A/M} (variable)<br>SOURCE {A/M} (variable)<br>[ RETURN {A/M} (variable) ]<br>PRIORITY (variable) |

SEND Supplied parameters:

DESTINATION is a variable containing either the DESTINATION ADDRESS of the targeted EU in the form of "CM.EU" or the locally known DESTINATION MNEMONIC of the targeted EU. In the case of the DESTINATION MNEMONIC, the SMAPI will resolve this MNEMONIC to a DESTINATION ADDRESS in the form of "CM.EU". The form of the DESTINATION is indicated by selecting either "A" for DESTINATION ADDRESS or "M" for DESTINATION MNEMONIC. The DESTINATION MNEMONIC is preferably limited to 1 to 8 octets. The DESTINATION ADDRESS preferably includes a 3 byte CM# and a 2 byte EU#.

SOURCE is a variable containing the identification of the End User requesting the SEND function at the SMAPI. The form of the SOURCE is indicated by selecting either "A" for SOURCE ADDRESS or "M" for SOURCE MNEMONIC. The SOURCE MNEMONIC is preferably limited to 1 to 8 octets.

The SOURCE ADDRESS preferably includes a 3 byte CM# and a 2 byte EU#.

RETURN is a variable containing the identification of the End User to receive the requested delivery notification or reply. The RETURN ADDRESS or MNEMONIC is assumed to be the same as the SOURCE ADDRESS or MNEMONIC unless this variable specifies otherwise. RETURN is a required parameter with a distribution TYPE of RELAY_QUERY. The form of the DESTINATION is indicated by selecting either "A" for DESTINATION ADDRESS or "M" for DESTINATION MNEMONIC. The RETURN MNEMONIC is preferably limited to 1 to 8 octets. The RETURN ADDRESS must include a byte CM# and a 2 byte EU#.

PRIORITY specifies the variable containing the priority the Distribution is to receive. PRIORITY preferably has a value of 0 through 7.

Priority 0 maximum LENGTH is preferably less than or equal to 100 bytes and ASSURANCE of LIMITED Priority 1 maximum LENGTH is preferably less than or equal to 1,800 bytes and ASSURANCE of Limited Priority 2 maximum LENGTH is preferably less than or equal to 4,000 bytes and ASSURANCE of LIMITED.

Priority 3 maximum LENGTH is preferably less than or equal to 32,000 bytes and ASSURANCE of LIMITED.

Priorities 4-7 maximum LENGTH are preferably less than or equal to 32,000 bytes and ASSURANCE of FULL or LIMITED.

3.3.2. RECEIVE

The RECEIVE command, presented in Table 3.6 and described below in more detail, is a request for Distributions from the Communications Manager. End Users may or may not actually execute the command, however, each implementation will make provisions for delivering the Returned parameters to the End User. Distributions will be delivered on a first in first out basis, unless a specific distribution is requested.

TABLE 3.6

| SMAPI RECEIVE COMMAND PARAMETERS | |
|---|---|
| Returned Parameters: | |
| RECEIVE | SOURCE {A/M} (variable) |
| | [ RETURN {A/M} (variable) ] |

RECEIVE (Returned Parameters):

SOURCE is a variable containing the identification of the Origin. This variable may be presented as either the ORIGIN ADDRESS of the source EU in the form of "CM.EU" or the locally known DESTINATION MNEMONIC of the source EU. The form of the SOURCE is indicated by either "A" for SOURCE ADDRESS or "M" for SOURCE MNEMONIC. The SOURCE MNEMONIC is preferably limited to 1 to 8 octets. The SOURCE ADDRESS must include a 3 byte CM# and a 2 byte EU#.

RETURN is a variable containing the identification of the RETURN to receive a reply. This variable may be presented as either the RETURN ADDRESS of the return EU in the form of "CM.EU" or the locally known DESTINATION MNEMONIC of the return EU. The form of the RETURN is indicated by either "A" for RETURN ADDRESS or "M" for RETURN MNEMONIC. The RETURN MNEMONIC is preferably limited to 1 to 8 octets. The RETURN ADDRESS must include a 3 byte CM# and a 2 byte EU#. RETURN must be provided for RECEIVE TYPE=RELAY-QUERY.

3.3.3. STATUS

The STATUS command, presented in Table 3.7, and described below in more detail, is used to request the status, by priority and destination, of Distribution queues maintained by the Communications Manager.

TABLE 3.7

| SMAPI STATUS COMMAND PARAMETERS | |
|---|---|
| Supplied Parameters: | |
| STATUS | DESTINATION {A/M} (variable) |
| | SOURCE {A/M} (variable) |
| | PRIORITY (variable) |

STATUS (Supplied Parameters):

DESTINATION is a variable containing either the DESTINATION ADDRESS of the targeted EU in the form of "CM.EU" or the locally known DESTINATION MNEMONIC of the targeted EU. In the case of the DESTINATION MNEMONIC, the SMAPI will resolve this MNEMONIC to a DESTINATION ADDRESS in the form of "CM.EU". The form of the DESTINATION is indicated by selecting either "A" for DESTINATION ADDRESS or "M" for DESTINATION MNEMONIC. The DESTINATION MNEMONIC is preferably limited to 1 to 8 octets. The DESTINATION ADDRESS must includes a 3 byte CM# and a 2 byte EU#.

SOURCE is a variable containing the identification of the End User making the request. The form of the SOURCE is indicated by selecting either "A" for SOURCE ADDRESS or "M" for SOURCE MNEMONIC. The SOURCE MNEMONIC is preferably limited to 1 to 8 octets. The SOURCE ADDRESS must include a 3 byte CM# and a 2 byte EU#. It must be identical to the original enqueing (SOURCE) End User.

PRIORITY specifies the variable containing the priority of the Distribution queue referenced in the request. Priority preferably has a value of 0 to 7.

4. CM/Session Layer

The CM provides a sessionless message-based communication channel to companion CMs. The CM/Session layer, the CMAPI and the SMAPI are concerned with providing common facilities to applications which wish to communicate. While the service provided by the CM/Transport layer is two-way simultaneous normal and expedited data transfer, these facilities are controlled in order for two EUs to coordinate and make sense out of the data exchanges. Broadly, then, the CM/Session layer provides structured, synchronized control of the communications channel provided by the CM/Transport layer. While there are no session services, per se, in the CM, this layer does perform some of the functions that normally occur at the session layer such as: normal data exchange; expedited data exchange; exception reporting; data unit sequence numbering; and layer management.

Further, the CM/Session layer also includes components to validate priority versus size restrictions, provides out-bound message time-out management, and manages the protected message facility.

4.1. EU to CM/Session—Outbound Messages

For messages from EUs through the CM/Session layer outbound towards the CM/Transport layer, the following processing will be performed at the CM/Session layer:

4.1.1. A CM-DISTRIBUTION-ID will be assigned to the DU

The CM-DISTRIBUTION-ID is a value by which the CM internally tracks messages that may need to be explicitly identified (e.g., CORRELATED) to an EU (e.g., a REPLY to a previously sent QUERY, or a DU that the EU has sent with some form of delivery notification).

4.1.2. If time out management is required, time out information will be stored

All QUERY type messages require the EU to specify a time frame for delivery and response. This is passed across the API and may be short, medium, or long. The actual periods can be defined by the CM implementors as appropriate for each target environment.

The CM/Session layer is responsible for administering the time frame management. Starting timers on the output side, and resolving timers on the input side. Key elements in this endeavor are the CM-DISTRIBUTION-ID and the individual timer itself.

4.1.3. Safe storing of DUs if FULL-ASSURANCE is specified, and if supported by the local CM implementation The exact mechanism for accomplishing the safe store of DUs is completely implementation dependent. However, if a particular implementation takes advantage of this feature, it must set up the safe store and resolve it, either successfully or not, at the CM/Session layer.

4.1.4. Stores Required Status Information

The CM/Session layer keeps statistical information on the performance of the layer. This information will be stored in the MIB, where it can be accessed by the SMAP.

4.2. CM/Session to EU—Inbound Messages

For messages bound through the CM/Session layer inbound towards the CMAPI, the following processing will be performed at the CM/Session layer:

4.2.1. Performs Time Out Monitoring. If a previously sent DU requested timeout, an error response is sent to the EU if such a time-out occurs On the outbound side of the CM/Session layer, DUs that have been sent as message type QUERY will have a time out value associated with them. The inbound side of the CM/Session layer is the processing entity that resolves these timers; either a REPLY will be returned from the target CM that correlates with the previously sent QUERY, or it will time out.

If a REPLY to a QUERY is received the CM correlates the two through the CM-DISTRIBUTION-ID of the original Query which must be carried in the CORRELATION field of the REPLY CMIU. The outstanding timer will be canceled and the DU may be queued for or sent directly to the API for delivery to the EU. Queuing of inbound messages may be done according to the needs of a local implementation of a CM; some environments may require inbound queues, while others may not.

In the case of a timed out message, notice of the time out will be forwarded to an EU in the same way a DU is, except there will be no data to transfer. Correlation between the error notification and the corresponding outbound DU will be accomplished through the CM-DISTRIBUTION-ID.

4.2.2. Depending on the implementation, may remove a DU from the receive priority queue 4.2.3. Performs the dispatch of an assembled DU to the appropriate EU, which includes:

4.2.3.1. Recorrelating the incoming DU to a previously sent DU, if necessary

Inbound REPLYs must be correlated to a previously sent QUERY. This is accomplished through the CM-DISTRIBUTION-ID of the original QUERY carried as a CORRELATION field within the REPLY CMIU.

4.2.3.2. Delivering the DU to appropriate EU

Activates the mechanism, appropriate to the local environment, that will deliver the inbound DU to the specified EU. This may be accomplished by some pre-established table whereby a local resource is scheduled or activated, or it may be the reaction to an explicit request by an EU for a message.

4 2.4. Relays exception notification to EU when necessary

Exception notification that is returned from a DESTINATION or INTERMEDIATE CM will be passed to the EU in the same way as a DU except there will be no data.

4.2.5. Generates exception notification when DUs are undeliverable, and notification is required by the sender In those cases where, for some reason, a DU is not deliverable to an EU, the CM/Session layer must format an error message, if exception notification has been requested, and initiate its return to the source CM.

4 2.6. Stores required status information

As with all layers, status and management information is maintained in the MIB.

5. CM/Transport Layer

As with the CM/Session Layer, because of the lack of a session entity in the CM, the function of the CM/Transport layer is somewhat foreshortened when compared to similarly named layers in other networks. Basically, this layer performs the blocking/ deblocking of messages and envelopes/de-envelopes the segmented DU with the Communications Manager Interchange Unit (CMIU) protocol. Because of the Wide Area Network's (WAN) long term requirement to dynamically perform adaptive routing this layer can also be required to assemble multisegment DUs whose segments arrive non-sequentially. Generally, the functions supported by the CM/Transport layer are: message prioritization; message queuing; expedited message passing; exception reporting; message segmentation; flow control; and layer management.

5.1. CM/Session to CM/Transport—Outbound Messages

For messages bound through the CM/Transport layer outbound towards the CM/Network layer, the following processing will occur at the CM/Transport layer:

5.1.1. Queuing of outbound DUs by priority and DEST-CM

The CM/Transport layer maintains the outbound priority queues. DUs are queued by DEST-CM and priority, in this fashion if communications with a particular CM becomes disrupted, messages destined for other CMs can still get through.

5.1.2. The CM may remove a DU from the receive priority queue

The STATUS API service allows for DUs outbound for a specific CM to be purged from the outbound priority queue (refer to Section 3.2.3. on the STATUS service for more information).

5.1.3. Message promotion, i.e. removal of the DU from the queue at the appropriate time 5.1.3.1. End-to-end flow control End-to-end flow control is accomplished through the STOP/RESUME commands in the SMAP-to-SMAP communications section. In essence, the STOP command to the SMAP will cause the CM/Transport layer to stop removing DUs from the queue. RESUME commands to the SMAP will cause the CM/Transport layer to once again remove DUs from the queue.

5.1.3.2. DU Segmentation

The CM/Transport is responsible for segmenting DUs that are longer than the DEST-CM can handle.

5.1.4. Building of the segmented DU into discrete CMIUs

The last step of the CM/Transport layer is to wrap the segmented DU with the CMIU.

5.2 CM/Transport to CM/Session—Inbound Messages

For messages bound through the CM/Transport layer inbound towards the CM/Session layer, the following processing will be performed at the CM/Transport layer: 1) end-to-end flow control by monitoring resource utilization and sending stop/resume commands to the originating CM; 2) removal of the CMIU envelope from the message, converting it back into DU segments; 3) rebuilding of DUs by ORIG-CM and priority from the DU segments; and 4) depending on the resources available, an implementation may build and manage a receive priority queue by DESTEU.

6. CM/Network Layer

The CM/Network layer performs the routing tasks of the CM. All CMIUs which are outbound from the CM/Transport layer, inbound from the Network Protocol Stack, and pass through from the CM/Network layer inbound to the CM/Network layer outbound, will be routed by this layer.

6.1. CM/Transport to CM/Network—Outbound Messages

For outbound messages, the CM/Network executes the Load Distribution function of the Intermediate Routing and Distribution Node (IRD). In addition DEST-CM numbers are resolved to an ADJACENT-CM number. The CM/Network layer also chooses the appropriate network protocol stack, and resolves the ADJACENT-CM number to an address specific to the local network protocol stack.

Adjacent flow control is also performed by managing the transmit/receive window via an adaptive pacing mechanism. CM Priority level 0 messages are transmitted even when the current pacing window is equal to 0.

Next, CM Priority 0 and 1 messages are queued on a separate "Command" Queue, and messages at CM Priorities 2-7 are queued on a single outbound "Data" Queue. Finally, transmission of CM Priority 0-7 messages is performed.

6.2. CM/Network to CM/Transport—Inbound Messages

For inbound messages, the CM/Network layer monitors the DEST-CM number and makes decisions to route CMIUs to the local CM/Transport layer or to the Outbound CM/Network local Network Protocol Stack API (PSAPI).

The CM/Network layer also performs adjacent flow control. Because of the necessity to coordinate the CM/Network layer across multiple implementations, the following section amplifies the concepts of CM/Network layer Priority Queuing, Flow Control and Routing capabilities.

6.3. CM/Network Layer Functions 6.3.1. Priority Queues

In order to ensure that CM Management Commands will always flow before data distributions there are presently at least two priority queues at the CM/Network Layer. One for priority 0 and 1 CM Commands and a second queue for priority 2 through 7 data distributions. The two priority queues at the CM/Network layer provide the local CM implementation with a high priority CM queue along with a low priority normal data distribution queue.

Priority 0 is reserved for SMAP to SMAP System Management Distribution Unit (SMDU) commands and functions. Priority 1 includes SMAP to SMAP (SMDU) commands and functions along with privileged EU to privileged EU (SMDU) commands and functions.

The local CM implementation could require that more than 2 queues be implemented at the CM/Network Layer (e.g., priorities 0-3). In this case the CM/Network Layer Priority 3 queue will in actuality contain or represent data distributions submitted to the CM by EUs at CM/Transport Layer Priorities 3 through 7. The number of CM/Network Layer priority queues could go as high as the total number of CM priorities (i.e., 0-7) depending on resource availabilities at the local CM.

6.3.2. Data Flows

Figure 9:
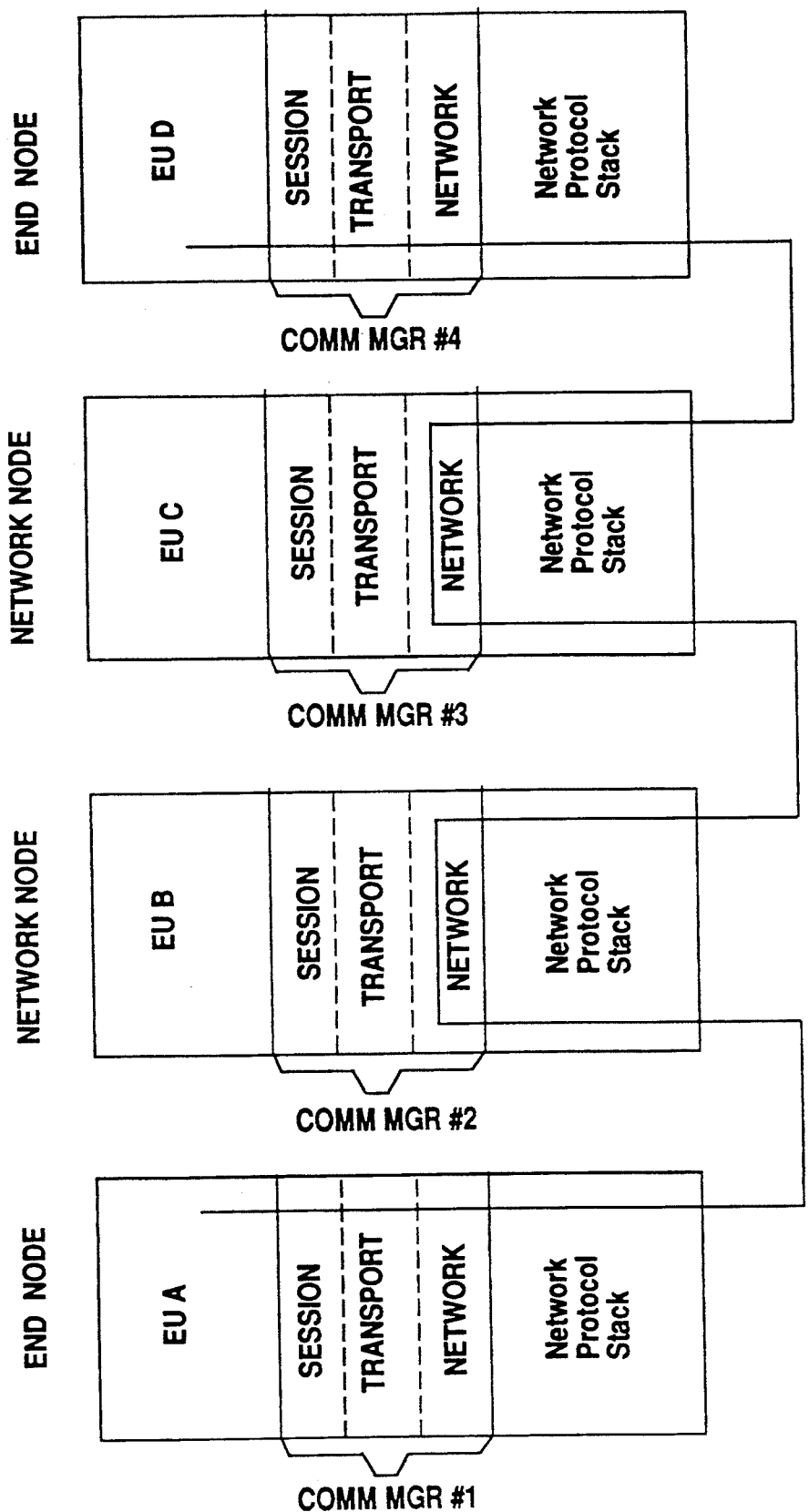
FIG. 9 is the data flow through multiple communications managers according to the present invention.

Due to its position in the data flow, the CM has the potential to be a performance bottleneck. The layering of the CM is purposely crafted to minimize that possibility. FIG. 9 illustrates that data traffic flowing through Intermediate CM Nodes is isolated to the CM/Network layer at the intermediate nodes. This insures that the only processing required is that which is needed to route the data. FIG. 9 also illustrates that messages originate and terminate with an EU.

In FIG. 9 the Intermediate CM Nodes are referred to as NETWORK NODES while the Origin and Destination CMs are referred to as END NODES. These terms are used to determine the types of functions being performed at any given CM on behalf of specific distributions. End Node and Network Node functions can co-exist at any given CM Node. Therefore, if EU C initiates a SEND to EU D then CM 3 will act as an End Node on behalf of EU C as well as a Network Node on behalf of Distributions which are initiated from EU A.

If a distribution traverses multiple Network Nodes to get to its final destination the path may range across multiple network protocol stacks. When this occurs, the distribution will arrive at CM Gateways which will convert one network protocol stack flow to another. Network Nodes which communicate with other Network Nodes via the same network protocol stack are referred to herein as "Cooperating Network Nodes." Within a network of Cooperating Network Nodes the maximum CMIU size is always the same. The maximum CMIU size between cooperating Network Nodes is a tunable item.

6.3.3. Flow Control

There are two types of flow control available within the present invention. These are: End to End flow control which uses STOP/RESUME SMAP to SMAP System Management Distribution Unit (SMDU) Control Commands; and Adjacent CM to Adjacent CM flow control using Adaptive Pacing Requests and Responses.

6.3.3.1. End to End Flow Control

Responsibility to initiate End to End flow control via STOP/RESUME Management Commands could be the responsibility of the CM/Transport Layer of the ORIGIN and DESTINATION Communications Managers or of their associated SMAPs. In either case, the actual STOP/RESUME Management Command is formatted by the SMAP as a Systems Management Distribution Unit (SMDU) and forwarded through the CM Layers and the CM "Virtual Network" to the DESTINATION CM (see sections 11 and 13 for a more comprehensive discussion of SMDU Commands). Any Intermediate Communications Manager involved in the flow of distributions will not be concerned with End to End flow control between ORIGINS and DESTINATIONS since passthrough CMIUs will only flow through the CM/Network Layer of the Intermediate Communications Manager.

6.3 3.2. Adjacent CM to Adjacent CM Flow Control

Adjacent CM to Adjacent CM flow control via Adaptive Pacing Requests and Responses is the responsibility of the CM/Network Layer of any pair of Adjacent Communications Managers. The CM/Network Layer uses the adaptive pacing mechanism as a tool to manage its local resources. The following scenario outlining Resource Management at the CM/Network Layer of the Communications Manager is intended only to illustrate the usage of the adaptive pacing mechanism in managing local resources. In this particular example the resources being managed could be buffers.

6.3.3.3. Normal Pacing Flow Description

Figure 10:
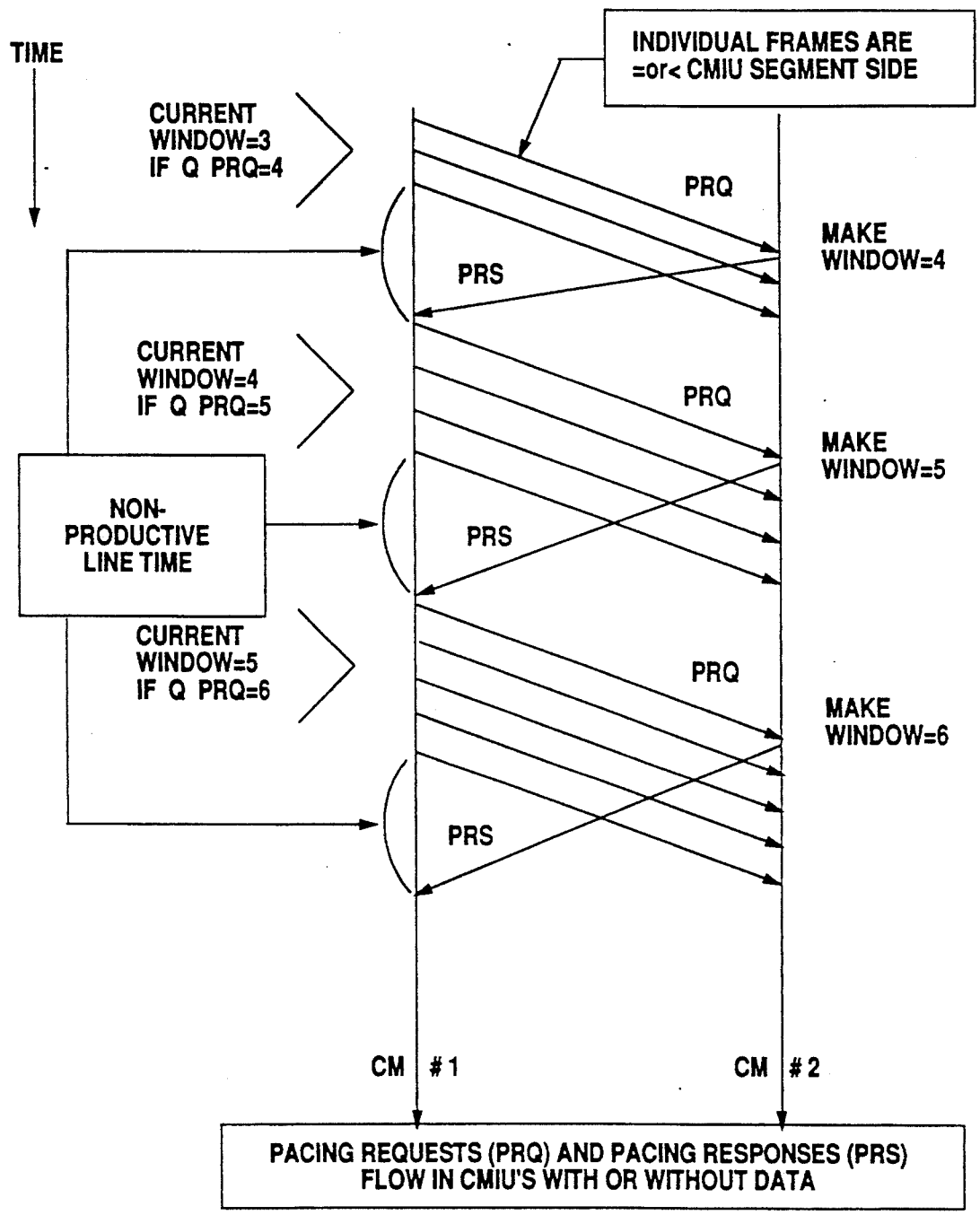
FIG. 10 is the data flow control from adjacent communications manager to adjacent communications manager in accordance with the present invention.

FIG. 10 illustrates the normal flow of Pacing Requests (PRQs) and Pacing Responses (PRSs) between Adjacent CM nodes. The CM/Network layer of the sending CM appends a PRQ to the first CMIU which it sends as part of its current window to the Adjacent CM. The current window represents the maximum number of CMIUs which the sending CM can send to its Adjacent CM before a PRS is received from the Adjacent CM. If the sending CM has a CM/Network Layer outbound queue to the Adjacent CM which is greater than the current window, the sending CM can indicate within the PRQ that it wants a larger window. The sending CM can only request a window size increment of 1. Once the sending CM has sent all the CMIUs permitted within the current window, the sending CM must wait for the Adjacent CM to send a PRS before sending any additional CMIUs.

Figure 11:
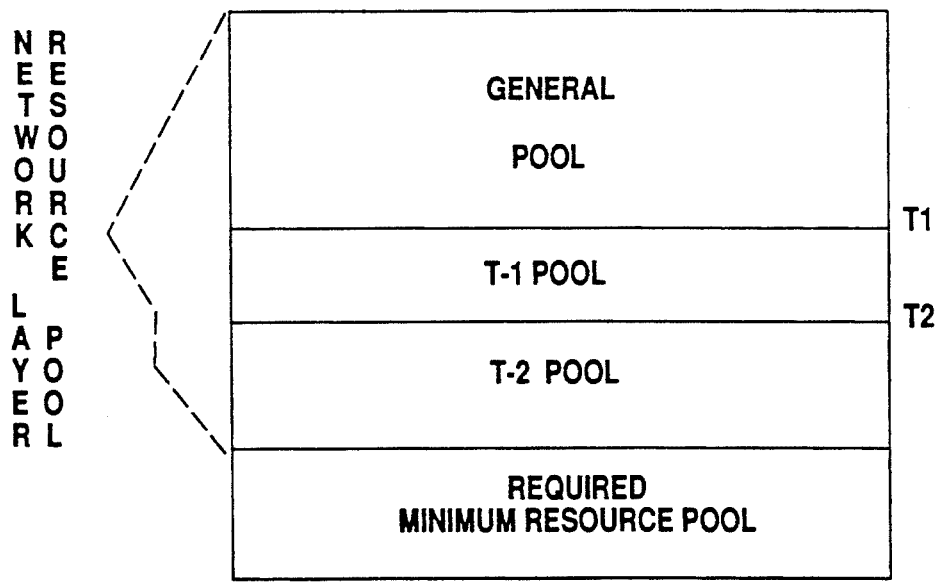
FIG. 11 shows the resource management of the communications manager/network layer of the present invention.

When the CM/Network layer of the receiving CM receives a PRQ from one of its Adjacent CMs, it checks its locally defined resource thresholds T-1 and T-2 (FIG. 11). As long as thresholds T-1 and T-2 are intact, the receiving CM responds to the sending CMs' PRQ with a PRS. If the inbound PRQ indicates that the sending CM is requesting a larger window, the receiving CM indicates whether or not it is willing to accept the larger window by indicating this within the PRS. In this way the receiving CM can control the arrival irate of inbound CMIUs by honoring or not honoring the PRQs requesting an increment in the window size.

If the inbound PRQ does not indicate a need to increase the window size the receiving CM responds to the PRQ with a PRS. This PRS contains the acknowledgement of the receipt of the PRQ and authorization to send another window of CMIUs with no change to the current window size.

6.3.3.4. T-1 Threshold Realized

Referring to FIGS. 10 and 11, when Inbound Segmented Distribution Units (DUs) arrive from the network protocol stack they are presented to the CM/Network Layer of the Communications Manager as packetized Communications Manager Interchange Units (CMIUs). Locally defined resource pool thresholds are checked whenever any CMIU arrives at the CM/Network Layer. As soon as pool resources as depicted in FIG. 11 have been depleted lower than the locally defined T-1 Pool threshold, the CM/Network Layer searches its Adjacent CM Sessions for the most resource intensive session(s). Resource intensive sessions are identified in a number of different ways. Whatever criteria make sense for the local CM/Network Layer implementation can be used to determine which Adjacent CMs should be classified as resource intensive. Some of these criteria could be, for example: largest window size, most number of bytes received, most number of CMIUs received, etc.

When these resource intensive CM(s) are identified, the CM/Network Layer waits until the next Pacing Request (PRQ) arrives from the identified CM(s). A Pacing Response (PRS) is then generated which decrements the current window size on these CM Sessions by one. Pacing Requests and Pacing Responses may flow within CMIUs which contain data distributions or as Isolated Pacing Requests and Responses (IPRs) with no associated data. This process of lowering the window will continue (satisfying the Pacing Request each time by decrementing the window size by one) until either the pool usage drops off to above the T-1 Pool threshold value or T-1 Pool is also depleted and the locally defined T-2 threshold is breached.

6.3.3.5. T-1 Threshold Restoration

In cases where resource pool usage returns to normal (by returning across the T-1 Pool threshold) it is likely that the Adjacent CMs will have begun to queue distributions to the CM which just exited the T-1 Pool threshold state.

Whenever the CM/Network Layer has a queue to a given Adjacent CM it can request that the current window size be incremented by one. If the request is honored, then the next window to flow will be increased by one.

When PRQs requesting an increment of the window size arrive, the CM/Network Layer (which is now no longer in a state of T-1 pool congestion) can begin to honor the requests with PRSs which increment the window.

6.3.3.6. T-1 Pool Depletion/T-2 Pool Threshold Realized

In cases where T-1 Pool continues to be depleted until the T-2 Pool threshold has been broken, the CM/Network Layer again searches for the most resource intensive CM session(s) and formats PRSs to these sessions which set the window size to zero.

Prior to the T-2 threshold being reached, PRS responses to PRQs are sent which indicate either no change in the current window size is allowed, due to being in a T-1 depletion state, or which specify to decrement the current window size by one if the requesting CM has been identified as resource intensive by the receiving CM.

Setting the window size for resource intensive Adjacent CMs to zero is referred to as "slamming the window" and effectively stops the flow of all distributions except Priority 0 SMDU (CMIU Format 3 (see Section 13 for a description of CMIU Formats)) Isolated Pacing Request/Response (IPRQ/PRS) Commands. Without the ability to flow Priority 0 SMDU or Isolated Pacing Request/Response (IPRQ/PRS) Commands there is the danger of an Adjacent pair of CMS achieving a deadlock condition where each is awaiting a Pacing response from a partner which is "paced". By continuing to allow priority 0 SMDU or Isolated Pacing Request/Response (IPRQ/PRS) Commands to flow, a "paced" CM with a queue to the Pacing Adjacent CM can continue to send Isolated Pacing Requests (IPRQs) or SMDUs at priority 0 and the partner CM can return Isolated Pacing Responses (IPRSs) or SMDUs at priority 0. An IPR is sent without an associated distribution. IPRQs and IPRSs will flow as a result of time initiated processes.

In the event that there are other SMDU commands stacked at priority 0 these can flow with the PRQs. In order to conserve resources at the pacing CM, the flow of these priority 0 distributions is limited to an implied window size of 1 when the pacing CM has "slammed the window" to 0 for all the other priorities. Each of the Priority 0 Commands which flow within this "slammed" window will also contain a PRQ. The pacing CM will then be required to respond to the PRQ with a PRS. If the PRS continues to indicate a "slammed" window, the paced CM can then send another Priority 0 SMDU with the PRQ indicator on.

6.3.3.7. T-2 Threshold Restoration

Since resources are being conserved in the T-2 state, they typically will return to the T-1 state. When this occurs the IPRQs being received at priority 0 from the "Paced" Communications Managers can now begin to be honored by allowing the pacing window to be opened in increments of one.

6.3.3.8. T-2 Threshold Deletion

In the event that T-2 resources continue to be heavily utilized it is possible that they too will be exhausted. When this occurs the "Required Minimum Resource Pool" of the example of FIG. 11 will begin to be utilized. At this point, all Adjacent Communications Manager sessions have their windows slammed to zero. The size of the Required Minimum Resource Pool is installation dependent and is also a function of how many Adjacent Communications Manager sessions there are at a given location, along with their expected distribution arrival rate.

6.4. Network Layer Routing

CM Routing above the CM/Network layer (e.g., at the CM/Session and CM/Transport layers) is always from Origin CMs to Destination CMs. At the CM/Network layer, Distributions will sometimes flow from Origin CMs to Destination CMs via Intermediate CMs. When this occurs, the distribution is said to flow between Adjacent CMs. In all cases, the Distribution always contains the ultimate Destination CM#.

If the Adjacent CM is not the Destination CM indicated within the Distribution, the Adjacent CM then functions as an Intermediate CM. The Intermediate CM routes the Distribution towards the Destination CM to the best of its ability based on routing tables resident within the MIB of the Intermediate CM. In this way a given distribution could actually be routed through multiple intermediate nodes before arriving at its final destination. The Origin CM only needs to know that the path to the Destination CM is via a specific Adjacent CM.

Forwarding of distributions is executed by the CM/Network Layer of the Intermediate CM without invoking any of the upper layers of the CM (such as the CM/Transport and/or the CM/Session Layers).

7. Protocol Stack Applications Programming Interface (PSAPI)

The protocol stack interface layer provides the place for implementation of the Network Protocol Stack (NPS) interface (referred to herein as the "PSAPI") utilized in CM network transfers. A CM network transfers information between CM End Users (EUs) over whatever communications interface is available to actually implement the transfer. The major requirement for successful transfer of a CM Interchange Unit (CMIU) is that at the interface of the CM Network Layer (CMNL) to the NPS, the underlying transport mechanism be equivalent on both ends of a communications link between Adjacent CMs. A function of the PSAPI can be to provide this leveling mechanism.

The CM architecture requires that the CMIU transfer between CM processes is error free. CM does not contain any CMIU data correctness checking or CMIU data error recovery protocols. CM preferably requires the transmission of 8-bit octet information across the NPS. If the NPS cannot handle an octet, the PSAPI would be required to transform it to and from the NPS limiting format in a transparent manner.

Effectively, the CM Network layer has an out basket, and an in basket. Communication between Adjacent CMs requires two logically simultaneous unidirectional transmission paths (similar to full duplex) between Adjacent CM nodes. One transmission link is outbound only from a CM to an adjacent CM, and the other is inbound only from the adjacent CM. Neither logical transmission link has its direction of transport reversed during use. This is not a requirement of the CM which is placed upon the underlying transport network. As long as the CM Network Layer is provided with two opposed unidirectional transmission links, any underlying protocol can be used.

7.1. CM Network Layer to Network Protocol Stack Interface

Three logical Service Access Points are required between CMNL and the NPS and together form a group of access points per CM transmission path: Outbound Transmission (CMNL-NPS-OTSAP); Inbound Transmission (CMNL-NPS-ITSAP); Control (CMNL-NPS-CSAP).

The OTSAP and ITSAP are used for CMIU transmission half links. The CSAP is used for command and control between the CMNL and the NPS. The following requests and responses are provided as an example of the logic used to communicate between the interface layer and the NPS:

7.1.1. Outbound Transmission Service Access Point (OTSAP)

SEND-DATA-REQ: Request from the Local CM Network Layer (CMNL) to transfer data from the Local CM to the Adjacent CM over the NPS link.

Contents:

CMIU: To the NPS this is effectively an application data item, the application being the CM.

CM-ADJ-NPS-ADDR: The NPS address of the adjacent CM. May be null if not required in implementation.

SEND-DATA-RESP:

Initial Response:

Accepted or not.
Final Response:
Dependent upon NPS. It is here that any detectable transmission errors would be reported. It is up to the implementation of the adjacent interfaces to decide what to do.

7.1.2. Inbound Transmission Service Access Point (ITSAP)

RECV-DATA-REQ: Initiate read. This can be the only verb required depending upon implementation. In some systems, the completion of this request is the equivalent of the reception of RECV-DATA-RESP.

RECV-DATA-IND: For some implementations that support asynchronous I/O, this indicates that data is available to the requestor.

RECV-DATA-RESP: Passing of data and reception status from the NPS. In some systems the indication (RECV-NPS DATA-IND) would not be provided. In some implementations this response is implicit upon completion of the request.

7.1.3. Control Service Access Point (CSAP)

CM-ADJ-CHECK-REQ: Check NPS address of Adjacent CM.

START-LINK-REQ: Request NPS to start link to Adjacent CM.

STOP-LINK-REQ: Request NPS to stop link to Adjacent CM.

UPM-PROBLEM-IND: Indication from NPS of asynchronous problem with link to Adjacent CM.

8. Interlayer Management Components

CM Management Functions are performed by the Systems Management Application Program (SMAP) which has direct access to the Management Information Base (MIB).

SMAP services can be invoked by 1) local CM request, 2) local operator interface, or 3) remote SMAP request transmitted in the "Systems Management Exchange Protocol" format. The Systems Management Exchange Protocol flows within a Distribution Unit and is defined in Section 13, Systems Management Exchange Protocol, The Systems Management Distribution Unit (SMDU).

To receive local CM management requests and to perform local management functions, the SMAP requires the usage of the Management Information Base (MIB).

8.1. Management Information Base (MIB)

The Management Information Base is the CM operational data base containing routing information, CM local data elements (e.g., "window" size, "stop/resume" indicators) and CM activity status information. It is a local repository for event driven statistical data recorded for CM management functions (i.e., "performance" management, "accounting" management).

The CM Routing information is maintained and disseminated by a Central or Local Table Server. The SMAP has the capability to request and receive table handoffs from its Table Server (Central or Local), and to apply the updates to the local MIB. The format of the Table Server handoffs is standard for all CM SMAPs, and the local SMAP is responsible for converting the data to conform with the local MIB structure.

8.2. Management Components Linkages 8.1 portrays the linkages between the various types of components used for managing the CM.

TABLE 8.1

CM MANAGEMENT COMPONENT LINKAGES

| COMPONENT | LINKAGES |
|---|---|
| SMAP | MIB, SMAPI |
| SMAPI | SMAP, CM Session Layer, Privileged EU(s) |
| CM Layer | MIB, adjacent (n + 1, n − 1) Layer |
| MIB | CM Layers, SMAP |

The positional relationships of the above components are depicted in FIG. 7.

9. Summary of CM Structure and Management Components

As mentioned in Section 1, the CM resides at the Application Services Level in relation to the Network Protocol Stack and the EUs. Its function is to provide a standard API to all EUs and to shield the EUs from the heterogeneous Network Protocol Stacks within the heterogeneous network. In the execution of this functionality the CM serves as the primary interface to the Network Protocol Stack. Therefore, the CM, from the perspective of the Network Protocol Stack, is, strictly speaking, an application.

9.1. Summary of Mainline CM Structure

Notwithstanding its status of "application", the CM appears, to the other applications within the network environment, as the primary interface to network transport services. In support of this function the CM is conceptually layered to reflect the types of network transport functions which the remaining applications require.

Referring again to FIGS. 7 and 8, depicted are the CM components which support the flow of Distribution traffic. These components are known as the CM Mainline and are described as follows:

CMAPI: The standard Applications End User Interface to the CM.

SMAPI: The privileged Applications End User Interface to the CM.

CM/Session: Performs time out management, correlation assignment and recorrelation, safe stores DUs if necessary.

CM/Transport: Performs queuing/dequeuing of distributions by Destination and by Priority, Segments/Rebuilds Distribution Units (DUs), builds/removes CMIU packets, manages queue resources in support of End to End flow control.

CM/Network: Performs Load Distribution (if required), Destination CM to Adjacent CM address resolution, selects the appropriate Network Protocol Stack and associated address, Adjacent to Adjacent Flow Control, Queues high priority "Commands" separately from normal priority "Data".

Protocol Stack
API (PSAPI): Provides the interface between the CM/Network layer of the CM and the Network Protocol Stack.

9.2. Normal Flow of Distributions Through the CM

Distributions are presented to the CM from two directions. First, application End Users can present distributions by issuing a SEND command to either the CMAPI or the SMAPI. Second, a distribution may arrive from an Adjacent CM and will be presented to the CM by the inbound side of the Network Protocol Stack. The following discussion will describe both processes in turn. The former is referred to as "OUT- BOUND FLOW" and the latter as "INBOUND FLOW".

The ensuing discussions on OUTBOUND and INBOUND flows are not intended to be all encompassing descriptions of every possible event that may occur. They are intended merely to integrate and illustrate the conceptual information provided in the previous sections. Reference should be made to FIGS. 6, 7 and 8 to follow along with the description of OUTBOUND and INBOUND flows.

9.2.1. Outbound Flow

The EUs present Distributions to the CM in order to request that they be routed through the network to partner EUs resident either locally or at other CM nodal locations throughout the CM "Virtual Network".

9.2 1.1. CMAPI or SMAPI

After initial processing and parsing of the EU SEND command at one of the two APIs (either CMAPI or SMAPI), the DESTINATION is, if necessary, translated to an explicit address in the form of a 3 byte CM# and a 2 byte EU# (notated as a "CM.EU"). The Distribution Unit (DU) and associated parameters are then passed to the CM/session layer of the CM.

9.2.1.2. CM/Session Layer

This layer of the CM assigns a correlation indicator to the DU in order to uniquely identify this DU. The correlation is a unique number from the perspective of the CM/Session layer of this local CM only. Later, when the CM/Transport creates a CMIU, this field is carried as a CM-DISTRIBUTION-ID. The CM/session layer also starts any timers associated with this DU as necessary. Lastly, the CM/session layer "safe stores" the DU if FULL ASSURANCE was specified by the ORIGIN-EU. If the CM/Session layer determines that the CM.EU address is resident locally (e.g., the EU resides within the local CM environment) it then routes the DU "up" (or INBOUND) to the target EU via one of the local application APIs (either CMAPI or SMAPI). Otherwise, the DU Will be passed to the CM/Transport layer of the CM.

9.2.1.3. CM/Transport Layer

This layer of the CM "queues" the DU by Destination CM and by CM priority to that Destination CM. When the DU is dequeued, the CM/Transport layer determines if segmentation is required and, if so, segments the DU based on the appropriate segment size. This segment size is conditioned by the capabilities of the particular path which the DU must travel from the ORIGIN CM through any number of INTERMEDIATE CMs and on to the final DESTINATION CM. The segment size is then made available to the ORIGIN CM by the GLOBAL or LOCAL Table Server and, once known, is be stored locally. Once the DU has been appropriately segmented, the CM/Transport layer dequeues and builds a CMIU for each segment of the DU. The resultant CMIU(s) are then passed to the CM/Network layer.

9.2.1.4. CM/Network Layer

This layer of the CM, if defined as an Intermediate Routing and Distribution (IRD) node, checks to ensure that the Destination CM is not a "Virtual" CM#. If it is, the IRD function determines the actual CM# to which each CMIU should be routed and replaces the "Virtual" CM# (located in the CMIU packet as the modifiable DESTINATION-CM) with the actual CM#. At this point, the CM/Network layer determines the next Adjacent CM to which this CMIU needs to be forwarded and determines whether to queue the CMIU as a high priority "Command" CMIU (CM Priorities 0 and 1) or as a normal priority "Data" CMIU (CM Priorities 2 through 7). Prior to dequeing the next CMIU to be SENT, the CM/Network layer checks the status of the adaptive pacing window and sets the appropriate pacing indicators in the Transport Services portion of the CMIU. When the CM/Network layer is ready to dequeue a given CMIU to a particular Adjacent CM it selects that CMs' Network Protocol Stack address and passes the CMIU to the Protocol Stack API (PSAPI).

9.2.1.5. Protocol Stack API (PSAPI)

This component of the CM performs the actual Network Protocol Stack required "SEND" of the CMIU to the Adjacent CM as defined by the Network Protocol Stack address; supplied by the CM/Network layer.

9.2.2. Inbound Flow

DUs arrive at the Network Protocol Stack from other CMs and are forwarded to EUs within the local environment or, as part of the Intermediate CM function, they are routed back to the Network Protocol Stack for forwarding to the next Adjacent CM along the path to the final Destination CM.

9.2.2.1. Protocol Stack API (PSAPI)

This component of the CM performs the actual Network Protocol Stack required "RECEIVE" of the CMIU from the Adjacent CM as defined by the Network Protocol Stack address supplied by the CM/Network layer.

9.2.2.2. CM/Network Layer

This layer of the CM first checks the "window size" request in the arriving CMIU. It sets the "current window" and associated pacing status in the Management Information Base (MIB) accordingly. It then checks the DESTINATION-CM field in the CMIU to determine if this CMIU is destined for this CM. If not, the CMIU is routed to the top of the OUTBOUND CM/Network layer. Routing of the CMIU to the top of the OUTBOUND CM/Network layer is characterized as Intermediate CM functionality. If the DESTINATION-CM does, in fact, indicate that this CMIU is to be routed to this CM, then the CMIU is passed to the CM/Transport layer.

9.2.2.3. CM/Transport Layer

This layer of the CM removes the CMIU and "queues" the arriving DU or DU segment by Origin CM and by CM priority from that Origin CM. As the CMIUs arrive from the CM/Network layer the CM/Transport layer monitors its resources available for "queuing". If a locally defined resource utilization threshold is reached, the CM/Transport layer initiates a request to the SMAP to send the appropriate "STOP" to the Origin CM which is driving the resources to their utilization threshold. Conversely, if a CM/Transport layer request to "STOP" an Origin CM had been previously issued, and the current level of resource utilization is no longer at a critical threshold, then the CM/Transport layer initiates a request to the SMAP to send the appropriate "RESUME" to this previously "STOPPED" Origin CM. (See Section 9.3.2. for a more detailed description of the mechanics of CM/Layer to SMAP requests.) When the entire DU is assembled from the arriving DU segments it is then passed to the CM/Session layer. There is no associated DU if the arriving CMIU is a Format 3 DELIVER-RESPONSE. In this case, the CM/Transport layer passes the appropriate RESPONSE parameters (i.e., EXCEPTION-NOTIFICATION or COD NOTIFICATION, Routing Information, etc.) from within the CMIU to the CM/Session layer.

9.2.2.4. CM/Session Layer

This layer of the CM first checks to see if this DU requires QUERY/REPLY correlation. If so, the appropriate environment data is restored and the DU is passed to the local targeted EU. If the timer associated with the original QUERY has already expired, there is no environment data and consequently no way to correlate this DU with the original QUERY. In this case, the CM/Session layer discards the DU.

Whenever any timer expires which is associated with an outstanding origin DU, the CM/Session layer notifies the origin EU and then discards the previously saved associated environment. If there is a "safe stored" DU associated with the environment the CM logs the event according to local system conventions.

In the case of arriving RESPONSE parameters the CM/Session layer attempts to correlate the EXCEPTION or COD response with a previously saved environment. If the associated timer has not expired, the local targeted EU is notified concerning the status of the response along with the original CM-DISTRIBUTION-ID.

There is one exception to this rule. This case is if the origin EU had specified NO NOTIFICATION but FULL ASSURANCE when issuing the SEND of the original DU. In this case, the arriving RESPONSE is actually for the CM/Session layer from the DESTINATION-CM and not for the origin EU. If the RESPONSE is positive, the CM/Session layer will simply dequeue the safe stored DU, discard the previously saved environment and provide no NOTIFICATION to the origin EU that these events had occurred. If on the other hand, the RESPONSE is negative, the CM/Session layer will retry SENDing the DU a locally defined number of times, or, may log the event according to local system conventions.

The CM-DISTRIBUTION-ID facilitates correlation of the response to the original DU. If the associated timer has expired, the CM/Session layer discards any arriving RESPONSE since there will be no possibility of correlating the response to the original DU.

Again, if the original DU had NO NOTIFICATION but FULL ASSURANCE specified, then a positive COD RESPONSE is merely to notify the CM/Session layer that the safe stored DU and associated environment may now be discarded. In the case of a negative COD or an EXCEPTION-NOTIFICATION RESPONSE the CM/session layer may, depending on installation parameters, either retransmit a locally defined number of times, or, may dispose of the DU and log the event according to local system conventions.

In the event that the CM/Session layer has either a DU or a NOTIFICATION to present to the EU, these are passed to the EU via the appropriate API (CMAPI or SMAPI).

9.2.2.5. CMAPI or SMAPI

After initial processing and parsing of the EU RECEIVE command (depending on the implementation, this may occur its either an actual command issued by the EU or by scheduling or dispatching the EU) at one of the two APIs (either CMAPI or SMAPI), the entire Distribution Unit (DU) and associated parameters are passed to the targeted EU.

9.3. CM Management

In consequence of its status as an "application" from the perspective of the Network Protocol Stack, the CMs' associated EU resources and attendant routing structures are unknown to the Network Protocol Stack. Therefore, any standard Network Management products associated with a given Network Protocol Stack are unable (without modification) to manage the CM "Virtual Network" environment and resources. The following subsections summarize the CM management components.

9.3.1. SMAPI and SMAP

In order to provide for central site or local management of the CM "Virtual Network" environment and resources, the CM architecture, as depicted in FIG. 6, will expand to include a "Privileged" Systems Management API (SMAPI) for "Privileged" EUs. The Systems Management Application Program (SMAP) is the most significant privileged EU to be invoked in support of CM Management command type functions. Although other privileged EUs may be developed in the future to support aspects of the CM Management function, the SMAP is the single focal point through which to coordinate the management of the CM "Virtual Network" environment and resources.

9.3.2. MIB

Although privileged EUs utilize the CM Priorities of 0 and 1 through the SMAPI, the SMAP is the only privileged EU to have access to the CM Management Information Base (MIB). The MIB is the local repository for any given CMs' routing tables, timer values, event counters, Load Distribution Records (LDRs), status indicators, Destination CM segment sizes, etc. The structure of the MIB contents is specific to a given local implementation. However, the nature of the contents themselves is architected. This can be done in order to facilitate maintenance of these contents by a Table Server Application and to provide a common systems view of CM table structures for Network Operations.

The Table Server Application can comprise a relational Data Base Management System and is as a privileged EU via the SMAP. The SMAP uses the CM routing table structures to route a request to the Table Server Application (addressed as a "CM.EU") to retrieve MIB table updates. In support of this, each local MIB must, at CM IPL time, contain at least the following: the CM.EU address of the Table Server Application; the associated Adjacent CM path to the above CM.EU; the associated Network Protocol Stack address for the above Adjacent CM path; and the associated maximum CMIU size to be used on the above path.

With the above information the local SMAP can format requests to the Table Server Application for updates or initial loads of additional MIB contents. The local SMAP can initiate these requests either programmatically or as a result of local or even remote console requests.

Programmatic initiation of Table Server requests may occur via the presence of additional MIB contents (beyond those mentioned above) at CM IPL time or via one of the local CM/Layers conditioning the contents of the MIB to indicate a request for MIB update(s). The Table Server may also distribute unsolicited Table updates.

The Table Server Application may include both Locally and Globally accessible Table Servers.

In support of normal Distribution flow (e.g., Destination to Adjacent address resolution, CMIU segment size for DU segmentation, etc.) each CM/Layer accesses the MIB directly so as not to impact throughput adversely. When the CM/Layers note the occurrence of "events" (e.g., thresholds exceeded, arriving CMIUs from certain origins, (counting numbers of CMIUs passing through the local CM/Layers, etc.) which must be recorded but are not components of normal Distribution flow, then the CM/Layers pass this information to the MIB.

See Section 11 for a discussion of the flow of traffic between the management components of the Communications Manager.

10. Communications Flows

This section defines the details of the CM functions in terms of the CM exchange protocol and data flows. It includes a description of the CM protocol, normal data exchange flows, exception data flows and a definition of valid CM message types.

10.1. Normal Flows

This section describes the normal data flows between Communications Managers on behalf of their respective End Users. The normal flow of DUs is between cooperating pairs of EUs. As such, the DUs are launched into the CM "Virtual Network" by an ORIGIN-EU and are forwarded by the ORIGIN-CM to the DESTINATION-CM via an ADJACENT-CM. In some cases the DESTINATION-CM and the ADJACENT-CM are one and the same.

The two major data flow categories are Asynchronous and Synchronous traffic. Asynchronous traffic can have a Delivery Notification of None, Exception or COD and Assurance of Limited or Full. But, Synchronous (QUERY/REPLY) traffic can only have a Delivery Notification of None or Exception and an assurance of Limited or Full. The Asynchronous and Synchronous flows described below also indicate if the process is for a particular Delivery Notification and/or Assurance, i.e. only for COD and Full Assurance.

Figure 12:
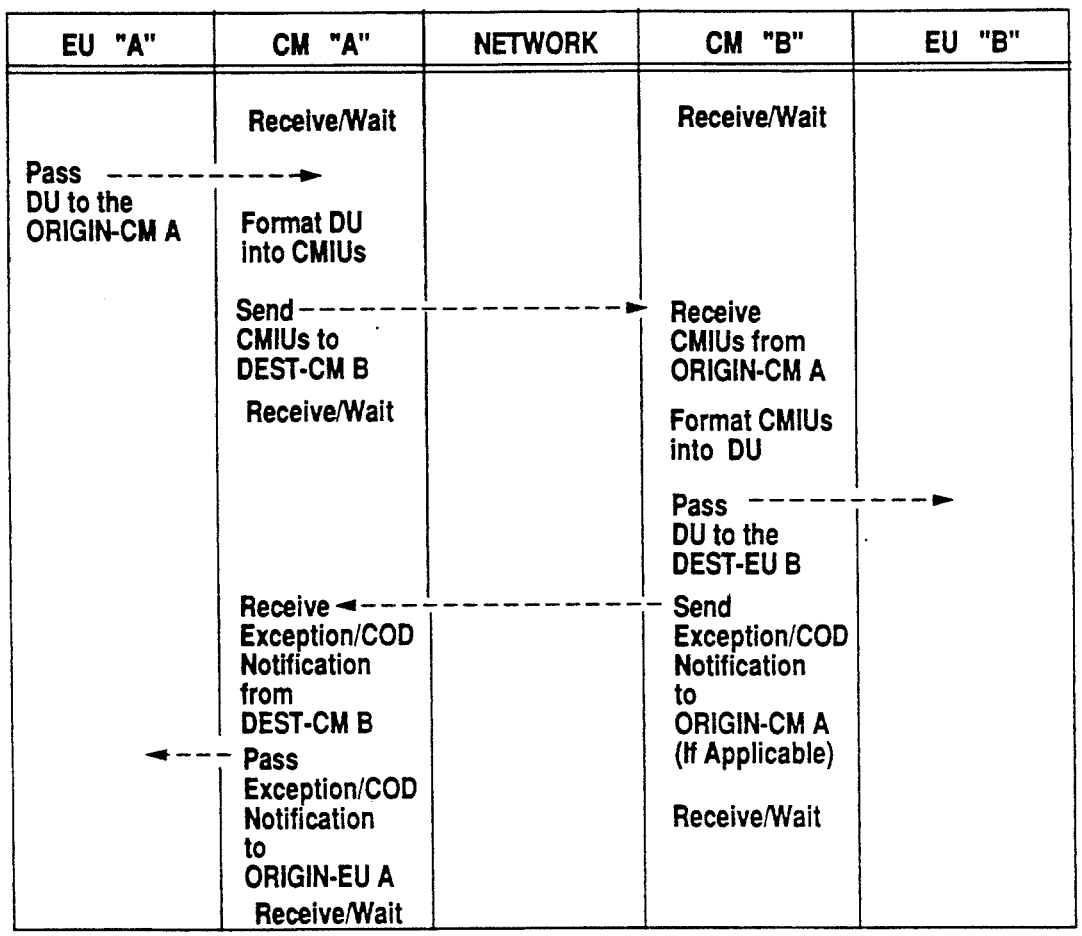
FIG. 12 shows asynchronous traffic flow from one end user to another according to the present invention.

Referring to FIG. 12, the flow of Asynchronous traffic is depicted.

Pass DU to ORIGIN-CM "A":

ORIGIN-EU "A" passes the DU and API parameters to ORIGIN-CM "A" and continues with its processing. ORIGIN-CM "A" verifies the EU parameters and determines that the Destination is CM "B" and EU "B". CM "All then assigns the DU Correlation Identifier (CM-DISTRIBUTION-ID) and queue the DU by Priority and DESTINATION-CM number. ORIGIN-CM "A" retains the DU on queue if Full Assurance was specified by ORIGIN-EU "A".

Format DU into CMIUs:

ORIGIN-CM "A" dequeues the DU and formats it into CMIUs. If the is too large, it is segmented into CMIU sizes that are acceptable to the DESTINATION-CM "B". The CMIUs are then queued by Priority and DESTINATION-CM number. (Refer to Section 13 for CMIU formats, segmentation indicators and sequence/segment numbers.)

Send CMIUs to DESTINATION-CM "B":

ORIGIN-CM "A" determines that the Destination is CM "B" and whether or not connectivity exists. If so, it dequeues and sends the CMIUs to DESTINATION-CM "B" via the Network Protocol Stack.

Receive CMIUs From ORIGIN-CM "A":

DESTINATION-CM "B" is responsible for connectivity with ORIGIN-CM "A". If connectivity exists, DESTINATION-CM "B" receives CMIUs from ORIGIN-CM "A" and queues them by Priority and ORIGIN-CM number.

Format CMIUs into a DU:

DESTINATION-CM "B" dequeues and assembles multiple CMIUs into a DU until the segmentation indicator indicates last or only segment. The DU is then queued by Priority and ORIGIN-CM "A". (Refer to Section 13 for CMIU formats, segmentation indicators and sequence/segment numbers.)

Pass DU to DESTINATION-EU "B":

DESTINATION-CM "B" dequeues the DU, formats the DESTINATION-EU "B" parameters (originally carried in the incoming CMIU) into a locally appropriate parameter list and passes them to DESTINATION "B".

The following steps will only be done if a Delivery Notification of Exception or COD was specified by ORIGIN-EU "A".

Send Exception/COD Notification to ORIGIN-CM "A":

DU Delivered to DESTINATION-EU: DESTINATION-CM "B" sends a positive COD response to ORIGIN-CM "A".

DU Not Delivered to DESTINATION-EU: DESTINATION-CM "B" sends a negative COD or Exception response to ORIGIN-CM "A".

Receive Exception/COD Notification from DESTINATION-CM "B":

ORIGIN-CM "A" receives the Exception/COD Notification from DESTINATION-CM "B". If Full Assurance was requested, the DU is deleted from the queue.

Pass Exception/COD Notification to ORIGIN-EU "A":

ORIGIN-CM "A" passes the Exception/COD Notification to ORIGIN-EU "A".

Figure 13:
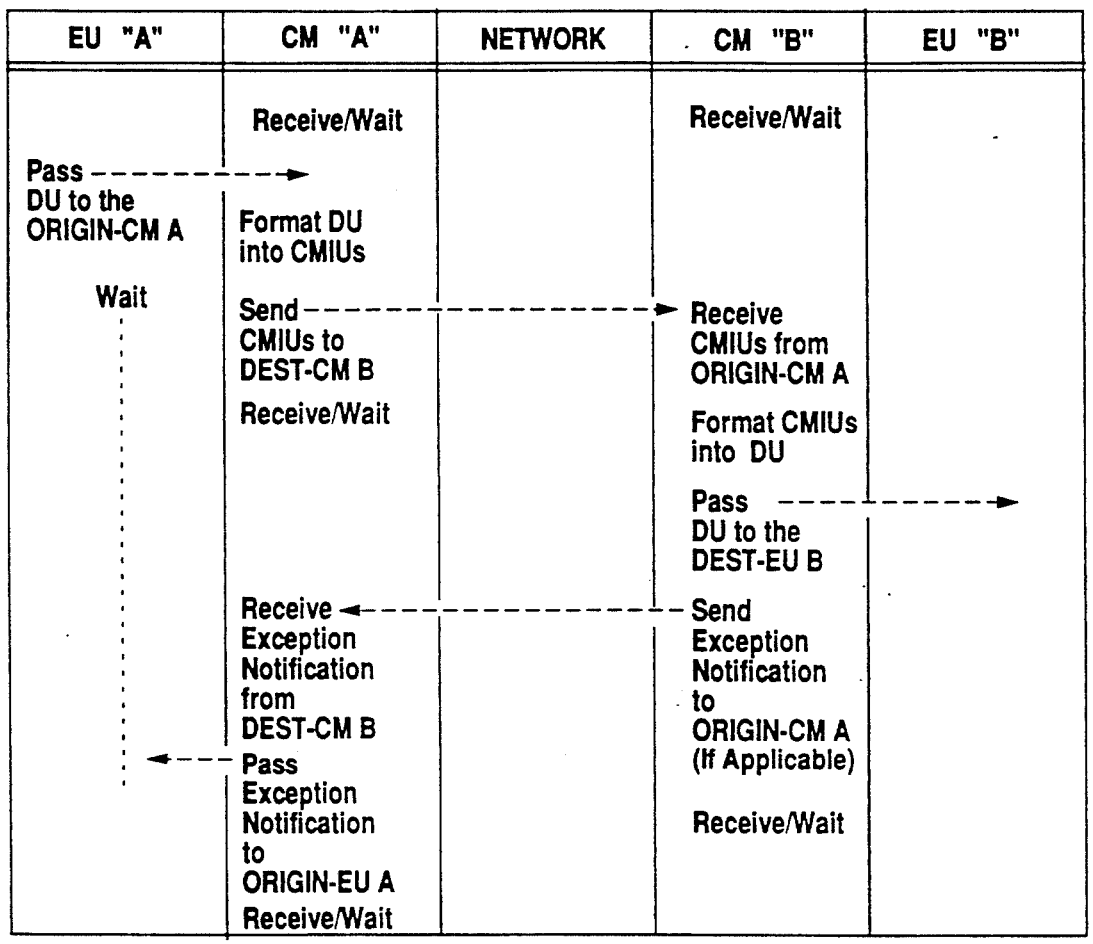
FIG. 13 shows synchronous traffic flow from one end user to another for a query according to the present invention.

Referring to FIG. 13, the flow of Synchronous QUERY traffic is depicted.

Pass DU to ORIGIN-CM "A":

ORIGIN-EU "A" passes the DU and API parameters to ORIGIN-CM "A" and waits for the REPLY. ORIGIN-CM "A" verifies the EU parameters and determines that the Destination is CM "B" and EU "B". Then ORIGIN-EU "A" assigns the DU Correlation Identifier (CM-DISTRIBUTION-ID) and queues the DU by Priority and DESTINATION-CM number.

Format DU into CMIUs:

ORIGIN-CM "A" dequeues the QUERY DU and formats the DU into CMIUs. If the DU is too large, it is segmented into CMIU sizes that are acceptable to DESTINATION-CM "B". ORIGIN-CM "A" then queues the CMIUs by Priority and DESTINATION-CM number. (Refer to Section 13 for CMIU formats, segmentation indicators and sequence/segment numbers.)

Send CMIUs to DESTINATION-CM "B":

ORIGIN-CM "A" determines that the Destination is CM "B" and whether or not connectivity exists. If so, it dequeues and sends the CMIUs to DESTINATION-CM "B" via the Network Protocol Stack.

Receive CMIUs From ORIGIN-CM "A":

DESTINATION-CM "B" is responsible for connectivity with ORIGIN-CM "A". If connectivity exists, DESTINATION-CM "B" receives CMIUs from ORIGIN-CM "A" and queues them by Priority and ORIGIN-CM number.

Format CMIUs into a DU:

DESTINATION-CM "B" dequeues and pieces together the CMIUs into a DU until the segmentation indicator "indicates last or only segment. The DU is then queued by Priority and ORIGIN-CM "A". (Refer to Section 13 for CMIU formats, segmentation indicators and sequence/segment numbers.)

Pass DU to DESTINATION-EU "B":

DESTINATION-CM "B" dequeues the DU, formats the DESTINATION-EU "B" parameters (originally carried in the incoming CMIU) into a locally appropriate parameter list and passes them to the DESTINATION-EU "B".

The following steps will only be done if a Delivery Notification of Exception was specified by ORIGIN-EU "A".

Send Exception Notification to ORIGIN-CM "A":

DESTINATION-CM "B" sends an Exception response to ORIGIN-CM "A" only if it was unable to deliver the DU to the DESTINATION-EU "B".

Receive Exception Notification from DESTINATION-CM "B":

ORIGIN-CM "A" receives the Exception Notification from DESTINATION-CM "B".

Pass Exception Notification to ORIGIN-EU "A":

ORIGIN-CM "A" passes the Exception Notification to ORIGIN-EU "A" when the "Retry" count is exhausted. Note that the ORIGIN-CM may continue re-transmitting it QUERY until the Retry count is reached. This depends on the local CM implementation.

Referring to FIG. 14, the flow of Synchronous REPLY traffic is depicted.

Pass DU to ORIGIN-CM "B":

ORIGIN-EU "B" passes the DU and API parameters to ORIGIN-CM "B" and continue with its processing. ORIGIN-CM "B" verifies the EU parameters and determines that the Destination is CM "A" and EU "A". Then the ORIGIN-EU "B" assigns the DU Correlation Identifier (CM-DISTRIBUTION-ID) and queues the DU by Priority and DESTINATION-CM number.

Format DU into CMIUs:

ORIGIN-CM "B" dequeues the REPLY DU and formats it into CMIUs. If the DU is too large, it is segmented into CMIU sizes that are acceptable to DESTINATION-CM "A". The ORIGIN-CM "B" then queues the CMIUs by Priority and DESTINATION-CM number. (Refer to Section 13 for CMIU formats, segmentation indicators and sequence/segment numbers.)

Send CMIUs to DESTINATION-CM "A":

ORIGIN-CM "B" determines that the Destination is CM "A" and whether or not connectivity exists. If so, it dequeues and sends the CMIUs to DESTINATION-CM "A" via the Network Protocol Stack.

Receive CMIUs From ORIGIN-CM "B":

DESTINATION-CM "A" is responsible for connectivity with ORIGIN-CM "B". If connectivity exists, DESTINATION-CM "A" receives CMIUs from ORIGIN-CM "B" and queues them by Priority and ORIGIN-CM number.

Format CMIUs into a DU:

DESTINATION-CM "A" dequeues and assembles multiple CMIUs into a DU until the segmentation indicator indicates last or only segment. It also re-correlates this REPLY DU to the previously sent QUERY DU. Then it queues the DU by Priority and ORIGIN-CM "B". (Refer to Section 13 for CMIU formats, segmentation indicators and sequence/segment numbers.)

Pass DU to DESTINATION-EU "A":

DESTINATION-CM "A" dequeues the DU, formats the DESTINATION-EU "A" parameters (originally carried in the CMIU) into a locally appropriate parameter list and passes them to the DESTINATION-EU "A".

10.2. CM—CM Protocol

The CM processing to accept a Distribution from an End User, perform the requested API services, and prepare each DU (or segment of a DU) for transmission has been described in previous Sections. Once a DU segment is ready for transmission, a CM protocol is used to exchange the End User information between CMs.

The CM—CM exchange protocol comprises one main activity—DELIVER. A distribution sent by an End User may result in data delivery to a local or remote destination. Additionally, depending on the API Services requested by the originating End User, information relative to the distribution may be returned to the originator. This return information is delivered to the initiating CM with parameters indicating acknowledge or exception notification. The actual data transmission is carried out by the CM/Network Layer and the associated Protocol Stack API (PSAPI).

In addition to DELIVER, the CM protocol supports the adaptive pacing function between adjacent CM/Network Layers. The protocol elements defined to support this pacing function are carried with every CM transmission, however, pacing support is also provided when a distribution segment is not available for transmission. This condition requires the use of an Isolated Pacing Request/Response (IPRQ/PRS).

The process and parameters defining DELIVER and the IPRQ/PRS are described in this Section. The detailed protocol format used to exchange CM data, the CM Interchange Unit (CMIU), is defined in Section 13.

CM functionality beyond DELIVER and IPRQ/PRS is required for CM Management Services. A privileged End User (the Systems Management Application Program (SMAP)), has been defined to support the control and management functions for the CM. This specialized EU sends CM control commands (e.g., Sign-on, Stop/Resume, Segment Size Request, etc.) as Distributions within a predefined Distribution Unit. To the CM, these control commands appear as data only. The SMAP commands and protocol are defined in Sections 10 and 11.

10.2.1. CM—CM Protocol Summary

The activities defined for the CM—CM Protocol exchange are summarized below:

DELIVER: DELIVER supports the exchange of either distribution data or distribution responses.

DELIVER-DISTRIBUTION: Used by CMs to exchange distribution data.

DELIVER-RESPONSE: Used by CMs to exchange response information relative to a distribution or distribution segment. There are 2 types of responses defined:

ACKNOWLEDGE: Used by CMs to confirm delivery of ASYNC Distributions specifying COD. Also used as an "Internal Confirm" to acknowledge correct receipt of fully protected CM distributions which do not have COD requested by the ORIGIN-EU.

EXCEPTION: Used to provide a negative response for undeliverable CMIUs that specified Exception Notification, Confirm on Delivery and/or were fully protected.

ISOLATED PRQ/PRS: Used in support of adaptive pacing between adjacent CMs to manage local resource utilization by controlling the flow of CMIUs.

10.2.2. CM Protocol Description

The following descriptions and tables identify each CM activity; each description begins with an activity name followed by a list of associated operands. The activity operands are defined in two groups, Components and Elements, based on the component field and element subfield constructs utilized in the definition of the CMIU. (Refer to CM Interchange Protocol, Section 13 for detailed CMIU definition.)

In Tables 10.1, 10.2 and 10.3, optional activity operands are enclosed within brackets; required operands are shown without brackets. Operands are not repeatable unless explicitly stated in the activity description.

DELIVER: DELIVER can be represented as either a DELIVER-DISTRIBUTION or a DELIVER-RESPONSE.

DELIVER-DISTRIBUTION: Table 10.1 summarizes the DELIVER-DISTRIBUTION Activity Operands.

TABLE 10.1

DELIVER-DISTRIBUTION ACTIVITY OPERANDS

| ACTIVITY | COMPONENTS | ELEMENTS |
|---|---|---|
| DELIVER-DISTRIBUTION | | |
| | PREFIX | |
| | TRANSMISSION SERVICES | DESTINATION-CM PACING PRQ/PRS ATTRIBUTE LIST ADJCM-NUMBER [LOAD-DISTRIBUTION-VALUE] [DESTINATION-CM-STATIC] [CPU-BUSY-VALUE] |
| | CONTROL | DESTINATION-EU ORIGIN-CM ORIGIN-EU CM-DISTRIBUTION-ID [CORRELATION] [EU-DISTRIBUTION-ID] [RETURN-EU] |
| | [ENVIRONMENT] | |
| | DISTRIBUTION | |

DELIVER-DISTRIBUTION is used to transmit a Distribution from an ORIGIN-CM to a DESTINATION CM. Distributions or Distribution segments are transmitted between CMs wrapped in a CMIU format with DELIVER-DISTRIBUTION control components. DELIVER-DISTRIBUTION is one of the two forms of DELIVER. It is always initiated as a consequence of an End User issued SEND to the CMAPI or "Privileged" End User SEND to the SMAPI.

DELIVER-DISTRIBUTION Component Descriptions

PREFIX (REQUIRED): The PREFIX is a required component for all CM-CM information exchange utilizing the CMIU. It defines the CMIU size and position within a segmented Distribution.

TRANSMISSION SERVICES (REQUIRED): The TRANSMISSION SERVICES component is required for all CMIU exchanges. It identifies the DESTINATION-CM, the CMIU priority, and defines CM—CM flow control parameters. Optionally, Load Distribution parameters are also defined within this component. Transmission Services component of the CMIU provides all that is necessary for Intermediate CMs to perform normal "pass through" routing.

CONTROL (REQUIRED): The CONTROL component is required for all CM DELIVER-DISTRIBUTION exchanges. It identifies the originating CM and defines parameters for CM/Transport and CM/Session Layer services.

ENVIRONMENT (OPTIONAL): The ENVIRONMENT component is optional. This component contains unique operating system control data used within the TPF environment to manage CPU complex to CPU complex load balancing functions.

DISTRIBUTION (REQUIRED): The DISTRIBUTION component contains the actual data distribution (or distribution segment) being transported between End Users.

DELIVER-DISTRIBUTION Element Descriptions

DESTINATION-CM (REQUIRED): The DESTINATION-CM (an element of the TRANSMISSION SERVICES component), in the form of a CM number, identifies the destination CM designated to receive this distribution segment (CMIU). The DESTINATION-CM field may contain a Virtual CM# and may be updated by any CM which has the capability to execute the Intermediate Routing and Distribution (IRD) function when a LOAD-DISTRIBUTION-VALUE is present.

PACING PRQ/PRS (REQUIRED): PACING PRQ/PRS (an element of the TRANSMISSION SERVICES component), defines flow control windows for the inbound and outbound transport protocol stack interfaces. May contain null value(s) but must be present within every transmission. The pacing values are determined and acted upon by the CM/Network Layer.

ATTRIBUTE-LIST (REQUIRED): ATTRIBUTE-LIST (an element of the TRANSMISSION SERVICES component), identifies Distribution processing characteristics. Includes delivery notification (COD, EX, NONE), priority level (0-7), type (QUERY, RELAY-QUERY, REPLY, ASYNC), PDM, assurance and data format (binary, character). The ATTRIBUTE LIST characteristics are specified at the CMAPI or the SMAPI by the End User originating the distribution.

LOAD-DISTRIBUTION-VALUE (OPTIONAL): The LOAD-DISTRIBUTION-VALUE (LDV) (an element of the TRANSMISSION SERVICES component), in the form of a 1 octet field, defines an index used by the CM Load Distribution function to modify the DESTINATION-CM field. When an LDV is present, a DESTINATION-CM-STATIC must also be present. The LDV is provided by the originating End User.

DESTINATION-CM-STATIC (OPTIONAL): The DESTINATION-an-STATIC (an element of the TRANSMISSION SERVICES component), in the form of a CM#, provides for a fixed reference to the originally specified DESTINATION-CM. This field may not be modified by the CM.

CPU-BUSY-VALUE (OPTIONAL): THE CPU-BUSY-VALUE (an element of the TRANSMISSION SERVICES component), contains a value indicative the workload of the sending CM that is physically adjacent to the recipient. It is used to provide information that facilitates a balancing of message load between physically adjacent logical complexes.

DESTINATION-EU (REQUIRED): The DESTINATION-EU (an element of the CONTROL component), in the form of an EU#, identifies the End User designated to receive this distribution segment at the DESTINATION-CM.

ORIGIN-CM (REQUIRED): The ORIGIN-CM (an element of the CONTROL component), in the form of a CM#, identifies the owning CM for the End User originating the distribution.

ORIGIN-EU (REQUIRED): ORIGIN-EU (an element of the CONTROL component), identifies the End User, in the form of an EU#, that issued the SEND for this distribution.

RETURN-EU (OPTIONAL): The RETURN-EU (an element of the CONTROL component), in the form of an EU#, identifies an End User (other than the ORIGIN-EU) designated as the recipient for any requested delivery notification or Query-Reply. The RETURN-EU must reside at the ORIGIN-CM.

CM-DISTRIBUTION-ID (REQUIRED): CM-DISTRIBUTION-ID (an element of the CONTROL component), uniquely identifies a distribution to the ORIGIN-CM. This field is supplied by the ORIGIN-CM and is REQUIRED for every DELIVER-DISTRIBUTION.

EU-DISTRIBUTION-ID (OPTIONAL): EU-DISTRIBUTION-ID (an element of the CONTROL component), is supplied by the originating End User. It is carried intact by the CM on behalf of the End Users and passed intact to the DESTINATION-EU.

CORRELATION (OPTIONAL): The CORRELATION field (an element of the CONTROL component), is used to associate a DELIVER-RESPONSE with a previously sent QUERY distribution. It is required when an EU SENDs a Distribution as a REPLY. In this case, the EU must supply, as an API CORRELATION value, the CM-DISTRIBUTION-ID from the original Query.

ADJCM-NUMBER (REQUIRED) The ADJ-CM NUMBER (an element of the TRANSMISSION SERVICES COMPONENT), in the form of a CM number, identifies the adjacent CM that has constructed this IPRQ/IPRS.

DELIVER-RESPONSE: Table 10.2 summarizes the DELIVER-RESPONSE Activity Operands.

TABLE 10.2

DELIVER-RESPONSE ACTIVITY OPERANDS

| ACTIVITY | COMPONENTS | ELEMENTS |
| --- | --- | --- |
| DELIVER-RESPONSE | | |
| | PREFIX | |
| | TRANSMISSION SERVICES | DESTINATION-CM PACING PRQ/PRS ATTRIBUTE LIST [ADJCM-NUMBER] [CPU-BUSY-VALUE] |
| | CONTROL | DESTINATION-EU ORIGIN-CM ORIGIN-EU [CORRELATION] [EU-DISTRIBUTION-ID] |
| | RESPONSE | ERROR-CM EXCEPTION-CODE DU SEGMENT ID |

DELIVER-RESPONSE is used to return a response, as either a segment acknowledge or exception, to the ORIGIN-CM. DELIVER-RESPONSE, the second form of DELIVER, returns either an ACKNOWLEDGE or an EXCEPTION response to the ORIGIN-CM as identified by the distribution requiring the response. It is always used as a result of an internal CM action in response to an End User initiated SEND—i.e., in association with a DELIVER-DISTRIBUTION.

ACKNOWLEDGE is used in response to a DELIVER-DISTRIBUTION which specified Confirm on Delivery. The DESTINATION-CM will return an ACKNOWLEDGE to the ORIGIN-CM when the full distribution has been delivered to the specified End User. The ORIGIN-CM will then notify the ORIGIN-EU or RETURN-EU of the successful delivery of the Distribution. If only part of a segmented Distribution is received, the DESTINATION-CM will time out after a period of time, and send an EXCEPTION response to the ORIGIN-CM.

ACKNOWLEDGE is also used as a CM-CM confirmation for fully protected Distributions, i.e., as an "Internal Confirm". The DESTINATION-CM returns an ACKNOWLEDGE to the ORIGIN-CM when a fully assembled, protected Distribution has been delivered to the destination End User. The ORIGIN-CM may then release the protected Distribution.

For the case where a Distribution is fully protected and also specifies Confirm on Delivery, the DESTINATION-CM will deliver only one ACKNOWLEDGE to the ORIGIN-EU or RETURN-EU when the fully assembled DU is delivered to the Destination End User. On receipt of the ACKNOWLEDGE, the ORIGIN-CM will release the protected data as well as notify the ORIGIN-EU or RETURN-EU of a successfully delivered Distribution.

EXCEPTION is used to return a negative response to an ORIGIN-CM when a distribution segment is undeliverable and the CMIU indicated any of the following: Exception Notification, Confirm on Delivery, and/or Full Assurance.

As in ACKNOWLEDGE, when a CMIU specifies Exception Notification or Confirm on Delivery AND is fully protected, the CM detecting the error must return an EXCEPTION to the RETURN-EU when the RETURN-EU is not the same as the ORIGIN-EU.

DELIVER-RESPONSE Component Descriptions

PREFIX (REQUIRED): The PREFIX is a required component for all CM-CM information exchange utilizing the CMIU. It defines the CMIU size.

TRANSMISSION SERVICES (REQUIRED): The TRANSMISSION SERVICES component is required for all CMIU exchanges. It identifies the DESTINATION-CM, the CMIU priority, and defines CM—CM flow control parameters. The Transmission Services component of the CMIU provides all that is necessary for Intermediate CMs to perform normal "pass through" routing.

CONTROL (REQUIRED): The CONTROL component is required for all DELIVER-RESPONSE CMIU exchanges. It identifies the originating CM and defines parameters for CM/Transport and CM/Session Layer services.

RESPONSE (REQUIRED): The RESPONSE component is required for all DELIVER-RESPONSE CMIU exchanges. It identifies the reason a response is being returned, i.e., either ACKNOWLEDGE or EXCEPTION. It also provides operands that define the specific reason for the returned RESPONSE.

DELIVER-RESPONSE Element Descriptions

DESTINATION-CM (REQUIRED): The DESTINATION-CM (an element of the TRANSMISSION

SERVICES component), in the form of a CM number, identifies the destination CM designated to receive this distribution segment (CMIU). For DELIVER-RESPONSE CMIUs, the DESTINATION-CM may not contain a Virtual CM#.

PACING PRQ/PRS (REQUIRED): PACING PRQ/PRS (an element of the TRANSMISSION SERVICES component), defines flow control windows for the inbound and outbound transport protocol stack interfaces. May contain null value(s) but must be present within every transmission. The pacing values are determined and acted upon by the CM/Network Layer.

ATTRIBUTE-LIST (REQUIRED): ATTRIBUTE LIST (an element of the TRANSMISSION SERVICES component), identifies Distribution processing characteristics. Includes delivery notification (COD, EX, NONE), priority level (0–7), type (QUERY, RELAY-QUERY, REPLY, ASYNC), PDM, assurance and data format (binary, character). The ATTRIBUTE-LIST characteristics are retained from the original DELIVER-DISTRIBUTION.

CPU-BUSY-VALUE (OPTIONAL): THE CPU-BUSY-VALUE (an element of the TRANSMISSION SERVICES component), contains a value indicative the workload of the sending CM that is physically adjacent to the recipient. It is used to provide information that facilitated a balancing of message load between physically adjacent logical complexes.

DESTINATION-EU (REQUIRED): The DESTINATION-EU (an element of the CONTROL component), in the form of an EU#, identifies the End User designated to receive this distribution segment. It is taken from the RETURN-EU field of the original DELIVER-DISTRIBUTION CMIU. If no RETURN-EU is present, it is taken from the ORIGIN-EU field.

ORIGIN-CM (REQUIRED): The ORIGIN-CM (an element of the CONTROL component), in the form of a CM#, is taken from the DESTINATION-CM field of the original DELIVER-DISTRIBUTION.

ORIGIN-EU (REQUIRED): The ORIGIN-EU (an element of the CONTROL component), in the form of an EU#, is taken from the DESTINATION-EU field of the original DELIVER-DISTRIBUTION.

EU-DISTRIBUTION-ID (OPTIONAL/REQUIRED): EU-DISTRIBUTION-ID (an element of the CONTROL component), is taken from the EU-DISTRIBUTION-ID field, if present, of the original DELIVER-DISTRIBUTION. If present, it must be returned intact by the CM on behalf of End Users.

CORRELATION (REQUIRED): The CORRELATION field (an element of the CONTROL component) is used to associate a RESPONSE with a previously sent distribution. It is required for all RESPONSE distributions. The CORRELATION operand field is supplied by the responding CM and contains the CM-DISTRIBUTION-ID from the original DELIVER-DISTRIBUTION.

ERROR-CM (REQUIRED): The ERROR-CM (an element of the RESPONSE component), in the form of a CM#, identifies the CM originating the RESPONSE command. For EXCEPTION RESPONSES, the ERROR-CM identifies the CM that detected the reported exception. For ACKNOWLEDGE RESPONSEs, the ERROR-CM and the ORIGIN-CM will be the same.

EXCEPTION-CODE (REQUIRED): The EXCEPTION-CODE (an element of the RESPONSE component), is used to specify detail relative to the successful or unsuccessful completion of processing for the correlated DELIVER-DISTRIBUTION.

DU-SEGMENT-ID (REQUIRED): DU-SEGMENT-ID (an element of the RESPONSE component), identifies the specific segment of the correlated DELIVER-DISTRIBUTION with which this RESPONSE is associated.

ADJCM-NUMBER (REQUIRED) The ADJ-CM NUMBER (an element of the TRANSMISSION SERVICES component), in the form of a CM number, identifies the adjacent CM that has constructed this IPRQ/IPRS.

ISOLATED PACING REQUEST/RESPONSE (IPRQ/PRS): Table 10.3 summarizes the ISOLATED PACING REQUEST/RESPONSE Activity Operands.

TABLE 10.3

| ISOLATED PACING REQUEST/RESPONSE | | |
|---|---|---|
| ACTIVITY | COMPONENTS | ELEMENTS |
| ISOLATED PACING REQUEST/ RESPONSE | | |
| | PREFIX | |
| | TRANSMISSION SERVICES | DESTINATION-CM PACING PRQ/PRS [CPU-BUSY-VALUE] ADJCM-NUMBER |

The ISOLATED PACING REQUEST/RESPONSE is exchanged between adjacent CMs to manage local resources. The adjacent CMs control the flow of CMIUs using the adaptive pacing mechanism defined in Section 6. The pacing window is determined by CM Management parameters in conjunction with local resource utilization processes. Pacing information is "piggy-backed" on all CMIUs that flow between adjacent CMs, however, the IPRQ/PRS command format is utilized whenever a flow control exchange is required and there are no distribution CMIUs available for transmission.

Isolated PRO/PRS Component Description

PREFIX (REQUIRED): The PREFIX is a required component for all CM-CM information exchange utilizing the CMIU. It defines the CMIU size.

TRANSMISSION SERVICES (REQUIRED): The TRANSMISSION SERVICES component is required for all CMIU exchanges. It identifies the CMIU as an Isolated Pacing Request/Response.

Isolated PRQ/PRS Element Description

DESTINATION-CM (REQUIRED): The DESTINATION-CM (an element of the TRANSMISSION SERVICES), in the form of a CM number, identifies the destination CM designated to receive this IPRQ/IPRS.

PACING PRQ/PRS (REQUIRED): PACING PRQ/PRS (an element of the TRANSMISSION SERVICES component), defines flow control windows for the inbound and outbound transport protocol stack interfaces.

CPU-BUSY-VALUE (OPTIONAL): THE CPU-BUSY-VALUE (an element of the TRANSMISSION SERVICES component), contains a value indicative the workload of the sending CM that is physically adjacent to the recipient. It is used to provide information that facilitated a balancing of message load between physically adjacent logical complexes.

ADJCM-NUMBER (REQUIRED) The ADJ-CM NUMBER (an element of the TRANSMISSION SERVICES component), in the form of a CM number, identifies the adjacent CM that has constructed this IPRQ/IPRS.

No other elements are valid for an IPRQ/IPRS command.

10.2.3. CM Protocol Activity Flows

A simple CM—CM protocol flow reflecting DELIVER-DISTRIBUTION and DELIVER-RESPONSE is illustrated in FIGS. 15A and 15B.

In FIG. 15A, the EU has a 2 Segment, COD Distribution to SEND. In FIG. 15B, the EU has a single segment Distribution to SEND. The EU wants notification (Exception-Notification) if the data is not delivered.

The flow shown in FIG. 16A illustrates the CMIU Query/Reply and FIG. 16B illustrates Query/Relay-Query/Reply correlation.

In FIG. 16A an End User at CM "All SENDs a QUERY to a Destination End User at CM "B". CM "A" identifies the QUERY CMIU as A1111 in the CM-DISTRIBUTION-ID. The End User at CM "B" returns a QUERY/REPLY which CM "B" has identified as B1111. In addition to the CM "B" identifier, the CMIU contains a CORRELATION value, supplied by the "REPLYing" End User, which is the CM-DISTRIBUTION-ID from the original QUERY. CM "A" used the CORRELATION (A1111) to match the "REPLY" with the original QUERY and returns the "REPLY" to the QUERYing End User.

In FIG. 16B, the DESTINATION-EU passes the original CM-DISTRIBUTION-ID (A1111) to CM "B", which uses this CM-DISTRIBUTION-ID as the CMIU identifier during the relay to CM "C". The DESTINATION-EU requests that CM "C" SEND a REPLY, just as CM "B" did in the QUERY/REPLY example above. The REPLY CMIU is delivered to CM "A" where it is CORRELATED with the original A1111 QUERY.

10.3. Message Types

The CM supports four basic message types QUERY, REPLY, RELAY-QUERY, and ASYNC. Additionally, messages can be specified to have full or no assurance, timer or no timer, or various levels of delivery notification. However, not every possible combination of message type and attributes constitutes a valid message. Tables 10.4, 10.5, 10.6, and 10.7 that follow summarize which of the possible combinations are valid and gives a synopsis of how the CM should deal with each of the valid messages.

TABLE 10.4
QUERY MESSAGE

| Message Type | Timer | Delivery Notification | Assurance | Valid Message | CM Action | CM Returns |
|---|---|---|---|---|---|---|
| Query | No | None | Limited | No | | |
| | No | None | Full | No | | |
| | No | Exception | Limited | No | | |
| | No | Exception | Full | No | | |
| | No | COD | Limited | No | | |
| | No | COD | Full | No | | |
| | Yes | None | Limited | Yes | Send once | Notify on time out |
| | Yes | None | Full | No | | |
| | Yes | Excep- | Limited | Yes | Send | Return |

TABLE 10.4-continued
QUERY MESSAGE

| Message Type | Timer | Delivery Notification | Assurance | Valid Message | CM Action | CM Returns |
|---|---|---|---|---|---|---|
| | | tion | | | while not time out -[OR]- Send once | time out -[OR]- Return time out or exception |
| | Yes | Exception | Full | No | | |
| | Yes | COD | Limited | No | | |
| | Yes | COD | Full | No | | |

TABLE 10.5
REPLY MESSAGE

| Message Type | Timer | Delivery Notification | Assurance | Valid Message | CM Action | CM Return |
|---|---|---|---|---|---|---|
| Reply | No | None | Limited | Yes | Send once | Returns nothing |
| | No | None | Full | No | | |
| | No | Exception | Limited | No | | |
| | No | Exception | Full | No | | |
| | No | COD | Limited | No | | |
| | No | COD | Full | No | | |
| | Yes | None | Limited | No | | |
| | Yes | None | Full | No | | |
| | Yes | Exception | Limited | No | | |
| | Yes | Exception | Full | No | | |
| | Yes | COD | Limited | No | | |
| | Yes | COD | Full | No | | |

TABLE 10.6
RELAY-QUERY MESSAGE

| Message Type | Timer | Delivery Notification | Assurance | Valid Message | CM Action | CM Returns |
|---|---|---|---|---|---|---|
| Relay-Query | No | None | Limited | Yes | Send once | Returns nothing |
| | No | None | Full | No | | |
| | No | Exception | Limited | No | | |
| | No | Exception | Full | No | | |
| | No | COD | Limited | No | | |
| | No | COD | Full | No | | |
| | Yes | None | Limited | No | | |
| | Yes | None | Full | No | | |
| | Yes | Exception | Limited | No | | |
| | Yes | Exception | Full | No | | |
| | Yes | COD | Limited | No | | |
| | Yes | COD | Full | No | | |

TABLE 10.7
ASYNC MESSAGE

| Message Type | Timer | Delivery Notification | Assurance | Valid Message | CM Action | CM Returns |
|---|---|---|---|---|---|---|
| ASYNC | No | None | Limited | Yes | Send once | Returns nothing |
| | No | None | Full | Yes | Send until delivered or exceeds retry count | Returns nothing, log error according to local system convention |
| | No | Exception | Limited | Yes | Send once | Return exception |
| | No | Exception | Full | Yes | Send until delivered | Return exception |

TABLE 10.7-continued

| | ASYNC MESSAGE | | | | |
|---|---|---|---|---|---|
| Message Type | Timer | Delivery Notification | Assurance | Valid Message | CM Action | CM Returns |
| | No | COD | Limited | Yes | Send once or exceeds retry count | Return delivery notice, if one is returned by DEST-CM, or exception |
| | No | COD | Full | Yes | Send until delivered or exceeds retry count | Return delivery notice, if one is returned by DEST-CM, or exception |
| | Yes | None | Limited | No | | |
| | Yes | None | Full | No | | |
| | Yes | Exception | Limited | No | | |
| | Yes | Exception | Full | No | | |
| | Yes | COD | Limited | No | | |
| | Yes | COD | Full | No | | |

11. Communications Manager Management Services

11.1. Introduction

The Communications Manager of the present invention performs services as requested by End Users in the exchange of distributions. In support of this process, the CM environment is controlled by a set of structured functions which provide for the management of the Communications Manager. Among the functions identified for management consideration are change and configuration management, fault management, alert and notification management, performance measurement, accounting statistical collection and management, and security. All CM Management functions are processed by the Systems Management Application Program (SMAP). These functions can be initiated by either CM internal events, or external interfaces such as the console operational interface.

11.2. Systems Management Application Program

The Communications Manager is controlled and managed by the Systems Management Application Program (SMAP). The SMAP process is divided into two separate functions; the manager function (the Director), and the managed function (the Agent). The SMAP provides management by grouping a resource to be managed into a logical set of characteristics (attributes) called a managed object. Specific sets of managed objects are controlled by the Agent function of the SMAP process. In turn, sets of Agent functions are controlled by a Director process. This provides both a distribution of management functions throughout the Communications Manager environment, and a hierarchy of control for management functions. This distinction also provides for a level of abstraction in the control mechanism between a Director and an Agent. The Director understands the logical grouping of the managed objects and their attributes, and also the logical sets of management functions that can be applied to them. The Agent also understands this logical view of the managed objects and attributes, but also understands the specific implementation details and processes present at each of the different operating system environments where the Communications Manager resides.

The abstracted control mechanism between the Director and the Agent is realized through a set of command primitives that can be issued by each function. These command primitives are Initiate, Terminate, Abort, Event-Report, Get, Set, Create, Delete, Action, and Cancel-Get.

The commands that can be applied to specific managed objects are governed by the condition of the managed object at that point in time. This condition is known as the state of the object. There are two distinct types of conditions under which the managed objects operate; the administrative state, and the operational state. The administrative state of the object is controlled by the Director process; the operational state of the object is controlled by its environment and operation.

11.3. SMAP to SMAP

SMAPs drive the management function in the local CM environment and/or exchange CM control and management commands with other SMAPs.

A SMAP and the local CM Layers communicate via the Management Information Base (MIB) linkages. The MIB is the local repository on information about managed resources. SMAPs communicate with other SMAPs by formatting commands and responses in the Systems Management Exchange Protocol which is carried as, a Distribution within the CMIU (i.e., the SMAP is an EU). The originating SMAP formats the command into a Systems Management Distribution Unit (SMDU), in the agreed upon management format, and passes it to the CM via the privileged API known as the Systems Management Application Program Interface (SMAPI). The CM then delivers the SMDU to the destination SMAP EU.

11.3.1. Operational Interface to SMAP

CM Management functions may be locally initiated by an operational console interface. A console request is processed by the Director function of the SMAP. The Director determines the Agent that must perform this command and transmits the command to that Agent. This Agent may be locally co-resident with the Director, or it may be remote. In each case the Director formats the command and passes it via the CM network to the Agent. Both the Director and the Agent processes are logically independent End Users, and are addressed separately. The operational interface commands override any previously issued commands whether operationally or programmatically initiated.

11.3.2. Exchange Protocol

The exchange of Control and Management data between SMAPs is accomplished using a defined Systems Management Exchange Protocol which is carried as a Distribution Unit in the CMIU. The structure of this Systems Management Distribution Unit (SMDU) includes a series of self-defining fields that may themselves be broken into self-defining subfields or mapped binary strings. The specific format chosen is the implementation of the Binary Encoding rules for the Abstract Syntax Notation One (ASN.1) published by The International Organization for Standards (ISO) (publication no. ISO 8824 (1987)), the disclosure of which is incorporated herein by reference.

11.3.3. Systems Management Application

The SMAP includes the monitoring, control and coordination of the Communications Manager and its resources. SMAP will use the constructs of the managed object and its attributes to affect that management. For Communications Manager management, there is a single "management functional domain"; the functional areas of fault, configuration, accounting, performance, and security management are handled within the same management process.

All Communications Manager management Agents; and Directors are specific instances of the CM Systems Management Application Program (SMAP). In Communications Manager terms, each specific instance is a separate Privileged End User, and as such, each is uniquely addressable with CM addressing constructs. The level of functionality for each SMAP instance is defined by their place in the management schema hierarchy. The Systems Management Application can take on two distinct functional roles: the manager role as a Director; or the managed role as an Agent. By definition, Agents have minimal independent intelligence. Agents only react to directions from the Director or to changes in the MIB. Directors have intelligence to control their Agents, and to react to alarms and notifications from their Agents.

The functions of formatting management information and of transporting the management information between management functions is based on the OSI Common Management Information Protocol (CMIP) (ISO publication no. DIS 9595 PDAD 2 (1989)), the ISO Common Management Information Service Element (CMISE) (ISO publication no. DIS 9595 (1988)), and the OSI Remote operations Service Element (ROSE) standards (ISO publication no. DIS 9072-1.2 (1989)), the disclosure of each of which are incorporated herein by reference. The interface to these functions is structured in the form of CMISE primitives.

In the role of the Director, the SMAP process provides the local operator console function. The control of the operator console and the format of the operator-provided messages is the Director's responsibility. The Director provides the functions required for logging received Event Reports and Alarms. It provides operator commands for the starting, stopping, and displaying of the logging function, and for the display of individual entries in the log. The Director has logic to provide for managing the Communications Manager logical environment. The Director provides the decision making process for acting on Event-Reports. The Director also provides the routing of commands, when permissible, from Director to Director.

In the role of the Agent, the SMAP process provides the direct operational interface to a Communications Managers MIB, and responds to the appropriate commands from the Agent's controlling Director. The Agent is responsible for generating Event Report notifications based on parameters in the MIB, and sends these reports to its controlling Director. The Agent also has responsibility for establishing associations with its adjacent Communications Manager partners. The SMAP Agent has a minimal security process.

11.3.4. SMAP Director

The SNAP Director process provides several distinct functions:

1) Operator's Console—the operator interface to the local operating environment is controlled by this function. The operator's console function transforms the operator commands into the appropriate CMISE verbs to obtain information about a particular Communications Manager and its attribute. The SMAP Director function utilizes the services of the CMISE function to obtain and change any Agent information.

2) Local database access—the Director provides the access to the local Data Base Management System where required to support other functions; e.g., the writing of received Event Reports to a local Log file. The Director is responsible for translating between the local data representation and the CMISE data encodings of objects and attributes.

3) Systems Management Services:

Event Notifications—the Director accepts event notifications from its Agents. These events may be logged in a local Log file, depending on local implementation conventions. Each event report may also be reported to an operator console, again depending on local implementation conventions, and appropriate management filters.

Alarm Notifications—the Director accepts alarm notifications from its Agent. These alarms are logged in a local Log file, and are reported to the operator console. Alarm Notifications are a specific type of Event Notifications.

Security—The command primitives, M-Set, M-Create, M-Delete, and M-Action, issued to an Agent contain an access control key passed by that Agent to the controlling director during the relationship initiation process. All other commands contain a predefined READ-ONLY access control key.

4) Domains of Control:

Directors can relate to one another in either a peer to peer manner, or in a master—slave hierarchical relationship.

A Director controls a set of management entities in a peer to subordinate type of hierarchy. The systems management application will place the managed object's Director as close to the managed object as possible. However, the control of the Agent can be switched between different Directors to effect both local and remote control of the managed objects; for example, a central Director can assume control of any Agents required for centralized management.

Each Agent will be responsible for its managed objects only. How these managed objects fit into a system of managed objects, and how they correlate to one another, is the responsibility of its Director.

There is a one-to-one relationship between an Agent and its Director. Each Agent has only one controlling Director at a time; however, these Directors may be different over time. Conversely, one Director will typically be responsible for many different Agents at the same time.

11.3.5. SMAP Agent

In the Director—Agent model, the Agent is the control process for the managed object. This control process includes: 1) obtaining information from the MIB in response to commands from the Agent's Director; 2) placing new or changed information in the MIB in response to commands from the Agent's Director; and 3) reacting to information set in the MIB by the Communications Manager itself. Managed objects have a set of attributes assigned to them. These attributes include management relationships, counters, threshold values, status flags, event flags, control flags, filters, tables, time entries, and descriptive information.

Agent and Director communication—Information is transmitted between Directors and Agents (in any combination) in a standardized encoding Format. This format is defined in Abstract Syntax Notation One (ASN.1) and transmitted in the Basic Encoding Rules for ASN.1 format. The Systems Management process translates between the local instance of this information, for example the MIB or the local DBMS, and BER encoding- These encodings are formatted as Distribution Units in the SMDU format and are transmitted between the Director and the Agent by the Communications Manager. However, for those special instances where both the Director and the Agent are locally co-resident in the same operating system environment, the transmission between the two may be locally implemented, but must use the ROSE and CMIP Protocol Data Units (PDU's), and BER encodings.

MIB interaction—The Agent obtains information from the MIB in response to a M-GET command primitive received from the Agent's controlling director. This command identifies the managed object and the appropriate attributes to be obtained from the MIB. The Agent places information in the MIB in response to the M-Set, the M-Action, or the M-Create command primitives. These commands identify the specific managed objects and attributes to either be replaced, be added, or be modified in the MIB.

M-Action commands—M-Action commands cause the Agent to perform a set of predefined actions. The only independent process of the Agent is to look for event flags that are triggered by the Communications Manager and set in the MIB. The Agent creates the appropriate M-Event-Report command and forwards it to his controlling Director.

The Agent is the only management process that has direct access to the Management Information Base that contains these managed objects. The Agent is a logically independent process from the Communications Manager, and communicates with the Communications Manager via the MIB. Both the Communications Manager and the Agent have access to information in the MIB, however they process this information differently. For example, the Communications Manager will set status flags in the MIB, and the Agent will read these flags in response to a M-Get command from its Director. From the opposite perspective, the Agent can set any control flags (again under control of a M-Set from its Director), and the Communications Manager only reads these flags.

Counters are attributes that are handled differently. The Communications Manager can increment or decrement counters; the Agent can read or set the counters under control of the Agent's director.

11.4. Managed Object

The management model describes an environment in terms of the resources (objects) that must be managed, and the characteristics (attributes) of the resources to be managed. Objects are divided into classes and subclasses. The managed objects that have been defined for the Communications Manager include Destination Communications Manager; Local Communications Manager; End User; End User Mnemonic; Protocol Stack Service; Protocol Stack Pipe; Queue Management; Queued Item; Event Record; Add Value Record; Alarm Record; Attribute Change Record; Deenrol Object Record; Enrol Object Record; Reenrol object record; Remove Value record Event Log.

There are two principles that determine how objects are related to one another: hierarchy and containment.

Hierarchy is the principle whereby one managed object can be derived from another, both its attributes and behaviors. A definition of a managed object and its attributes and behaviors is called a class of managed object. Additional managed object definitions that build on a class of managed objects are called subclasses. These subclasses inherit the attributes, but not the attribute values, and behaviors of the class that they build on (which is called superclass). The subclasses can also provide additional attributes and behaviors to further refine the definition of the resources that they represent. For example, a car may be considered a class of object, with subclasses of ar objects being Rolls-Royces and Fords.

Containment is the principle that describes how objects are associated for their management. Objects of unrelated classes can be associated through management control. For example, a safe may be an object of a specific class that is managed and it may contain money and document objects, which are unrelated classes. If a safe is locked, then the money and document contained within it are locked. One way of describing the containment principle is to say that one object "owns" other objects of the same or unrelated classes for the purposes of management.

11.4.1. Object Descriptions

LOCAL Communications Manager: This is the description of a Communications Manager in its native environment. The Communications Manager managed object that represents the local instance of the Communications Manager is called a local CM. The Local CM, along with the SMAP Agent and the Management Information Base (MIB), comprise an Entity managed by a Director. The MIB contains the attributes that define this Communications Manager.

DESTINATION Communications Manager: This is a relational object that describes the relation of two managed objects. In this case two different Communications Managers. It is called a Destination Communications Manager because it is a possible destination of traffic from the Local Communications Manager. Since it may also be a source of traffic, no direction of flow is to be implied. This relational object is owned by the Local Communications Manager, because changes to the Local CM can change relationships to all other Communications Managers.

One of the key attributes of this class of objects is the path description. If the destination is adjacent, the path description contains a Protocol Stack Pipe reference, and parameters for regulating traffic between the two Communications Managers. If the Destination is not adjacent, the path description only contains a reference to an adjacent Destination Communications Manager. An Adjacent Communications is the first Communications Manager on the path to the destination.

Virtual Communications Managers represent groups of Communications Managers which contain functionally equivalent End Users. Their path description will contain references to all group members and a method for route selection.

END USER: Individual instances of this class of objects are owned by individual instances of Destination Communications Managers. If the Destination Communications Manager is not accessible, then all of its member End Users are not accessible.

END USER MNEMONIC: Any Instance of an End User may contain one or more instances of EU Mnemonics. Most attribute values of this class are inherited from the owning instance of the End User class.

PROTOCOL STACK SERVICE: These objects describe the Local Communications Managers relationship to providers of various Protocol Stack Services. There would normally be one instance of this object for each type of Protocol Stack service locally provided.

PROTOCOL STACK PIPE: These objects describe each possible physical connection used by the Communications Manager. Each instance is owned by the type of service the pipe provides. This allows connections to be individually managed, or managed at a global level based on type of connection.

QUEUE MANAGEMENT OBJECT: Queues may exist at many levels, and are always owned by some other object. Instances are identified by their purpose and priority. They may come into existence spontaneously and may cease to exist when the queue is drained.

QUEUE ITEM: This object class describes items in a queue. They are always owned by a queue instance.

EVENT RECORD: This object class describes event records received from an Agent. The individual objects in this class are Add Value, Alarm, Attribute Change, Deenrol, Enrol, Reenrol, and Remove Value.

EVENT LOG: This object class describes the record used to log Event Records.

11.4.2. State Mechanics

Central to any standardized management process, is a standardized concept of the ability of managed objects to perform their desired functions. By providing a standard model for the operation of objects, the operation of diverse objects can be understood by a common management process. This standardized model is called the state machine model. Two types of states are described in the model. The ADMINISTRATIVE STATE which is set by the director to control the operation of objects. The OPERATIONAL STATE is controlled by the supporting environment and is read only to the management process.

The administrative state settings are UNLOCKED (available for use), LOCKED (not useable), and SHUTTING DOWN (complete work in progress then change to LOCKED). The administrative state is settable for the Local Communications Manager, and for each instance of the Destination Communications Manager, End User, Protocol Stack Service and Protocol Stack Pipe. End User Mnemonics inherit their administrative state value from their owning End User Instance, and Queue Objects and Items are always considered unlocked.

The operational State settings are more complex, because they may be derived from circumstances outside the Communications Manager management process. The following subsections describe the methodology for deriving the Operational State of the various Communications Manager objects.

11.4.2.1. Disabled Operational State

LOCAL Communications Manager: A managed object is DISABLED if it not accessible, or has insufficient resources for normal operation. It may be very difficult to see a Local CM in DISABLED state simply because it cannot report this information to the Director. The most common reason would be during the time required for setting up the local operational MIB during system or task restart. This state could only be reported in those implementations that the Director and the Agent are co-resident and communicate through some local mechanism.

DESTINATION Communications Manager: The operational State of a Destination Communications Manager is accessed through its path description. If the path description contains a single Adjacent Communications Manager reference, the operational State is equal to that of the referenced Adjacent Communications Manager. If the path lists several Communications Managers), it is equal to the most restrictive of any CM listed.

Adjacent destinations examine the referenced Protocol Stack Pipe. If the Pipe instance is not operational, the Destination CM is DISABLED; in all other states the pipe is considered to be operating normally.

END USER: The EU is considered DISABLED if its owning CM is LOCKED or DISABLED.

END USER MNEMONIC: The Operational State will be inherited from the owning instance of the End User class.

PROTOCOL STACK SERVICE: Since the various protocol stack services are supported uniquely within each platform, the determination of Operational State will have to be left to local conventions.

PROTOCOL STACK PIPE: DISABLED means the connection is not available for use by the Communications Manager.

QUEUE MANAGEMENT OBJECT: There is no method for identifying a queue as disabled.

QUEUE ITEM: Can never be DISABLED.

11.4.2.2. Enabled Operational State

LOCAL Communications Manager: ENABLED means the Communications Manager is now fully operational, but has not handled non-SMAP End User traffic since DISABLED state.

DESTINATION Communications Manager: For non adjacent Destinations CMs, the state is read from the adjacent CM in the path description. For adjacent destinations, the operational State of ENABLED occurs when the Protocol Stack Pipe is operational, but the two Communications Managers are not allowing non-SMAP End User traffic to flow. The change in state is performed by the Agents of two adjacent Communications Managers establishing a CM to CM relationship via the M-Initiate command primitive.

The M-Initiate between Adjacent CMs resembles a Director to Agent M-Set command in that it contains one or mole attribute values to be set, or compared for a match. The difference is that these are recommended settings in a peer to peer relationship, rather than a command to change. The response carries the agreed to attribute values. The attribute being negotiated between the two Destination CM object descriptions is the Operational State. The agent sending the M-Initiate will propose it be set to ACTIVE, and if agreeable, the response also contains an ACTIVE Operational State attribute. If the other adjacent Communications Manager is at an administrative state of LOCKED, the agent will respond with states of LOCKED ENABLED. In cases where both adjacent Communications Managers are attempting to establish the relationship, the Communications Manager with the lowest number takes precedence.

Some Communications Managers will require this renegotiation of the relationship every time a Pipe connection is established. Others may maintain this conceptual session over multiple Pipe outages. In this case, the Operational State would transition directly from DIS- ABLED to ACTIVE when Pipe connections are reestablished. This distinction will be a part of the attributes for the local Communications Manager.

In situations where the relationship is ended via M-Terminate or M-Abort, it is the administrative state that is set to SHUTTING DOWN or LOCKED. This change in the administrative state will automatically cause the Operational State to return to the ENABLED state. For those environments that attempt to automatically establish Communications Manager sessions, and to prevent repeated fruitless attempts at reestablishing a currently unwanted relationship, the M-Terminate/Abort will also request setting a local session control indicator to false. This assigns control of the relationship to the originator of the M-Terminate or M-Abort and prevents the other system from automatically retrying the session establishment.

END USER: The Operational State is ENABLED if the owning CM is accessible, but the EU is not believed to have sent or received any traffic.

END USER MNEMONIC: The Operational State are inherited from the owning instance of the End User class.

PROTOCOL STACK SERVICE: Since the various protocol stack services are supported uniquely within each platform the determination of Operational State has to be left to local conventions.

PROTOCOL STACK PIPE: The ENABLED state exists from the time a connection is first established until is actually used to flow Communications Manager traffic.

QUEUE MANAGEMENT OBJECT: The ENABLED state indicates an empty queue.

QUEUE ITEM: The ENABLED state describes an empty slot in a queue.

11.4.2.3. Active Operational State

LOCAL Communications Manager: This is the normal state of a Communications Manager. All processes are running normally and there are no resource constraints.

DESTINATION Communications Manager: When traffic is flowing freely, the Operational State is ACTIVE. For non adjacent, the state is read from the adjacent in the path description.

END USER: ACTIVE is the default state of all accessible EUs. If traffic flow can be determined, the ACTIVE state should only be reported for active End Users.

END USER MNEMONIC: The Operational State is inherited from the owning instance of the End User class.

PROTOCOL STACK SERVICE: Since the various protocol stack services are supported uniquely within each platform, the determination of Operational State has to be left to local conventions.

PROTOCOL STACK PIPE: The ACTIVE state indicates that this physical connection is operating normally.

QUEUE MANAGEMENT OBJECT: ACTIVE may be the only visible state for queues that are created spontaneously.

QUEUE ITEM: ACTIVE state represents a queue item in use, and may be the only possible state for most.

11.4.2.4. Busy Operational State

LOCAL Communications Manager: If resource thresholds have now constrained the ability of the local CM to accept work, the CM is considered BUSY.

DESTINATION Communications Manager: When adjacent flow control has closed the pacing window, an adjacent Destination CM is BUSY. For non adjacent, the state is read from the adjacent CM in the path description.

END USER: Locally resident EUs may be reported as busy if this is a legitimate characteristic of its relationship to the Communications Manager.

END USER MNEMONIC: The Operational State will be inherited from the owning instance of the End User class.

PROTOCOL STACK SERVICE: Since the various protocol. Stack services are supported uniquely within each platform, the determination of Operational State will have to be left to local conventions.

PROTOCOL STACK PIPE: If a BUSY status for a connection is locally valid, it may be reported with this Operational State value.

QUEUE MANAGEMENT OBJECT: BUSY reflects a queue full condition.

QUEUE ITEM: Not possible.

11.5. Information Flows

In the Communications Manager Systems Management Application Program (SMAP) environment there are four basic information flows: a) between the Directors and SMAP Agents; to between the SMAP Agents and Directors; c) between the Directors; and d) between the Agents.

11.5.1. Between the Directors and SMAP Agents

The Director issues commands (M-Get, M-Set, M-Action, M-Create, M-Delete) to the SMAP Agent. The Director accepts the responses to these commands from the Agent and also accepts and processes the M-Event-Report and the M-Initiate commands from the Agent. The Director can also issue or accept the M-Terminate and the M-Abort commands. These commands are transported by the Communications Manager, or, when Agents and their Director are locally co-resident, by local convention. The Directors and SMAP Agents communicate via the Communications Manager, using the services of the Common Management Information Service Element (CMISE) and Remote Operations Service Element (ROSE) to format the DU portion of the SMDU.

11.5.2. Between SMAP Agents and Directors

The SMAP Agent issues the M-Event-Report and the M-Initiate commands. The Agent responds to the M-Get, M-Set, M-Action, M-Create, and M-Delete commands issued by the Director. The Agent can also issue or accept M-Terminate and M-Abort commands. These Commands are transported by the Communications Manager, or, when Agents and their Director are locally co-resident, by local convention. The Directors and SMAP Agents format the DU portion of the SMDU by using the services of the Common Management Information Service Element (CMISE) and Remote Operations Service Element (ROSE).

11.5.3. Between the Directors

Information exchanges between Directors is transported by the Communications Manager. The Directors communicate as Privileged End Users and utilize the Communications Managers SMAPI. All information exchanges use the services of CMISE and ROSE to properly format the data. There is no formal association established between Directors; they simply have an End User to End User dialogue.

11.5.4. Between the Agents

The only direct information exchange between Agents is the establishing of an association between adjacent Communications Managers. In this case, only the M-Initiate, M-Terminate, and M-Abort commands are valid. Command and control exchanges between the SMAP Agents are transported by the Communications Manager. The SMAP Agents will communicate as Privileged End Users and utilize the Communications Managers SMAPI. All information exchanges use the services of CMISE and ROSE to properly format the data.

11.6. Establishing Director/Agent Relationship

Agent/Director relationship initiation process—when an Agent is first started, a M-Initiate command is constructed by the Agent and sent to the primary controlling Director. The controlling Director's address is always included in the Agent's MIB. Included in the command, and supplied by the Agent in the Access Control field, is an access control key that the Agent recognizes as the READ-WRITE key for future transactions from the controlling Director. The M-Initiate command is sent with the Confirm option.

If no response is received from the Director, another M-Initiate command is sent to secondary controlling Director. This address is also contained in the MIB. If there is still no response obtained, the Agent cycle through all secondary controlling addresses that are contained in the MIB to try to initiate contact with a Director. If still no answer, the Agent, after some predetermined period, recycles through the controlling Director address list until a response is received.

Once a response is obtained, the Agent sets the appropriate state indicator in the MIB, and updates the current controlling Director's address in the MIB.

If communications with the controlling Director are lost, the Agent performs the steps stated above to re-establish communications; namely, issue a M-Initiate to primary, then secondary directors.

Note that these sequences are independent of, and separate from, the basic Communications Manager Sign-on process.

11.7. Changing Controlling Directors

To turn over control from one Director to another, the original controlling Director constructs a M-Action primitive with a list of the Agents to turnover. The original Director then forwards the command to the new controlling Director. Before delivery of this command, the original controlling Director insures that the Agents to be turned-over have the proper configuration information to reach the new controlling Director. The turnover command can either be accepted or rejected by the new controlling Director If the turnover command is accepted, the new controlling Director positively acknowledges the M-Action command. The old controlling Director then issues M-Action commands to each of the Agents that are being turned over. This M-Action indicates the Agents new primary controlling Director's address. It also triggers the Agent to go through the M-Initiate process with its new controlling Director, including sending a new READ-WRITE access control key.

If the turnover command is rejected, an M-Event-Report is generated.

This turnover mechanism can be utilized through direct actions of the original controlling Director (an operator command has been issued at his operating system interface), or through commands from other Directors. If another Director requests the change, the command may be rejected if the proper access control key is not present.

If an Agent's controlling Director is unavailable, the special access control key—DIRECTOR-CHANGE—is supplied by the new controlling Director to the Agent as part of the M-Action command. The Agent acknowledges this command and set up the MIB appropriately, including going through the M-Initiate process with the new Director. This method of obtaining control of an Agent should only be used when the standard method, as stated above, is not available.

11.8. Remote Access to Agent Information

All Directors can obtain information about a managed object from any Agent, but non-controlling Directors can not request an Agent to modify an objects attributes. Any Director can communicate directly with any Agent to obtain information.

11.9. Remote Modification of Agent Attributes

Directors can request the modification of the attributes of managed objects controlled by Agents for which the Directors have direct control. If they wish to change any of the attributes of another managed objects, they must request the controlling Director of that managed objects to perform that action. The controlling Director then reports the results back to the requesting Director.

If a requesting Director does not have knowledge of the Agent's controlling Director, the requesting Director requests from the Agent the address of the Agent's controlling Director. Once the specific controlling Director's address is known, the requesting Director asks, through a M-Action command, the Agent's controlling Director to obtain the desired information. The requesting Director has the responsibility for constructing the particular command sequence, and the controlling Director will fill in the appropriate access control key. Another global key, DIRECTOR-CHANGE, is passed by the requesting Director on this exchange.

Upon receipt and validation of the M-Action command, the Agent's controlling Director extracts the command from the M-Action datastream and transmit it to the Agent. The Agent responds back to its controlling Director. The controlling Director notifies the originating remote Director of the success or failure of the command.

11.10. Adjacent Communications Manager Sign-On and Sign-Off

A Local Communications Manager can establish a Communications Manager session between itself and its adjacent Communications Managers when its underlying Protocol Stack Pipe is in the active, unlocked state, and its own state is enabled, unlocked. The Sign-On process is established using the M-Initiate command, which is sent to its adjacent Communications Managers. This command must be used in the Confirmed mode to ensure that its partner Communications Manager is present. Any negotiable parameters between the partners are carried in the user information portion of the command. If all negotiable parameters have been agreed upon, the operational state is changed to active and normal communications can flow. If more negotiations are required, there is no change in the operational state; it should remain in the enabled state.

When the Agent is a recipient of a M-Initiate from a partner Communications Manager, it checks all negotiable parameters. If these parameters are agreeable, the Agent sends a Confirmed Reply back to the originator. The Agent then changes the operational state of that Adjacent Communications Manager object to active. If the parameters are not agreeable, a Confirmed Reply is sent back with user information indicating parameters not agreeable, and the operational state remains enabled.

A Communications Manager Sign-off can be provided by either a M-Terminate or a M-Abort command. The M-Terminate provides orderly shutdown, and the M-Abort signals the partner Communications Manager that Immediate shutdown is required.

11.11. Events 11.11.1. Event Management Functions

Several management functions are required so that one Management process can notify another Management process of events of interest to both of them. These functions include services to: control the operation of event reporting; control the operation of event logging; report events; and retrieve event information from logs.

All management functional areas (fault, security, configuration, performance, and accounting) require these Event Management services. Event Management is composed of four functions (event reporting control, event logging control, event reporting, and event record retrieval). Each function supports a set of Services that manipulate one or more management support objects.

11.11.2. The Event Reporting Sieve Object

The Event Reporting Sieve Object determines whether the detection of notifications or event reports from managed objects should result in the forwarding of event data to an identified destination address.

11.11.3. The Event Log Object

The Event Log object stores information about notifications and event reports received from managed objects. This information can be viewed in the form of Event Records where each Event Record contains information about one particular notification or event report.

11.11.4. The Event Record Object

A subclass of the Event Record Object is defined for each type of notification. Instances of these Event Record subclasses may only be contained by the Event Log Object. Each instance represents the information associated with a particular notification or event report.

The four functions for Event Management are:

11.11.4.1. Event Reporting Control

This function provides services to:
a. Initiate event reporting, which creates an Event Reporting Sieve object.
b. Terminate event reporting, which deletes an Event Reporting Sieve object.
c. Suspend event reporting, which sets the Administrative State to locked.
d. Resume event reporting, which sets the Administrative State to unlocked.
e. Modify the Sieve Construct attributes.
f. Retrieve the Event Reporting sieve attributes.

11.11.4.2. Event Logging Control

This function provides services to:
a. Initiate Event Logging, which creates an Event Log object.
b. Terminate Event Logging, which deletes an Event Log object.
c. Suspend Event Logging, which sets the Administrative State to locked.
d. Resume Event Logging, which sets the Administrative State to unlocked.
e. Modify the Event Log attributes.
f. Retrieve the Event Log attributes.

11.11.4.3. Event Reporting

This function provides a service to report events using the M-Event-Report command primitive.

11.11.4.4. Event Record Retrieval

This function provides a service to retrieve event records from an Event Log using the M-Get command primitive with a filter for selecting which Event records are to be retrieved.

11.11.5. Event Management Model

The Event Management Model shows the conceptual components of event reporting and Event Logging, together with message flows for the control messages, report messages, and retrieval messages.

Event Detection refers to a process that detects events in the form of managed object notifications or as event reports. Notifications can be detected from any managed objects in the network, including Event Reporting Sieves and Event Logs.

The Event Reporting Sieve is used to determine which notifications are to be reported to a particular destination address.

The event reporting collector is an application process which receives event report messages containing event data. It may then distribute the event data received to an Event Log or some other application.

The Sieve Construct attribute behaves as a filter, and must be present in instances of the Event Reporting Sieve, as well as the Event Log object classes. When used as an Event Reporting sieve, the Sieve Construct is used for selecting notifications whose data is to be reported. When used as an Event Log, the Sieve Construct is used for selecting the notifications whose data is to be logged. To allow the Sieve Construct to select notifications, the parameters of an event report or notification from a managed object are defined as attributes which have associated attribute identifiers. These attributes may or may not be used in an object class definition.

The Event Log is a conceptual repository for event records. Each log must be configured with a Sieve Construct in the same manner as the Event Reporting Sieve. In addition, it specifies the maximum size of the log in octets and the action(s) to be taken by the log when it is full. These include flushing the log, wrapping, halting event recording, and generating a notification indicating that the log is full.

It should be noted that Event Logging and Event Reporting are entirely independent activities and must be initiated separately. In particular, if an event reporting activity is suspended, it does not mean that events would automatically be sent to an Event Log during the period of suspension.

11.11.6. Alarms

Detected faults (i.e., abnormal conditions) in an operating environment result in the generation of alarm data which may be reported to a remote system in the form of an Alarm Report. Alarm Reporting is the function within Fault Management that addresses the reporting of detected faults. Alarm Reporting is primarily concerned with the collection and control of alarms generated by managed objects.

An Alarm Report is a specific type of event report. The set of alarms that are reported and the Director to which they are reported may be changed to respond to changing management needs. The Alarm Report parameters for alarm reporting include parameters such as threshold, severity, problem type, problem code (which are associated with alarm records), and capacity alarm threshold (associated with alarm logs).

The event type indicates the type of fault detected. The presently defined types are:

transmissionAlarm: an alarm associated with the process of sending information from one point to another.

serviceAlarm: an alarm associated with the degradation in the quality or operation of a specific service.

processingAlarm: an alarm associated with a software or processing fault.

protocolStackAlarm: an alarm associated with a condition in an underlying protocol stack service used by the Communications Manager object class and its subordinate classes.

The severity of an alarm indicates how severely the fault impacts the object reporting the fault. The severity level assigned to a particular fault may depend on the perspective from which the fault is viewed, or it may depend on the network or system configuration. The following levels of severity are presently defined:

Critical: indicates that a severe service affecting condition has occurred resulting in the resource the managed object represents being totally out of service.

Major: indicates that a fault has developed resulting in a severe degradation in the capability of the resource the managed object represents.

Minor: indicates the existence of a fault that does not have a serious effect on the service, or malfunctioning or failure of a resource represented by a managed object which is non-critical to system operation.

Warning: indicates the detection of a potential or impending fault before any significant effects have been felt.

Indeterminate: indicates the system cannot determine the severity level.

Clear: indicates the clearing of a previously reported alarm.

12. CM Routing

The following list identifies specific issues concerning the routing and distribution services that are provided by a CM. Resolution of these issues may differ within any particular CM implementation, but the overriding issues are common to all CMs in the CM complex. These issues include: EU programs accessed via CM must have unique and universally known identities; communicating EUs will have no knowledge of the residency of their partner EUs; EU identity, residency, and inter-EU access consideration must be centrally managed; EUs will be insensitive to communication architectures inter-CM activities exercised in their behalf; the CM complex will be dynamically reconfigurable with minimized or no downtime; EUs must be transportable between like CM residences; and information pertinent to EU identities, residency, and accessibility must be synchronized within all CM configurations.

12.1. Global Addressing Model

The addressing model used in the present invention specifies a three level hierarchy: 1) the processor address; 2) the service address; 3) the device address.

A sending EU must have a way to identify an intended recipient EU to a CM when launching a DU to that partner EU. Each EU that may participate in an EU to EU dialogue via CMs will have an EU number (EU#) by which it will be known by the CMs. Local conventions or options may dictate that a sending EU will know its intended partner by something other than an explicit "CM.EU". However, any Mnemonic used to describe the partner EU must be resolved to an explicit "CM.EU" at the Applications Program Interface (API) boundary.

A sending EU will initiate a DU to a target EU with no knowledge of the node residency of the target. Each node wherein a CM resides to support access of resident EUs will have a universally known unique identity; a CM number (CM#). The DESTINATION will be resolved to a "CM.EU" at the API of the sending CM when a DU is initiated. In turn, routing table content will be referenced to identify and activate a path to support transport of the DU.

Assignment of EUs and CM#s must be centrally controlled to avoid duplication and other forms of confusion. Further, CM#s, EU#s and routing information to support inter-CM activities must be communicated to all CMs participating in those activities.

A CM accessible node could be designated a Table SERVER. The Table SERVER APPLICATION could provide the assignment and maintenance of various data base elements necessary for successful routing of DUs between EU partners. It could also be responsible for distribution of the data base content to other CMS. The Table SERVER may include multiple "Local" Table SERVER APPLICATIONs and a "Global" Table SERVER APPLICATION.

Information to be centrally managed and disbursed by the Table SERVER APPLICATION includes: Mnemonic to DESTINATION-CM.EU resolution as viewed by the requesting CM and a local EU#; DESTINATION-CM to ADJACENT-CM resolution as viewed by the requesting CM; ADJACENT-CM to protocol stack resolution as viewed by the requesting CM; Local protocol stack parameters as viewed by the requesting CM.

EU partners are insensitive to the communication discipline(s) exercised in the transport of DUs between their respective CM and any intervening CMs. Data constraints may exist, e.g., support for binary data on Synchronous Link Control links or message size restrictions. As EUs may reside in nodes with differing implementations of communications connectivity, communications network gateway nodes bridge the disparate disciplines. The bridging within network gateway processors is accomplished at the CM/Network layer by utilizing the routing information managed and supplied by the Table SERVER APPLICATION. Every CM is preferably implemented to handle the CMIU pass through traffic.

12.1.1. CM Addressing vs. EU Level Addressing

The three levels of the addressing hierarchy correspond to the CM number, the EU number, and some end user level convention, respectively. Of these three addresses only the first two are required to traverse the CM complex. The device level address is meaningful only to the EUs.

The distinction between the addresses necessary for the movement of data through the CM complex, (the "CM.EU" address) and the user level addressing is important. CMs deal only with the CM.EU numbers, EU level addressing must be embedded in the message blocks that the CM is passing and therefore completely hidden from the CM itself. User level addressing is only meaningful to EUs.

Configuring and reconfiguring components within the CM complex is dynamic, requiring no downtime to accomplish. Applicable tables are dynamically expandable to support and extend CM connectivity to an indefinite number of CMs.

The network format of routing data is common to all CMs within the CM complex. The internalization of the routing data will be unique to each CM implementation. The Systems Management Application Program (SMAP) should preferably be able to reconstruct the locally stored routing information into the network common format in order to satisfy Network Management needs.

12.1.1.1. CM Numbers

CM numbers are preferably three bytes (24 bits) in length. There is no predefined structure or grouping to the numbers, they are strictly numbers in the range of X"000001" to X"FFFFFF". CM number X"000000" is reserved, and may not be assigned.

Each CM number is a unique entity throughout the CM complex, i.e., there is only a single instance of it anywhere on the network.

12.1.1.2. EU Numbers

EU numbers are preferably two bytes (16 bits) in length. There is no predefined structure or grouping to the numbers, they are strictly numbers in the range of X"0001" to X"FFFF". EU number X"0000" is reserved, and may not be assigned.

EU numbers are not unique on a network wide basis, but must be unique within a CM residence. The combination of a CM number and an EU number qualifies to a unique entity on the network by virtue of the uniqueness of the CM number.

12.1.1.3. EU Level Addressing

EU level addressing is undefined by the present specification. As this address is embedded in the data transferred by the CM, it is up to the user community to define the size and structure of the addresses at this level.

12.1.2. Virtual CM Numbers vs. Real CM Numbers

Virtual CM numbers are CM numbers that describe a complex or grouping of processors that require load distribution. While each individual processor in the A complex has a unique CM number, the complex as a whole is also assigned a CM number.

Prior to a message being delivered to the complex, it passes through an "Intermediate Routing Distribution" node (IRD). The CM in this node will, as the CMIU passes through the CM/Network layer, resolve the virtual CM number to a real CM number according to a "Load Distribution Value" contained in the CMIU and a "Load Distribution Record" contained in the IRDs routing tables. More will be said about load distribution later in this section.

12.1.3. Functional vs. Unique EUs

There are two classifications of end users; 1) functional EUs, and 2) unique EUs. A functional EU is one that performs the same function in more than one location in the CM environment, and thereby carries the same EU number throughout the CM complex. By contrast, a unique EU has but a single occurrence throughout the CM complex.

12.2. Mnemonic and Explicit CM Addressing

The SEND/RECEIVE "Privileged" SMAPI services (see Sections 3.1 and 3.3) can accept one of two types of CM.EU address specifiers, a mnemonic identifier that will be resolved to an explicit CM.EU, or an explicit CM.EU. This mnemonic value is not a global value for any specific CM.EU, but rather a specific value meaningful only to a particular ORIGIN-CM. In other words, the mnemonic "DATA-SERVER" may resolve to one CM.EU value for EUs resident within a specific CM, and a completely different CM.EU for EUs resident within other specific CMs.

The SEND/RECEIVE "Standard" CMAPI services (see Sections 3.1 and 3.2) can accept only the mnemonic identifier. The resolution of routing table entries is always qualified by the requestors' CM and EU numbers.

12.3. Origin to Adjacent CM Addressing

Each CM in the CM complex must have communications access across a network to at least one ADJACENT CM. In most cases, particularly with NETWORK-NODES, a CM has more than one adjacent CM. Complete end-to-end communication through the CM network is a series of CM to CM traversals; from ORIGIN to ADJACENT to ADJACENT, and so forth, until the DESTINATION is reached.

Given this relationship between END-NODES and NETWORK-NODES, each CM along the way must resolve the DESTINATION-CM with an ADJACENT-CM. At some point the DESTINATION-CM and the ADJACENT-CM will be the same, marking the last communication link to be traversed.

12.3.1. Primary vs. Secondary Adjacent

In some environments, there may be more than one path from a given ORIGIN-CM to a DESTINATION-CM, however only one may be active at any given time. In such cases, the CM/Network layer may choose to send to an alternate ADJACENT-CM. Such a decision might be predicated on the status of the communication link between the ORIGIN-CM and the primary ADJACENT-CM, or some other local factor.

Load Distribution

12.4. Load Distribution

12.4.1. Load Distribution Within the Intermediate Routing and Distribution (IRD) Node The Intermediate Routing and Distribution (IRD) function of the CM allows CM traffic to be distributed to an upstream complex of processors. A complex can be defined as a group of processors which share common functions. From the CMs point of view, each of these processors contain common End Users known as functional EUs. Each of the processors within the complex are assigned a specific unique CM number.

In order for the EUs which reside out on the Wide Area Network to not know about each individual processor in a complex, a Virtual CM number is assigned for each complex. The ORIGIN-EU specifies a DESTINATION-EU which is owned by the Virtual CM. The Virtual CM number is used only if the ORIGIN-EU wants the CM to resolve this destination into the real CM number for a processor which resides within a complex.

In order for the IRD to resolve this, an EU must provide a Load Distribution Value (LDV) at the Send API. The LDV is a 1 byte binary field within the range of 0 through 255. The LDV is formatted as part of the CMIU and the Transmission Services (TS) component of the CMIU indicates its' presence. When the LDV is present in a CMIU arriving at an IRD CM, the IRD updates the routing. The appropriate DESTINATION-CM number is placed in the DESTINATION-CM number specified in the CMIU. A DESTINATION-CM-STATIC field must be present in the TS component of the CMIU and remains unmodified by the Load Distribution function of the IRD node. A DESTINATION-CM number specified in the CMIU as a Virtual CM number with no LDV present is treated as an error because a Virtual CM is not a valid destination. If there is no LDV present (in this case there cannot be a DESTINATION-CM-STATIC) within the CMIU, and the DESTINATION-CM number is not virtual, the IRD routes the message to the DESTINATION-CM number indicated in the CMIU.

The Virtual CM number is also carried within the DESTINATION-CM-STATIC CMIU field. This field is available to facilitate error notification procedures. This field contains the DESTINATION-CM number specified by the originating CM and remains unaltered by an IRD. The DESTINATION-CM-STATIC field is returned along with any type of error notification.

A virtual CM number is assigned for each complex. For each Virtual CM assigned, there is a Load Distribution Record (LDR) resident in the IRD. It is the responsibility of the complex to send LDRs to downstream IRD nodes. LDRs are created and sent to the IRDs via "privileged" End User programs. Whenever a processor in the complex recognizes that the incoming load needs to be reconfigured, the complex sends a new LDR to a privileged EU resident in each IRD. When the LDR is received by the privileged EU in the IRD, it updates the LDR for the specified Virtual CM number. The complex sends the LDR as a Distribution Unit over CM Priority 1, which preferably has a distribution size limitation of 1800 bytes.

12.4.1.1. Load Distribution Record (LDR) Format

An exemplary LDR from a complex is shown in FIG. 17. The LDR is formatted as follows:

Virtual CM Number (3 bytes)—this field is the Virtual CM number for the complex to which this LDR belongs.

Number of CMs In Complex (1 byte)—this binary field indicates the number of processors which reside in the complex.

CM Complex Members (1 through N iterations (of 3 Byte CM numbers)—this area contains the CM numbers of the processors which make up the complex. Each CM number is 3 bytes long. This field is repeated for the number of times specified in the "Number of CMs" field.

Load Distribution Value Index Table (LDVIT) (256 bytes)—this table is used in conjunction with a Load Distribution Value (LDV) which is resident within a CMIU. This table is made up of 256 one byte index fields. The LDV value is used as an index into this table, and the value resident at that location is used as an index into the CM Complex Member portion of the LDR. The contents of the first 200 bytes are variable and are changed to effect re-configurations of the complex as determined by implementation specific designs. The remaining 56 bytes are either fixed or undefined and contain values which do not change.

12.4.1.2. Load Distribution Record (LDR) Usage

Using the LDR shown in FIG. 17, the following describes the IRD load distribution functions:

An End User has a distribution to send to functional EU "X". "X" resides within every processor of a complex which is designated as Virtual CM number 12.

2) The End User has been assigned an LDV of 3.

3) The EU issues a Send to EU "X" (which is resolved to CM.EU(12."X") at the CMAPI or SMAPI of the originating CM) with the LDV equal to 3.

4) A CMIU is constructed with a DESTINATION-CM-STATIC of 12, a DESTINATION-CM of 12, and an LDV of 3.

5) The CMIU is forwarded through the network to an IRD CM. CM 12 is defined to the IRD as a Virtual CM representing a complex.

6) The IRD detects the presence of an LDV in the CMIU, or a Virtual CM number, which indicates that Load distribution is required. The DESTINATION-CM number is 12, which represents a complex. The IRD locates the LDR for CM 12.

7) The IRD uses the LDV as an index into the Load Distribution Value Index Table. The value indexed by LDV=3 in the example above is 5. This value is used as an index into the CM Complex Members list.

8) The 5th CM specified in the CM complex Members list (index value starts at 1) is CM X'00000F' (CM number 0F).

9) The IRD updates the DESTINATION-CM number operand in the CMIU to CM 0F and routes it there. The DESTINATION-EU and the DESTINATION-CM-STATIC remain unaltered.

13. CM INTERCHANGE PROTOCOL

The next two sections define the structure and content of the communications protocol flowing between CMs for End User data distributions and for CM Management End User (SMAP) distributions. End User distributions are exchanged within the Distribution Component of a CM Interchange Unit (CMIU) as defined in Section 13.1. Management data is carried within a Systems Management Distribution Unit (SMDU) as defined by the SMAP Protocol. The SMDU is exchanged between CMs in the same manner as End User Data, i.e., in the Distribution Component of the CMIU. The structure and content of the SMDU is defined in Section 13.2.

13.1. CM to CM Protocol—The Communications Manager Interchange Unit (CMIU)

The basic unit of exchange between CMs is the CM Interchange Unit (CMIU). Each CMIU is a packet containing all the necessary routing and control information needed to deliver the CMIU to its end destination.

The CMIU Logical Structure is based on the following guidelines: organize the CMIU data for the fastest access during normal data flow through the CM/Network Layer; maintain logical groups of CMIU data based on the layered structure of the CM; carry each CMIU data element only one time; allow access to all CMIU data elements from each CM layer regardless of the data element's component residency; utilize unique self defining field constructs for each component and each data element (or group of related data elements) to allow for logical, table driven, open ended, migratable processing in the parsing of the CMIU; and provide a way for CM compatibility across upward migration of the CM Standard.

13.1.1. Communications Manager Interchange Unit (CMIU) Structure

The CMIU comprises component fields in 3 possible combinations which are described below and in FIG. 18: 1) PREFIX, TRANSMISSION SERVICES; 2) PREFIX, TRANSMISSION SERVICES, CONTROL, ENVIRONMENT and DISTRIBUTION; or 3) PREFIX, TRANSMISSION SERVICES, CONTROL and RESPONSE.

The PREFIX is a fixed length header component which introduces the CMIU, defines the CMIU size and identifies the CM support level required to fully process the contents of the CMIU. The TRANSMISSION SERVICES component identifies the CM/Network Layer activity to be performed and contains those data elements utilized in the flow of a normal message through the CM/Network Layer processing. The CONTROL component specifies the CM function to be performed and identifies additional CM/Transport and CM/Session Layer related data elements. The CONTROL component must be followed by either a DISTRIBUTION component (with or without the optional ENVIRONMENT component) or a RESPONSE component. The ENVIRONMENT component contains unique operating system control data used to maintain a single system image in a distributed processor environment. Although this component is optional, it may only be utilized in conjunction with the DISTRIBUTION component. The DISTRIBUTION component contains the End User data (or data segment) being transported between End Users. It may be used with or without the optional ENVIRONMENT component. The DISTRIBUTION component is not used with the RESPONSE component. When a distribution requires a CM response, the RESPONSE component identifies the type of response (i.e., acknowledge or exception), provides specific detail relative to the response, and identifies the CM node which generated the response. The RESPONSE component is mutually exclusive with the DISTRIBUTION and ENVIRONMENT components.

The PREFIX and TRANSMISSION SERVICES components are required on all CMIUs. These two components are used in CM Network Layer protocol exchanges. The remaining components, CONTROL, ENVIRONMENT, DISTRIBUTION, and RESPONSE are used for distribution exchange between End Node CMS. That is, they represent parameters and processing required by the higher layer CM processes—i.e., the CM/Transport, CM/Session, CMAPI Services, and End User processing.

CMIU Component Field Structure

The structure of the envelopes flowing between CMs is like Document Interchange Architecture (DIA) in form. The envelope is made up of a series of self defining fields that may themselves be broken into self-defining subfields.

Each of the CMIU component fields are prefixed with an "introducer" to define the length and content of the prefixed component.

There are two forms of the component introducer used within the CMIU: a TTIDFISN format used only for the Prefix component (which is always a fixed length component) and an LLIDF format used for the remaining component fields. The Prefix field introducer identifies information relating to the entire CMIU whereas the introducers for the remaining components refer only to the associated component field. FIG. 19 defines the Component Introducer formats. Referring to FIG. 19:

| | | |
|---|---|---|
| TT | = | Total CMIU Length - PREFIX component only. A 2 byte value, inclusive of the TT bytes, representing the total length of the CMIU. Note that the PREFIX will always be a fixed length. |
| LL | = | Component Length - all components except PREFIX. A 2 byte value, inclusive of the LL bytes, representing the component length. |
| ID | = | Component Identifier, where: <br> I = Identifier (e.g., Prefix, Control, etc.) <br> D = Detail Type (Defined on a per component basis.) |
| F | = | Format Definition - identifies the format of the component sub-fields, where: <br> Bit 0 - Introducer Extension Indicator. <br>   0 = No ISN is present following the LLIDF <br>   1 = ISN follows (PREFIX component only) <br> Bit 1 - Imbedded Structure Indicator. <br>   0 = Subfield structure is defined by bits 2-3. <br>   1 = Subfield structure is in LT format. <br> Bits 2-3 - Subfield structure. <br> (Used only if Bit 1 = 0) <br>   00 = No Subfields exist. <br>   11 = Unstructured. <br> Bits 4-7 - Reserved. |

ISN is a two part field used to support the segmentation of Distribution Units (DUs) that exceed length limitations established for CMIU data exchange. It is required only on the PREFIX and may not be used with any other component field.

| | | |
|---|---|---|
| I | = | Indicator Byte <br> Bit 0 - Reserved <br> Bit 1 - First segment Indicator <br>   0 = First segment <br>   1 = Not first <br> Bit 2 - Last Segment Indicator <br>   0 = Last segment <br>   1 = Not first <br> Bits 3-7 - Reserved |
| SN | = | Sequence/Segment Number <br> S = DU segment # of this CMIU <br> N = Total number of segments for this DU. <br> (SN = X"0000" for first/last = only segment.) |

CMIU Component Subfield Structure

With the exception of the Prefix, all CMIU component fields (e.g., Control, Response, etc.) may contain data element subfields following the component introducer (LLIDF). The subfield format is specified by the Format byte ("F") within the component fields LLIDF introducer. The only subfield structure currently defined is the "LT" format. The LT element subfield structure is defined in FIG. 20. Referring to FIG. 20:

| | | |
|---|---|---|
| L | = | The length of the data element subfield inclusive of the LT bytes. This is a single byte value; 255 is the maximum length of a subfield. |
| T | = | uniquely defines the type of data element transported within the subfield. |

The CMIU component fields and subfields are illustrated together in FIG. 21.

13.1.2. CMIU Formats

The CMIU structure supports the CM protocol defined in Section 10. As such, the CMIU components are exchanged between CMs in three format structures: two forms of DELIVER and an Isolated Pacing format. The PREFIX and TRANSMISSION SERVICES components are common to all format structures. Reference Section 10 for a definition of the subfield elements used with each CMIU format. Refer to Tables 13.1 and 13.2 later in this section for specific implementation parameter definitions for the CMIU component fields and element subfields.

CMIU Format 1: ISOLATED PACING REQUEST-/RESPONSE (IPRQ/RSP)

Format 1, illustrated in FIG. 22, is used between adjacent CMs to control local resource utilization within each node. It is normally 27 bytes (X"001B") in length. The adaptive flow control process is described in Section 6—CM/Network Layer. The CMIU Pacing parameters are defined in a later section of this section.

CMIU Format 2: Deliver-Distribution

Format 2, illustrated in FIG. 23, the DELIVER-DISTRIBUTION format, is used for all CM—CM exchange of End User distributions.

Delivery of a full 32,000 byte Distribution Unit (DU) as presented to the CM by an End User may require DU segmentation/reassembly at the Origin and Destination CM/Transport Layer. CM/Network Layer processing is cognizant only of CMIU packets and need only access parameters within the TRANSMISSION SERVICES component to pass a CMIU through to the Destination-CM either directly or via another adjacent CM.

CMIU Format 3: Deliver-Response

Format 3, illustrated in FIG. 24, the CM DELIVER-RESPONSE format, accommodates all CM return flows, i.e., all intelligence returned to a CM that initiated a distribution on behalf of an End User. The DELIVER-RESPONSE is generated by a CM utilizing parameters from the originating DELIVER-DISTRIBUTION.

13.1.3. CMIU Component Field Descriptions

Each CMIU Component Field is illustrated in the following section. The implementation parameters for the Fields and Subfields are defined in Section 13.1.4.

PREFIX—Required for all CMIUs (Formats 1, 2 and 3)

Figure 25:
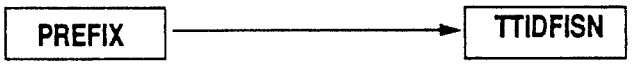
FIG. 25 is a diagram of the CMIU prefix component as used in the present invention.

The PREFIX is a fixed length CMIU header and is detailed in FIG. 25. It is 8 bytes long in the form TTIDFISN where:

| | | |
|---|---|---|
| TT | = | Total CMIU length. |
| ID | = | C0vr  C0 = Component = PREFIX |
| | | vr = Detail Type = CM Version/Release level |
| F | = | 80  Where: Bit 0 = 1  ISN follows TTIDF |
| | | Bits 1-3 = 000  No Subfields exist. |
| | | Bits 4-7 = 0000. |
| I | = | 00  First and Last or only CMIU segment. |
| | = | 40  First Segment of a distribution. |
| | = | C0  Middle Segment of a distribution. |
| | = | 80  Last Segment of a distribution. |
| SN | = | 0000  Only CMIU segment. Complete transmission. |
| | = | 0102  Segment 1 of a 2 segment distribution. |
| | = | 0202  Segment 2 of a 2 segment distribution. |
| | = | nntt  Segment nn of a tt segment distribution. |

The PREFIX identifies both the CM Version and the CM Release level required to fully process this CMIU. The major version defines the CM Standard Version supported; the Release identifies the minor revision level of the CM Standard.

The PREFIX is a fixed length header component only. It may not contain subfields.

The PREFIX segmentation fields are valid for Format type 2, Deliver-Distribution only. Format 1, IPRQ/PRS and Format 3, Deliver-Response, may not be segmented.

TRANSMISSION SERVICES—Required on all CMIUs (Format 1, 2 and 3)

Figure 26:
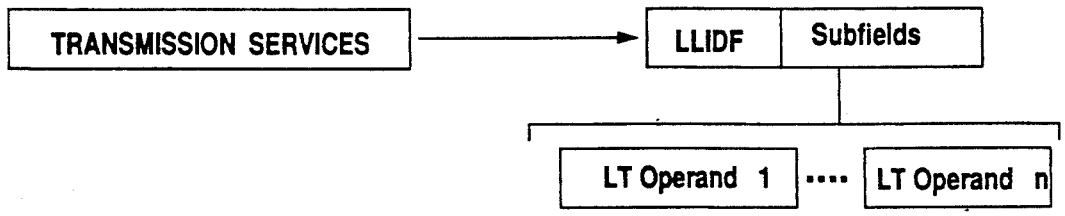
FIG. 26 is a diagram of the CMIU transmission services component as used in the present invention.

The TRANSMISSION SERVICES (TS) component, illustrated in FIG. 26, comprises the component introducer in the form LLIDF and subfield elements with structured LT introducers.

Referring to FIG. 26, the "LL" bytes (LLIDF) define the length of the TS component (including the LL bytes). The component Identifier ("I" of the LLIDF) specifies TRANSMISSION SERVICES. The component Detail Type ("D of the LLIDF) identifies this CMIU as a) an Isolated Pacing Request/Response, b) a normal flow distribution, or c) a normal flow distribution requiring Load Distribution. The subfield format ("F" of the LLIDF) defines the subfield elements as "LT" introducer formatted fields.

The minimum required subfields ("LT" operands) include the Destination-CM and the Pacing Request-/Response fields. The Destination-CM is referenced by the CM/Network Layer to invoke either Network Node processing to pass the CMIU onward toward its ultimate destination or to invoke End Node processing to deliver the CMIU upward through the CM Layers to the locally resident Destination End User. The Pacing Request/Response field is used by the CM/Network Layer to manage its local resources via Adjacent CM flow control.

CONTROL—Required: Format 2, 3; Invalid: Format 1

Figure 27:
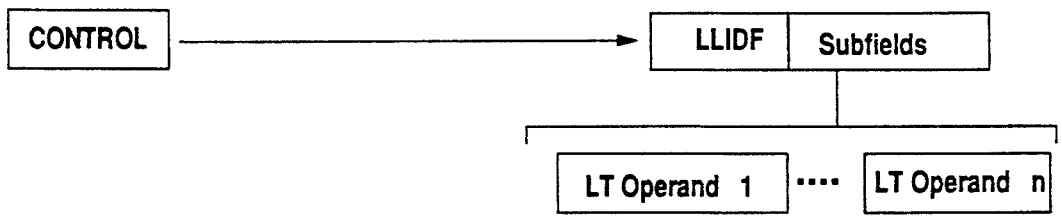
FIG. 27 is a diagram of the CMIU control component as used in the present invention.

The CONTROL component, illustrated in FIG. 27, comprises the LLIDF introducer and subfield elements with structured LT introducers. The "LL" bytes (LLIDF) define the length of the CONTROL component (including the LL bytes). The component Identifier ("I" of the LLIDF) specifies CONTROL. The component Detail Type ("D" of the LLIDF) identifies this CMIU as either DELIVER-DISTRIBUTION or as DELIVER-RESPONSE. The minimum required subfields include the Origin-CM, Origin-EU, Destination-EU and, for DELIVER-RESPONSE, Correlation. Additional subfield elements identify the Distribution, CM-Distribution-ID field, and optionally carry data on behalf of End Users in the form of an EU-Distribution-ID.

ENVIRONMENT—Optional: Format 2; Invalid: Format 1, 3

Figure 28:
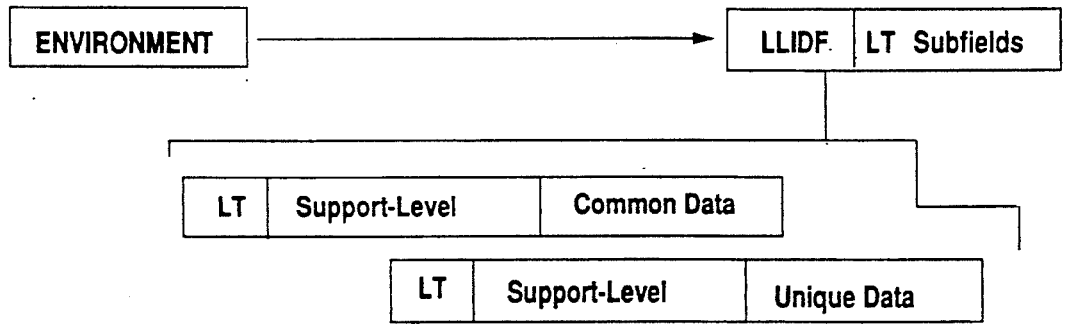
FIG. 28 is a diagram of the CMIU environment component as used in the present invention.

The optional ENVIRONMENT component, illustrated in FIG. 28, comprises the LLIDF introducer and subfield elements with LT introducers. The "LL" bytes (LLIDF) define the length of the ENVIRONMENT component (including the LL bytes). The component Identifier ("I" of the LLIDF) specifies ENVIRONMENT. The subfield format ("F" of the LLIDF) defines the subfields as LT introducer formatted fields.

The subfield(s) contains operating system control data and provides for both common and unique system data. The common area will contain data that is defined as standard for all operating systems. The unique area will contain information pertinent only to like operating systems. The data will be built and interpreted by operating system service routines.

Following the LT introducer, each subfield data area will contain a 3 byte Support-Level field to identify the format of the control data and the level of support required to interpret the control data (refer to Section 13.4 for Support-Level field definition).

CM implementations without ENVIRONMENT component support or not at the appropriate support level must be able to discard either or both operands of the component without disruption of normal processing of the CMIU.

DISTRIBUTION—Required: Format 2; Invalid: Format 1, 3

Figure 29:
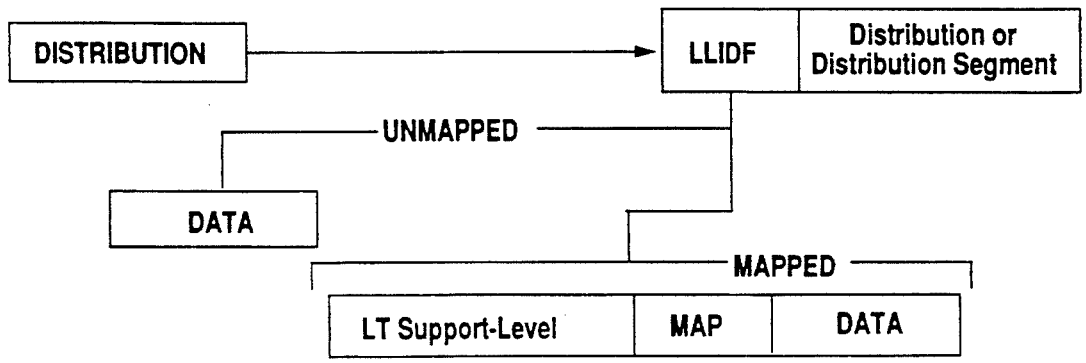
FIG. 29 is a diagram of the CMIU distribution component as used in the present invention.

The DISTRIBUTION component, illustrated in FIG. 29 comprises its LLIDF introducer and a Distribution or Distribution segment to be delivered to an End User. The Distribution segments must be completely assembled before passing the entire Distribution to the End User. The "LL" bytes (LLIDF) define the length of the DISTRIBUTION component (including the LL bytes). The component Identifier ("I" of the LLIDF) specifies DISTRIBUTION. The component Detail Type ("D" of the LLIDF) identifies this CMIU as either CM Data (i.e., End User Distribution) or as CM Control (i.e., privileged End User (SMAP) Distribution.)

The Distribution (segment) may carry data in either MAPPED or UNMAPPED form.

MAPPED data begins with an LT structured field identifying the level of support required to interpret the data, followed by a MAP that defines the logical format of the data, in turn followed by the map data elements. The MAP will appear only in the first segment of the Distribution, if the DU is segmented. The CM will structure the data as defined by the MAP before delivering the Distribution to the Destination-EU.

UNMAPPED data is in End User defined format. It is "pure" data to the CM and is delivered to the Destination-EU without being restructured.

Identification of MAPPED or UNMAPPED is carried as part of the Attribute-Byte field within the TRANSMISSION SERVICES component. The MAP format is defined in Section 13.1.4, Table 13.6.

The DISTRIBUTION component may be carried as a null component, i.e., the LLIDF with no subsequent data bytes. This form of the DISTRIBUTION component is used when an End User SENDs an EU-Distribution-ID with no associated Distribution data.

RESPONSE—Required: Format 3; Invalid: Format 1, 2

Figure 30:
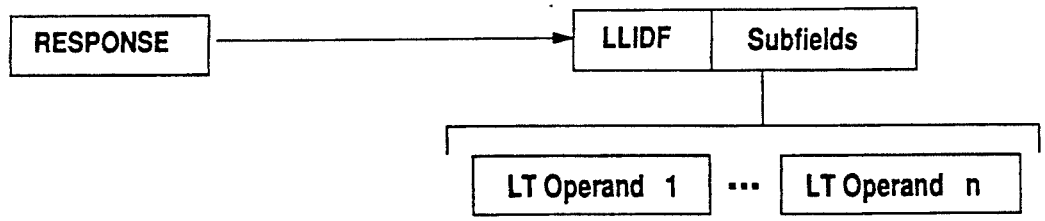
FIG. 30 is a diagram of the CMIU response component as used in the present invention.

The RESPONSE component, illustrated in FIG. 30, comprises the LLIDF introducer and subfield elements with structured LT introducers. The "LL" bytes (LLIDF) define the length of the RESPONSE component (including the LL bytes). The component Identifier ("I" of the LLIDF) specifies CONTROL. The component Detail Type ("D" of the LLIDF) identifies this CMIU as either an ACKNOWLEDGE or as an EXCEPTION RESPONSE. The required subfields identify the Error-CM and the reason for the RESPONSE (Exception-Code).

13.1.4. Implementation Parameters

This section defines the format and content of the implementation parameters used in the CMIU:

Table 13.1 Defines the CMIU Component Field Identifier (I), Detail Type (D), and Format (F) bytes of the LLIDF component introducer. Notes pertinent to each component are included where applicable.

Table 13.2 Defines the CMIU Element Subfield Operand Types (T) and lengths (L) to be used within the fields LT introducer structure.

Table 13.3 CMIU Subfield operand Types in numeric order.

Table 13.4 Attribute-List Element Definition.

Table 13.5 Support-Level Element Definition.

Table 13.6 Mapped Data—MAP Definition.

Table 13.7 Exception Code Element Definition.

Table 13.8 Pacing Request/Response (PRQ/PRS) Element Definition

TABLE 13.1

| CMIU COMPONENTS SUBFIELD DEFINITIONS | | | | |
|---|---|---|---|---|
| COMPONENT | IDENTI-FIER I | DETAIL TYPE D | FORMAT BYTE F | NOTES |
| PREFIX | C0 | 20 | 80 | 1 |
| TRANSMISSION SERVICES | C2 | | 40 | 2 |
| NORMAL ROUTING | | 20 | | 3 |
| LOAD DISTRIBUTION | | 21 | | 4 |
| ISOLATED PRQ/PRS | | 22 | | |
| CONTROL | C3 | | 40 | 2 |
| DELIVER-DISTRIBUTION | | 30 | | |
| DELIVER-RESPONSE | | 31 | | |
| RESPONSE | CE | | 40 | 2 |
| ACKNOWLEDGE | | E0 | | |
| EXCEPTION | | E1 | | |
| ENVIRONMENT | C9 | 90 | 4F | 5 |
| DISTRIBUTION | C8 | | 4F | 6 |
| CM DATA | | 80 | 30 | 7 |
| CM CONTROL | | 81 | | |

Notes for Table 13.1:
1. Detail Type X"20" indicates the version and release level of the CMIU. Format byte Bit 0 = 1 indicates the LLIDF introducer includes the additional 3 byte ISN segmentation bytes. Bits 1-3 specify NO subfields.
2. The "F" byte indicates that the component operands are exclusively LT formatted subfield elements.
3. Type 20 Transmission services require no Load Distribution services to reach the specified Destination CM.
4. Load Distribution services are required. A Load-Distribution-Value (LDV) and a Static destination CM LT operand must be present.
5. Operands are LT formatted with an imbedded 3 byte support level leader.
6. Operand elements are not exclusively LT. When "mapped", a 3 byte support level leader precedes a specially defined "map" of logical records. When "non-mapped", the data is not structured as far as the CM is concerned.
7. The Distribution Unit contains SMDU information/commands. The Distribution is unstructured to the CM. SMDU Distributions may flow at CM Priorities 0 through 7.

Table 13.2 lists the CMIU subfield elements, indicating optional or required and identifying the Component Field with which the element is associated.

TABLE 13.2

| CMIU ELEMENT SUBFIELD (LT) DEFINITIONS | | | | | |
|---|---|---|---|---|---|
| OPERAND | T | L | R/O | ASSOCIATED | NOTES |
| DESTINATION-CM | 07 | 3 | R | TRANS SVCS | |
| PACING REQUEST/RESPONSE | 23 | 2 | R | TRANS SVCS | 2 |
| LOAD-DISTRIBUTION-VALUE | 24 | 1 | O | TRANS SVCS | 3 |
| DESTINATION-CM-STATIC | 08 | 3 | O | TRANS SVCS | 9 |
| ATTRIBUTE LIST | 10 | 4 | R | TRANS SVCS | |
| CPU-BUSY-VALUE | 26 | 1 | O | TRANS SVCS | |
| ADJCM-NUMBER | 28 | 3 | R/O | TRANS SVCS | |
| DESTINATION-EU | 02 | 2 | R | CONTROL | |
| CM-DISTRIBUTION-ID | 31 | 1-16 | R/O | CONTROL | 1 |
| EU-DISTRIBUTION-ID | 40 | 1-44 | O | CONTROL | 4 |
| CORRELATION | 30 | 1-16 | R/O | CONTROL | 5 |
| ORIGIN-CM | 04 | 3 | R | CONTROL | |
| ORIGIN-EU | 01 | 2 | R | CONTROL | |
| RETURN-CM | 09 | 3 | O | CONTROL | |
| RETURN-EU | 03 | 2 | O | CONTROL | |
| ERROR-CM | 0A | 3 | R | RESPONSE | 6 |
| EXCEPTION-CODE | 11 | 1-254 | R | RESPONSE | 6 |
| SEGMENT-ID | 25 | 2 | R | RESPONSE | |
| COMMON-DATA | 20 | 3-253 | R | ENVIRONMENT | 7 |

TABLE 13.2-continued
CMIU ELEMENT SUBFIELD (LT) DEFINITIONS

| OPERAND | T | L | R/O | ASSOCIATED | NOTES |
|---|---|---|---|---|---|
| UNIQUE-DATA | 21 | 3-253 | R | ENVIRONMENT | 7 |
| SUPPORT-LEVEL | 22 | 3 | R/O | DISTRIBUTION | 8 |

Notes for Table 13.2:
1. The CM-DISTRIBUTION-ID is an LT structured field. It is required for all DELIVER-DISTRIBUTION CMIUs.
2. The Pacing Request/Response (PRQ/PRS) bytes will be carried in each CMIU. Null values will be used when the pacing information is not needed. The pacing bytes are defined in Table 13.8.
3. When Load Distribution is requested, both the LDV and the DESTINATION-CM-STATIC CM must be present. The static DCM provides a fixed reference to the original DESTINATION-CM because the "regular" DESTINATION-CM field is modified by the Load Distribution function.
4. The EU-DID is delivered to the Destination End User. It is also returned with an Exception Notification, COD or "internal confirm" to the origin CM. The Origin CM notifies the ORIGIN-EU or RETURN-EU of Exceptions or CODs, identifying the Distribution via the originally supplied EU-DID.
5. Required with DELIVER-RESPONSE (Format 3) and with DELIVER-DISTRIBUTION (Format 2) when the Distribution Type specified by the End User is QUERY-REPLY or RELAY-QUERY.
6. Required for DELIVER-RESPONSE. When the Error-CM is present, the Exception Code must also be present. The Error-CM field allows the CM detecting the error (esp. Intermediate CMs) to identify itself as the CM along the path which detected the error/exception. The Exception-Code format is defined in Table 13.7.
7. At least one of the operands, Common-data or Unique-data must appear if the Environment Component is present. Both operands, when present, must contain the 3 byte support-level operand as the first three bytes of data.
8. The Support-Level operand is required as the first three bytes of the Distribution component when "mapped" data is specified. TPF is currently the only implementation of the CM which uses the Support-Level operand. The Support-Level operand is further defined in Table 13.5.
9. Defined in Table 13.4.

Table 13.3 lists the "T" Elements in ascending numerical order and identifies the rule base used to assign the "T" values.

TABLE 13.3
"T" ELEMENTS

| OPERAND | T | ASSOCIATED |
|---|---|---|
| ORIGIN-EU | 01 | CONTROL |
| DESTINATION-EU | 02 | CONTROL |
| RETURN-EU | 03 | CONTROL |
| ORIGIN-CM | 04 | CONTROL |
| DESTINATION-CM | 07 | TRANS SVCS |
| DESTINATION-CM-STATIC | 08 | TRANS SVCS |
| RETURN-CM | 09 | CONTROL |
| ERROR-CM | 0A | RESPONSE |
| ATTRIBUTE LIST | 10 | TRANS SVCS |
| EXCEPTION-CODE | 11 | RESPONSE |
| COMMON DATA | 20 | ENVIRONMENT |
| UNIQUE DATA | 21 | ENVIRONMENT |
| SUPPORT-LEVEL | 22 | DISTRIBUTION |
| PACING REQUEST/RESPONSE | 23 | TRANS SVCS |
| LOAD-DISTRIBUTION-VALUE | 24 | TRANS SVCS |
| SEGMENT-ID | 25 | RESPONSE |
| CPU-BUSY-VALUE | 26 | TRANS SVCS |
| ADJCM-NUMBER | 28 | TRANS SVCS |
| CORRELATION | 30 | CONTROL |
| CM-DISTRIBUTION-ID | 31 | CONTROL |
| EU-DISTRIBUTION-ID | 40 | CONTROL |

Table 13.4 defines the 4 bytes that make up the Attribute-List operand element.

TABLE 13.4
ATTRIBUTE LIST

| BYTE | TYPE | DESCRIPTION |
|---|---|---|
| 1 | Binary | Priority 2-7 for CM Data |
|  |  | Priority 0-7 for Systems Management DUs (SMDUs) |
| 2 | Bitstring |  |
|  | 1... .... | PDM: Possible Duplicate Message |
|  | 0... .... | No Duplicate |
|  | .xxx .... | FORMAT: |
|  | .000 .... | Binary Format |
|  | .001 .... | Character Format |
|  | .010 .... | Binary Mapped |
|  | .011 .... | Character Mapped |
|  | --- .... | Value 100-111: Reserved |
|  | .... xxxx | ASSURANCE TYPE: |
|  | .... 0000 | Limited Assurance |
|  | .... 0001 | Full Assurance |
|  | .... --- | Value 0010-1111: Reserved |
| 3 | Bitstring |  |
|  | xxxx .... | TYPE: |
|  | 0000 .... | ASYNC |
|  | --- .... | Value ---1-0111: Reserved |
|  | 1000 .... | QUERY |
|  | 1001 .... | QUERY-REPLY |
|  | 1010 .... | RELAY-QUERY |
|  | --- .... | Value 1011-1111: Reserved |
|  | .... xxxx | DELIVERY NOTIFICATION |
|  | .... 0000 | No Notification |
|  | .... 0001 | Exception Notification |
|  | .... 0010 | Confirm on Delivery |
|  | .... --- | Value 0011-1111: Reserved |
| 4 | Unused | RESERVED |

Priority 2-7 may be used with the CM DATA DISTRIBUTION component of the CMIU. CM DATA is always carried in a DELIVER-DISTRIBUTION, Format 2 CMIU.

Priority 0-7 may be used with the Systems Management Distribution Unit (SMDU) component of the CMIU. SMDUs are always carried in a DELIVER-DISTRIBUTION, FORMAT 2 CMIU.

Table 13.5 shows that the Support-Level operand is always 3 bytes in length. Along with its "LT" introducer, the Support-Level bytes are the first 5 bytes of the ENVIRONMENT component subfields and of the DISTRIBUTION component subfield for MAPPED data.

TABLE 13.5
SUPPORT LEVEL

| BYTE | TYPE | DESCRIPTION |
|---|---|---|
| 1 | Binary | CONTROL GROUP DESIGNATOR |
|  | X"01" | Communications Manager Std. |
|  | X"02" | TPF Communications Manager |
|  | X"03" | CICS Communications Manager |
|  | X"04" | VTAM Communications Manager |
|  | X"05" | TCU Communications Manager |
| 2 | Binary | VERSION |
| 3 | Binary | RELEASE |

The Control Group Designator defines the group responsible for controlling the assignment of version and Release numbers. The CM Design Standard Version/Release controls the Support-Level operand for MAPPED data and for ENVIRONMENT component COMMON-DATA. The TPF CM is currently the only implementation using the ENVIRONMENT component UNIQUE-DATA subfield.

Table 13.6 provides the Mapped Data—MAP Definition.

TABLE 13.6
MAPPED DATA

| BYTE | TYPE | DESCRIPTION |
|---|---|---|
| 1 | Binary | Number of Logical Elements |
| 2 | Bitstring |  |
|  | 0... .... | L'RECORD: Not a Logical Record |
|  | 1... .... | Element is a logical Record |
|  | .--- ---- | Value 000 0000-111 1111: Reserved |

TABLE 13.6-continued

| BYTE | TYPE | MAPPED DATA DESCRIPTION |
|---|---|---|
| 3-4 | Binary | Length of the Element in Octets. |

Data identified as mapped is assembled from a logical set of data elements at the origin point into a single contiguous data string for transport, but is disassembled into the original logical data elements for presentation to the destination End User. The Exception-Code operand in Table 13.7 contains a 1 byte code and an optional character Extension. The Extension may be used to include a "readable" error description to clarify the error code defined in the EXCEPTION-CODE bytes.

TABLE 13.7

| BYTE | TYPE | EXCEPTION CODE DESCRIPTION |
|---|---|---|
| 1 | Binary | Exception Code: |
|  | X"00" | ACKNOWLEDGE. |
|  | X"80" | Unable to Deliver. |
|  | X"81" | Segment size too large. |
|  | X"82" | Segment receive Time-out. |
|  | X"83" | Pacing Reject - Window Closed. |
|  | X"84" | STOP in effect. |
|  | X"85" | No CM Dialogue established. |
|  | X"FF" | General Reject - Reason ID'd in Extension. |
| 2 | Unused | Reserved |
| 3-251 | Character | Optional Extension - Error Message. |

The Pacing Request/Response (PRQ/PRS) element illustrated in Table 13.8 must flow with every CMIU (Formats 1, 2, and 3). It is used exclusively by the CM/Network Layer in support of the CM adaptive pacing flow control process.

TABLE 13.8

| BYTE | TYPE | PACING REQUEST/RESPONSE (PRQ/PRS) DESCRIPTION | | |
|---|---|---|---|---|
| 1 | Bitstring | Pacing Request/Pacing Response | | |
|  | 0... .... | PRQ: | Null Value | |
|  | 1... .... |  | Request | |
|  | .000 .... | WINDOW: | Same Size | |
|  | .010 .... |  | Size + 1 | |
|  | .100 .... |  | Size − 1 | |
|  | .001 .... |  | Size indicated in PRQ byte. | |
|  | .... 0... | PRS: | Null value | |
|  | .... 1... |  | Response | |
|  | .... .000 | WINDOW: | Same Size | |
|  | .... .010 |  | Size + 1 | |
|  | .... .100 |  | Size − 1 | |
|  | .... .110 |  | Slam to 0. | |
|  | .... .001 |  | Size indicated in PRS byte. | |
| 2 | Binary | PRQ Byte = "NEXT" Window size. | | |
| 3 | Binary | PRQ Byte = "NEXT" Window size. | | |

13.1.5 CMIU Packet Size

Table 13.9 illustrates the CMIU Packet overhead, in bytes, for each CMIU Format. These sizes do NOT include the actual data. Thus, to arrive at the total length for a Format 2 type CMIU, the size of the actual data must be added to the overhead represented in the chart.

TABLE 13.9

| CMIU FORMAT | CMIU PACKET OVERHEAD | | |
|---|---|---|---|
|  | MINIMUM | MAXIMUM | AVERAGE |
| Format 1 - Isolated PRQ/PRS | 27 | 27 | 27 |
| Format 2 - Deliver-Distribution | 56 | 153 | 80 |
| Format 3 - Deliver-Response | 71 | 382 | 84 |

Table 13.10 summarizes CMIU overhead.

TABLE 13.10

| CMIU OVERHEAD SUMMARY | |
|---|---|
| Parameters Specified for Minimum Size | Additional Parameters Specified for Maximum Size |
| 8 PREFIX |  |
| 5 TS | 3 LDV |
| 5 DESTINATION-CM | 5 DCM-STATIC |
| 4 PACING PRQ/PRS | 3 CPU-BUSY-VALUE |
| 6 ATTRIBUTE-LIST |  |
| 5 ADJCM-NUMBER |  |
| 5 CONTROL | 18 CM-DID |
| 4 DESTINATION-EU | 46 EU-DID |
| 5 ORIGIN-CM | 18 CORRELATION |
| 4 ORIGIN-EU | 4 RETURN-EU |
| 5 DISTRIBUTION |  |
| 56 bytes | 97 + 56 = 153 bytes |

The maximum for Format 2 does not take special circumstances into account—i.e., Environment-Unique Data or Mapped data, as these are only used between TPF CMs. An average Format 2 includes: LDV, DCM-Static, CMID of 10, EU-DID of 10.

Table 13.11 presents a CMIU overhead summary for Format 3.

TABLE 13.11

| Format 3 - CMIU Overhead Summary | |
|---|---|
| Parameters Specified for Minimum Size | Additional Parameters Specified for Maximum Size |
| 8 Prefix |  |
| 5 TS |  |
| 5 DCM | 46 EU-DID |
| 4 PRQ/PRS |  |
| 4 Attribute-List |  |
| 5 ADJCM-NUMBER |  |
| 5 Control |  |
| 4 DEU |  |
| 5 OCM |  |
| 4 OEU |  |
| 4 COR | + 14 COR |
| 5 Response |  |
| 5 ECM |  |
| 4 EX-Code | 251 Ex-Code - Free form. |
| 4 Seg-ID |  |
| 71 bytes | 311 + 71 = 382 bytes |

13.2. Systems MGMT Exchange Protocol: The Systems MGMT DU (SMDU)

This section defines the structure and content of Distributions exchanged between CM System Management Application Programs (SMAPs) and/or privileged End Users. SMAPs exchange information as Privileged End Users with access to a Systems Management Applications Program Interface (SMAPI). The special SMAPI allows the SMAP EU to take advantage of CM priorities 0 and 1 and to use explicit "CM.EU" addressing. In all other respects, the SMAPI provides identical services as the CMAPI (refer also to Section 3.2—CMAPI The CM to EU Interface).

13.2.1. Systems Management Distribution Unit (SMDU) Structure

The structure of Distributions flowing between partner SMAPs is made up of a series of self defining fields that may themselves be broken into self defining subfields. The formats are open ended to provide a migratory path to full definition of the SMAP protocol as well as to allow for expansion to include differing protocol structures.

The Systems Management Distribution Unit (SMDU) used for CM Control and Management comprises four component fields: PREFIX, COMMAND, SMDU BODY and SUFFIX. The fixed length PREFIX component defines the format of the SMDU and identifies the version/revision level required to fully process the SMDU. The PREFIX is required for all SMDUs.

The COMMAND component identifies the CM Management classification area associated with this COMMAND and specifies the action to be performed. The COMMAND component is required for all structured SMDUs. It may be omitted when a fully unstructured SMDU exchange is specified within a SMDU BODY component. The COMMANDs are commonly defined across all SMAPS. Within an SMDU, the COMMAND COMPONENT may be repeated as often as the SMDU size limitations for a given CM priority allow, i.e., multiple command requests may be grouped within a single SMDU.

The optional SMDU BODY component allows structured or unstructured exchange within the SMDU. The structured format allows large structured or mapped subfields to be exchanged. The unstructured SMDU exchange allows for the exchange of transparent data. The SMDU BODY may be carried as the only component between the PREFIX and SUFFIX components or it may optionally be carried along with the COMMAND component(s).

The SUFFIX is required for all CM Management SMDUs. It identifies the end of the SMDU.

The SMDU is presented to the CM as a Distribution and, as such, is governed by the same services offered to normal End Users. There are no provisions for segmentation of SMDUs within the CM SMAPI services. Should larger distributions than the maximum allowed for CM communications be required, the SMAP will perform the segmentation or use the facilities of a utility End User to segment the SMDU data.

13.2.1.1. SMDU Component Field Structure

Each of the SMDU component fields are prefixed with an introducer to define the length and content of the prefixed component.

There are two forms of the component introducer used within the SMDU: a TTIDFISN format used for the Prefix component and an LLIDF format used for the remaining component fields.

TTIDFISN Introducer

Figure 31:
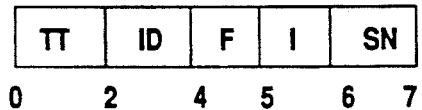
FIG. 31 is a diagram of a Systems Management Distribution Unit (SMDU) component field introducer according to the present invention.

The TTIDFISN format introducer is used only on the PREFIX component and is defined in FIG. 31. It defines the total length of the SMDU, identifies the Version/Release level needed to fully process the SMDU and provides a structure for SMDU segmentation in cases where the total SMDU length exceeds the maximum DU size accepted by the CM SMAPI (32,000 bytes). Referring to FIG. 31:

| | | |
|---|---|---|
| TT | = | Total SMDU Length - PREFIX component only. A 2 byte value, inclusive of the TT bytes, representing the total length of the SMDU. The PREFIX will always be a fixed length (i.e., the PREFIX is always TTIDFISN (8 bytes) with no component subfields.) |
| ID | = | Component Identifier, where: |
| | | I = Identifier = PREFIX |
| | | D = Detail Type = Version/Release |
| F | = | Format Definition - identifies the format of the component sub-fields, where: |
| | | Bit 0 - Introducer Extension Indicator. |
| | | 1 = ISN follows (PREFIX component only) |
| | | Bits 1-3 - 000 No Subfields exist. |
| | | Bits 4-7 - Reserved (X"0000"). |

ISN is a two part field used to support the segmentation of Distribution Units (DUs) that exceed length limitations established for SMDU data exchange. It is required on the PREFIX and may not be used with any other component field.

| | | |
|---|---|---|
| I | = | Indicator Byte |
| | | Bit 0 - Reserved |
| | | Bit 1 - First Segment Indicator |
| | | 0 = First segment |
| | | 1 = Not first |
| | | Bit 2 - Last Segment Indicator |
| | | 0 = Last segment |
| | | 1 = Not last |
| | | Bits 3-7 - Reserved |
| SN | = | Sequence/Segment Number |
| | | S = DU segment # of this SMDU |
| | | N = Total number of segments for this SMDU. |
| | | ISN = X"000000" for first/last = only segment |
| | | = X"600507" for 5th of 7 segments |

13.2.1.2. LLIDF Introducer

Figure 32:
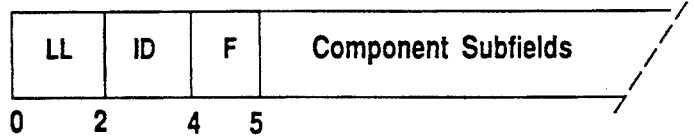
FIG. 32 is a diagram of another SMDU component field introducer according to the present invention.

The LLIDF format introducer is used on all component fields with the exception of the PREFIX. It defines the length of the field and the format of any accompanying subfield elements and is detailed in FIG. 32. Referring to FIG. 32:

| | | |
|---|---|---|
| LL | = | Component Length - all components except PREFIX. A 2 byte value, inclusive of the LL bytes, representing the component length (i.e., LLIDF plus the length of all associated component subfields.) |
| ID | = | Component Identifier, where: |
| | | I = Identifier (e.g., COMMAND, SMDU BODY, etc.) |
| | | D = Detail Type (Defined per component.) |
| F | = | Format Definition - identifies the format of the component sub-fields, where: |
| | | Bit 0 - Introducer Extension Indicator. |
| | | 0 = No ISN is present following the LLIDF |
| | | 1 = ISN follows (PREFIX component only) |
| | | Bits 1-3 - Imbedded Structure Indicator. |
| | | 000 = No subfields exist |
| | | 001 = Subfields are in LLTT format |
| | | 010 = Reserved. |
| | | 011 = Unstructured Data |
| | | 100 = Subfields are in LT format. |
| | | 101-111 = Reserved. |
| | | Bits 4-7 - Reserved. |

13.2.1.3. SMDU Component Subfield Structures

The SMDU COMMAND and SMDU BODY component fields may contain data element subfields following the component introducer (LLIDF). The subfield format is specified by the Format byte within the component fields introducers ("F" of the LLIDF). There are two subfield introducers defined: the "LT" format, used by the COMMAND component, and the "LLTT" format, used by the SMDU BODY component.

Figure 33:
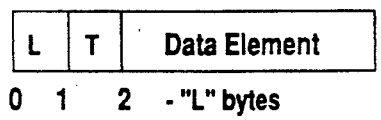
FIG. 33 is a diagram of a SMDU element subfield introducer according to the present invention.

The "LT" element subfield structure is defined in FIG. 33. Referring to FIG. 33:

| | |
|---|---|
| L = | The length of the data element subfield inclusive of the LT bytes. This is a single byte value; 255 is the maximum length of a subfield. |
| T = | Uniquely defines the type of data element transported within the subfield. |

Figure 34:
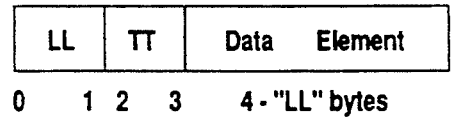
FIG. 34 is a diagram of another SMDU element subfield introducer according to the present invention.

The "LLTT" Subfield Structure is defined in FIG. 34. Referring to FIG. 34:

| | |
|---|---|
| LL = | The length of the data element subfield inclusive of the LLTT bytes. |
| TT = | Uniquely defines the type of data element transported within the subfield. |

13.2.1.4. SMDU Component Fields and Subfields

Figure 35:
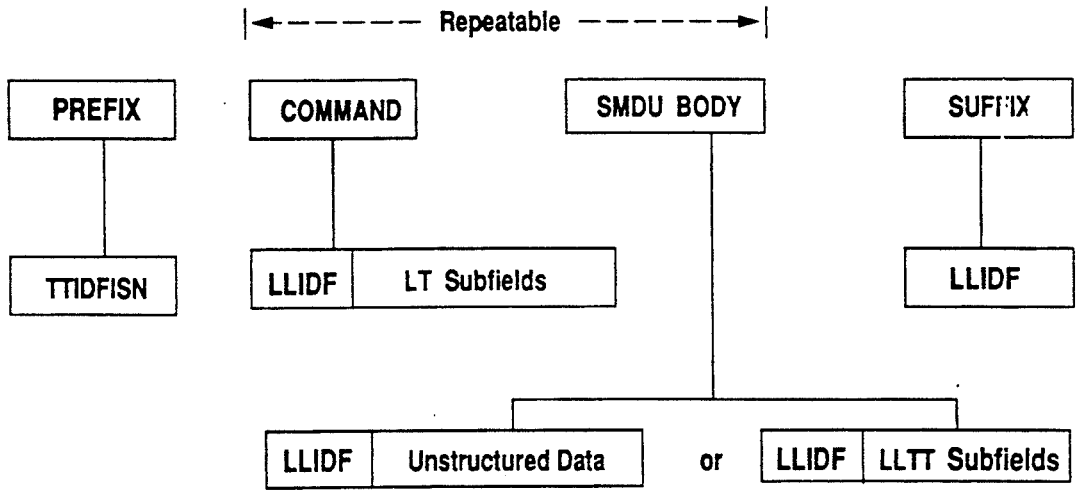
FIG. 35 is a diagram of SMDU fields and subfields according to the present invention.

The SMDU component fields and subfields are illustrated in FIG. 35.

13.2.2. SMDU Implementation Parameters

This section defines the format and content of the implementation parameters used in the SMDU. The parameters are represented in a series of tables which define each type of SMDU data.

13.2.2.1. SMDU Component Field Definitions

Table 13.12 defines the Identifier (I), Detail Type (D) and Format Byte (F) used for the SMDU Component Field introducer bytes.

TABLE 13.12

SMDU COMPONENT FIELD INTRODUCER

| COMPONENT | IDENTIFIER I | TYPE D | FORMAT F | NOTES |
|---|---|---|---|---|
| PREFIX | F0 | 20 | 80 | 1 |
| COMMAND | F1 | 00 | 00 | 2 |
| DATA | | | | |
| COVIA | C3 | 10 | 00 | |
| OSI | D6 | 20 | 50 | 3 |
| SNA | E2 | 30 | 00 | |
| SUFFIX | F3 | 00 | 00 | |

Notes for Table 13.12.
1. The PREFIX TYPE (20) indicates the version and release level of the SMDU. The FORMAT (80) contains segmentation information (TTIDFISN format) and specifies there is no additional information allowed in the PREFIX component.
2. No COMMAND component format types have yet been defined.
3. The DATA format contains OSI self defining elements only (TLV or TTLLVV introducers.)

14. SNA LU6.2 Interfaces

This Section presents a specific embodiment of a Protocol Stack Applications Program Interface (PSAPI), described in general in Section 7. This embodiment is an SNA LU6.2 interface which is used to connect the Communications Manager with the LU6.2 Network Protocol Stack. It should be understood that other PSAPIs can be created by one of skill in this art to connect the Communications Manager of the present invention to other Network Protocol Stacks, including, for example, NetBIOS, MPIF, HLH, TCP/IP, X.25, OSI, and the like.

14.1. Function Management Header (FMH)

The presence of an FMH is indicated by the Format Indicator (FI) in the RH. The FMH5 (Attach) used by the Communications Manager must be in the first RU in a chain, unless preceded by an FMH12 (security).

FMH5 carries a request for a conversation to be established between two transaction programs, and is known as the Attach header. FMH5 identifies the transaction program that is to be dispatched and connected to the receiving half-session.

When a transaction program (i.e., the Communications Manager) issues an ALLOCATE naming a transaction program (i.e., a Partner Communications Manager) to be run at the other end of the conversation, an Attach FMH5 carries the transaction program name (TPN) to the receiving LU.

Table 14.1 describes the format of the FMH5 used by the Communications Manager.

For further information see IBM Manual GA27-3136-6 "Systems Network Architecture, Reference Summary", May 1985 (with TNL GN27-3351-0, dated Feb. 4, 1986), IBM Manual GA27-3136-8 "Systems Network Architecture, Formats", June 1987, and IBM Manual SC30-3269-3, "Format and Protocol Reference Manual: Architecture Logic for LU TYPE 6.2", December 1985, the disclosures or each of which are incorporated herein by reference.

TABLE 14.1

FMH5 FORMAT

| BYTE | BITS | VALUE | MEANING |
|---|---|---|---|
| 0 | ... | ... | Length of the FMH |
| 1 | 0 | b"0" | Reserved |
| | 1-7 | b"0000101" | Type 5 |
| 2-3 | ... | x"02FF" | Command code: Attach |
| 4 | 0 | b"0" | User ID has not been verified by sending LU |
| | 1-3 | b"000" | Reserved |
| | 4 | b"0" | PIP not present in CM USAGE |
| | 5-7 | b"000" | Reserved |
| 5 | ... | x"03" | Length of fixed length parameters (note 2) |
| 6-8 | | FIXED LENGTH PARAMETERS | |
| 6 | ... | x"D0" | Resource Type: Basic Conversation |
| 7 | ... | x"00" | Reserved |
| 8 | 0-1 | b"00" | Synchronization Level: None |
| | 2-7 | b"000000" | Reserved |
| 9–P | | VARIABLE LENGTH PARAMETERS | |
| 9 | ... | x"04" | Length of TPN |
| 10-13 | ... | c"ITCM" | TPN. Destination Partner Input Monitor (Input Transaction Communications Manager - ITCM) |
| 14 | ... | ... | Length of security access code subfields (zero if none) (note 1) |
| 15–k | ... | ... | Security access code subfields (note 3) if byte 14 .ne. 0) |
| k+1 | ... | ... | Length of Logical-unit-of-work identifier (zero if none) |
| (k+2)–n | | LOGICAL-UNIT-OF-WORK IDENTIFIER (if byte k+1 .ne. 0) | |
| k+2 | ... | ... | Length of fully-qualified LU network name |
| (k+3)–m | ... | ALPHA/ NUMERIC | Fully-qualified network name using INET naming conventions (1-17 bytes) (netid.luname) |
| m+1-m+6 | ... | ... | Unit-of-work instance number (6 bytes) |
| m+7–n | ... | ... | Unit-of-work sequence number (2 bytes) |
| n+1 | ... | ... | Length of conversation correlator of sender |
| n+2–p | ... | ... | Conversation correlator (1-8 bytes) |

Notes for Table 14.1
1. Trailing Length fields (bytes 14, k+1, and n+1) that have value x"00" can be omitted.
2. This length could change with future expansion of the FMH 5.
3. See the "SNA Reference Summary" or "Format and Protocol Reference Manual: Architecture Logic for LU TYPE 6.2" for the format of the Access security Information subfields, if they are used.

14.2. LU 6.2 Transport Services Interface

14.2.1. Introduction

There are two logical parts in the process for fully establishing connections between two adjacent Communications Manager through the services of LU 6.2. The first part is the establishment of the appropriate LU 6.2 session pair (SEND and RECEIVE), and their respective conversations. This is described below. The second part is the CM Systems Management Application Program (SMAP) process for CM Sign-On, Sign-On Reply, and Sign-Off; this is described in Section 11.

In order for a Communications Manager to establish communications with a partner Communications Manager it is necessary for the Communications Manager to have both a SEND and a RECEIVE LU 6.2 session and their respective conversations. Each of these Conversations is unidirectional and is mapped to a separate LU 6.2 Session. The Communications Manager uses a subset of the BASIC set of LU 6.2 Verbs. Although it is possible to run multiple Conversations across a single session resource, the Communications Manager usage of LU 6.2 dictates that only one Conversation will be mapped to any Particular Session. From an End User's perspective, there is only one logical pipe between Communications Managers. The Communications Manager manages the pair of Conversations on behalf of their associated End Users, and makes them appear as a logical whole to the End Users.

Figure 36:
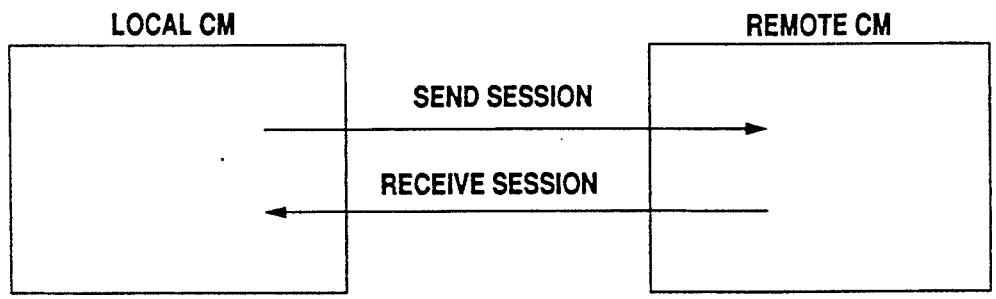
FIG. 36 illustrates the cooperation of local and remote communications managers.

In the following discussion the originating Communications Manager of a CM-CM pair is referred to as the local Communications Manager and is responsible for establishing the SEND Session/Conversation. The destination Communications Manager of a CM-CM pair is referred to as the remote Communications Manager and is responsible for establishment of the RECEIVE Session/Conversation. FIG. 36 depicts the above-mentioned Local and Remote CM relationship.

Should contention occur during the SIGN-ON process, (both initiate concurrent SIGN-ON's), the Communications Manager with the lowest CM# is the contention winner. The contention winner is responsible for the Local CM processing in the following discussion.

14.2.2. Send Session Establishment Allocate Processing

When the Communications Manager attempts to contact a partner Communications Manager for the first time, the initiating Communications Manager issues an ALLOCATE verb to the LU. When the LU receives an ALLOCATE and there is no current LU 6.2 Session established between the associated LU's, then the LU establishes a session and map a Conversation to that session. The LU returns control to the initiating Communications Manager with a Resource ID (RID) which is used by the Communications Manager to identify that specific Conversation in any further verbs issued to the LU by the Communications Manager. This RID is referred to as the output RID (ORID).

14.2.2.1. Function Management Header Usage (FMH)

As part of the session establishment procedure, the LU will append an FMH5 (see Section 14.1 for a description of FMH5 usage) to the first frame sent to the partner LU. The FMH5 (also known as an ATTACH HEADER) contains such information as the TPN Name (i.e. the Input Monitor TPN of the remote Communications Manager), the Conversation type (i.e. Basic vs. Mapped), the Synchronization level, etc. The remote LU uses this information in order to activate the Input Communications Manager monitor.

14.2.2.2. TPF As Remote Communications Manager

When the remote system is a Transaction Processing Facility (TPF) based system, the Local CM will establish the SNA session for the receive portion of the LU 6.2 pair before issuing the ALLOCATE for the SEND side. This is required because all TPF systems are back-level SNA nodes, and are not able to fully participate in all the features of SNA. In particular, TPF can only support fixed pathing between LU pairs, and cannot support any alternate pathing in times of changing network configurations when TPF initiates the SNA session.

14.2.3. Send Session Establishment-Attach Processing

When the remote LU receives a Begin Bracket indicating the start of a Conversation, it looks for an FMH5 in order to determine which TPN in its environment should be activated. Once this determination is made, control then passes to the appropriate TPN (in this case the input PSAPI side of the remote Communications Manager) along with a RID identifying the specific resource (i.e. Session/Conversation) which is being attached. This Resource ID (RID) is referred to as the Input RID (IRID). The remote Communications Manager then issues a RECEIVE-AND-WAIT on that specific IRID. The output side of the PSAPI in the remote CM will then issue an ALLOCATE in the manner defined above.

14.2.4. Receive Session Establishment-Allocate Processing

Receive Session Establishment occurs when the output Monitor of the Remote Communications Manager receives an Attach-Header (FMH5). If the Remote Communications Manager already has a SNA session and a LU 6.2 conversation established with the partner Communications Manager, the remote CM notifies its Systems Management Application (SMAP) that both sides of the LU 6.2 pair are available. If the SMAP determines that there is a contention in the Sign-on process, it resolves the contention by comparing the Comm Manager numbers. If the Remote Communications Manager has a lower CM# than the Local Communications Manager, the SMAP discards the SIGN-ON (REPLY). If there is neither an SNA session nor a LU 6.2 conversation active for this pair, the input PSAPI of the Remote CM issues an ALLOCATE which will establish both the SNA session and the LU 6.2 conversation as described above.

If the Remote Communications Manager is a TPF-based system, it too will issue an ALLOCATE, but this will only establish the LU 6.2 conversation (because its partner has already started the SNA session—see above).

For both a Local CM and a Remote CM, once both SNA sessions and both LU 6.2 conversations have been established by the PSAPI, the PSAPI will indicate to the SMAP that the Adjacent Comm Manager is now ENABLED. This triggers the SMAP to initiate the Sign-On process.

14.2.5. Data Exchange

The following section describes the exchange of data Distributions between Communications Manager's on behalf of their respective END USER'S. There are four main categories of DATA EXCHANGE which are as shown in Table 14.2.

TABLE 14.2

| DATA EXCHANGE CATEGORIES | | | |
|---|---|---|---|
| CATEGORY | TYPE | ASSURANCE | DELIVERY-NOTIFICATION |
| 1 | ASYNCHRONOUS/ QUERY/REPLY RELAY | LIMITED | NONE |
| 2 | ASYNCHRONOUS | LIMITED | EXCEPTION |
| 3 | ASYNCHRONOUS | LIMITED | CONFIRM ON DELIVERY |
| 4 | ASYNCHRONOUS | FULL | NONE EXCEPTION CONFIRM ON DELIVERY |

14.2.5.1. Data Exchange Category 1

Asynchronous, Query/Reply or Relay distributions with Limited assurance and delivery notification of None.

Figure 37:
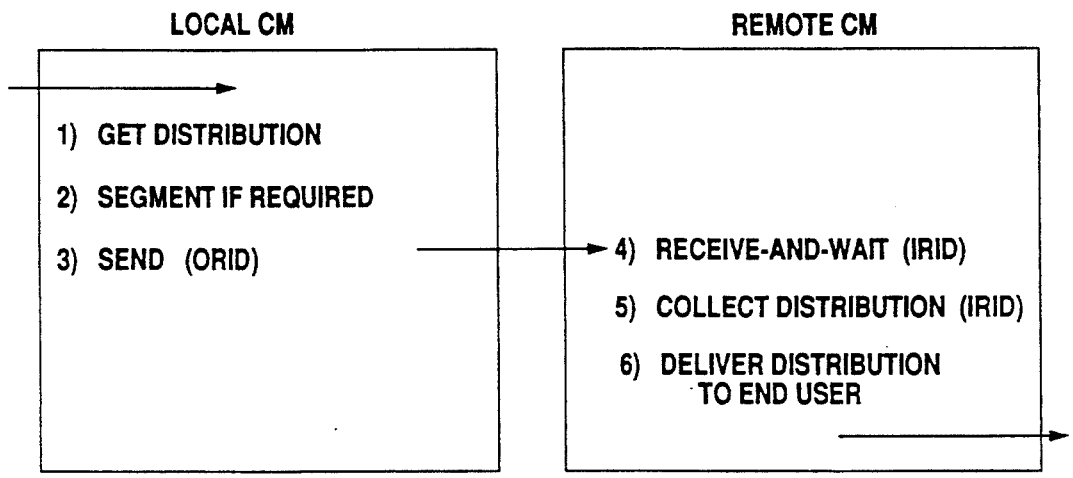
FIG. 37 illustrates category 1 data exchange.

FIG. 37 depicts the generalized data flow in a Category 1 DATA EXCHANGE. The following discussion refers to the items in the FIG. 37.

GET DISTRIBUTION: The Local CM/Transport layer, after checking the various Communications Manager queues and priorities within those queues, determines which Distribution is the next sequential Distribution to be sent.

SEGMENT IF REQUIRED: When the next Distribution to be sent is identified, the Local Communications Manager must determine if the size of the Distribution exceeds the maximum CMIU size which the Remote (Communications Manager may receive. If so the Local CM/Transport layer segments the Distribution and indicates the segment numbers to the Remote Communications Manager within the structured introducer of the CMIU PREFIX (see Section 13 for header formats.)

SEND (ORID): The Local CM/Network layer now SENDs the Distribution to the Remote Communications Manager on the Local CM's output resource (ORID). The Local Communications Manager also deletes the Distribution from queue. In the event that this is a QUERY/REPLY Distribution, then the Local Communications Manager saves the QUERY Environment in order to correlate the forthcoming REPLY from the destination End User with the originating QUERY.

RECEIVE-AND-WAIT (IRID): The Remote Communications Manager has set up to receive on the Remote Communications Manager input resource (IRID).

COLLECT DISTRIBUTION (IRID): The Remote CM/Transport layer receives the Distribution segments (if more than one) on the input resource and reconstructs the entire Distribution before proceeding.

DELIVER DISTRIBUTION: The Remote CM/Session layer attempts to deliver the Distribution to the destination End User. If the Remote Communications Manager cannot deliver the Distribution to the destination End User at this point, then the Distribution will be disposed of according to the local system conventions at the Remote CM's location.

14.2.5.2. Data Exchange Category 2

Data Exchange Category 2 includes Asynchronous distributions with Limited assurance and Exception delivery notification.

Figure 38:
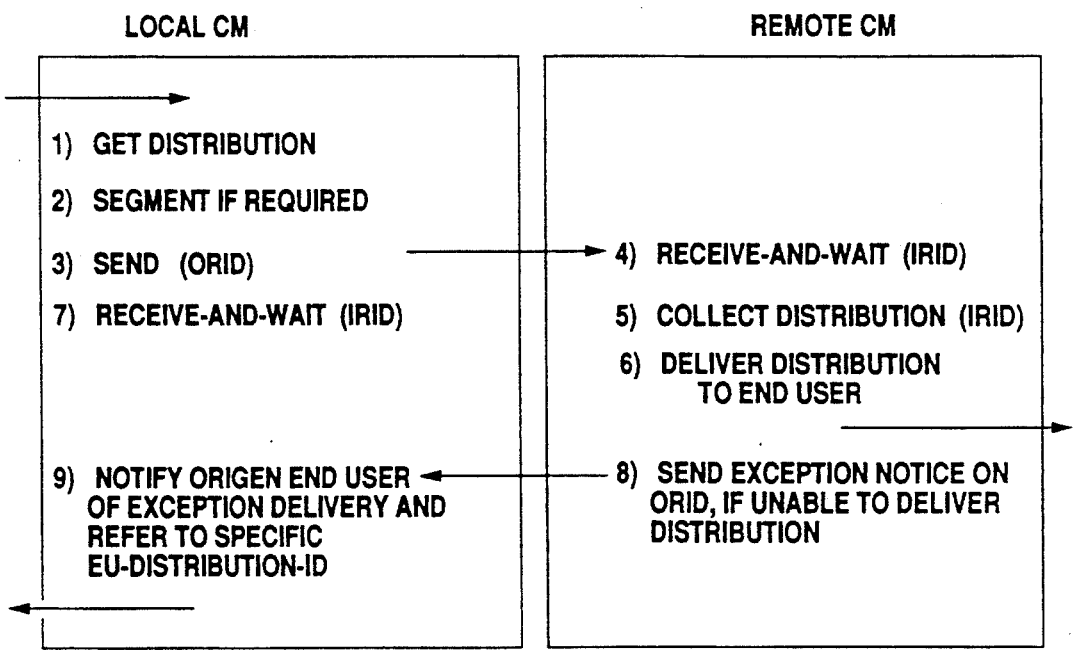
FIG. 38 illustrates category 2 data exchange.

FIG. 38 depicts the generalized data flow in a Category 2 DATA EXCHANGE. The following discussion refers to the items in FIG. 38:

GET DISTRIBUTION: The Local CM/Transport layer, after checking the various Communications Manager queues and priorities within those queues, determines which Distribution is the next sequential Distribution to be sent.

SEGMENT IF REQUIRED: When the next Distribution to be sent is identified, the Local Communications Manager must determine if the size of the Distribution exceeds the maximum CMIU size which the Remote Communications Manager may receive. If so, the Local CM/Transport layer segments the Distribution into appropriately sized CMIUs and indicate the segment numbers to the Remote Communications Manager via the structured introducer of the CMIU Prefix (see Section 13 for header format).

SEND (ORID): The Local CM/Network layer now SENDs the Distribution to the Remote Communications Manager on the Local CM's output resource (ORID). The Local Communications Manager also deletes the Distribution from queue.

RECEIVE-AND-WAIT (IRID) (REMOTE CM) The Remote Communications Manager has set up to receive on the Remote Communications Manager input resource (IRID).

COLLECT DISTRIBUTION (IRID): The Remote CM/Transport layer receives the various segments (if there are more than one) on the input resource and will reconstruct the entire Distribution before proceeding.

DELIVER DISTRIBUTION: The Remote CM/Session layer attempts to deliver the Distribution to the destination End User. If the Remote CM/Session layer cannot deliver the Distribution to the destination End User at this point, then the Distribution is disposed of according to the local system conventions at the Remote Communications Manager.

RECEIVE-AND-WAIT (IRID) (LOCAL CM): The Local Communications Manager has set up to receive on the Local Communications Manager input resource (IRID).

SEND EXCEPTION NOTICE: If, for any reason, the Remote CM/Session layer cannot deliver the Distribution to the Destination End User, then the Remote Communications Manager must SEND an EXCEPTION DELIVERY NOTIFICATION to the Local Communications Manager indicating that the Remote CM/Session layer was unable to deliver the Distribution and has therefore disposed of the Distribution according to the local system conventions at the Remote Communications Manager. The Distribution is referred to by its CM-DISTRIBUTION-ID.

NOTIFY ORIGIN END USER OF EXCEPTION DELIVERY: When the Local CM/Session layer receives the EXCEPTION DELIVERY NOTIFICATION from the Remote Communications Manager then the Local CM/Session layer delivers this notice to the Originating End User. The Distribution referred is to by its EU-DISTRIBUTION-ID.

14.2.5.3. Data Exchange Category 3

Data Exchange Category 3 includes Asynchronous distributions with Limited assurance and Confirm on Delivery notification.

Figure 39:
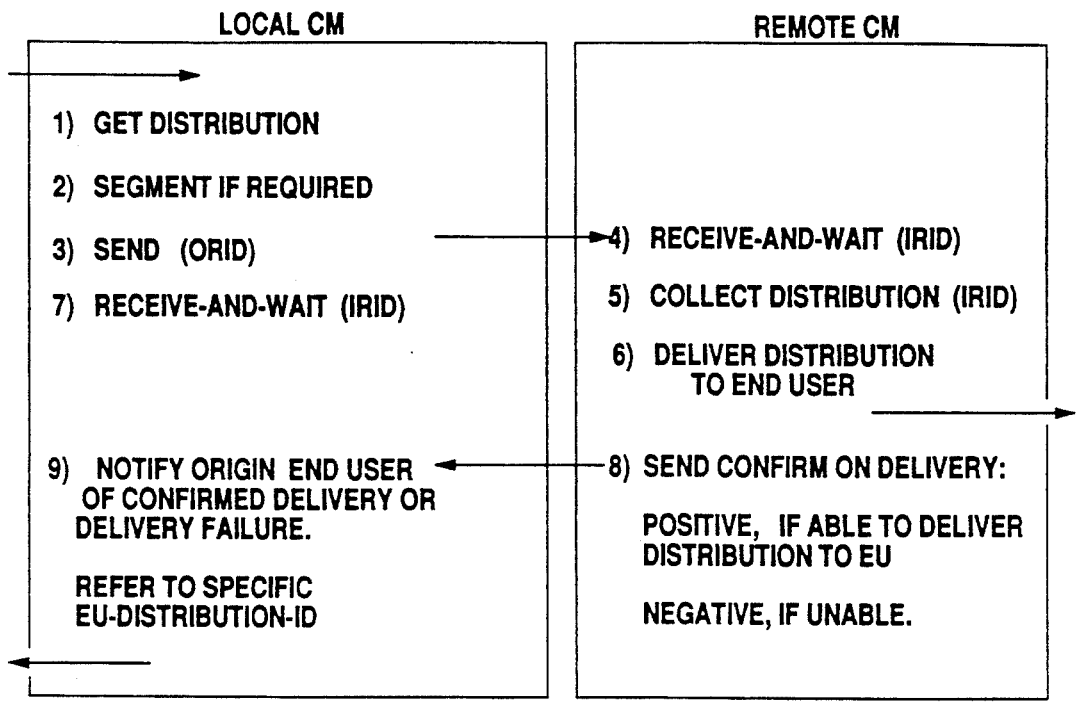
FIG. 39 illustrates category 3 data exchange.

FIG. 39 depicts the generalized data flow in a Category 3 DATA EXCHANGE. The following discussion refers to the items in FIG. 39.

GET DISTRIBUTION: The Local CM/Transport layer, after checking the various Communications Manager queues and priorities within those queues, determines which Distribution is the next sequential Distribution to be sent.

SEGMENT IF REQUIRED: When the next Distribution to be sent is identified, the Local CM/Transport layer must determine if the size of the Distribution exceeds the maximum CMIU size which the Remote Communications Manager may receive. If so the Local CM/Transport layer segments the Distribution into appropriately sized CMIUs and indicate the segment numbers to the Remote Communications Manager via the use of the structured introducer of the CMIU PREFIX (see Section 13—Communications Manager Interchange Unit Format).

SEND (ORID): The Local CM/Network layer now SENDs the Distribution to the Remote Communications Manager on the Local CM's output resource (ORID). The Local Communications Manager also deletes the Distribution from queue.

RECEIVE-AND-WAIT (IRID) (REMOTE CM): The Remote Communications Manager has set up to receive on the Remote Communications Manager input resource (IRID).

COLLECT DISTRIBUTION (IRID): The Remote CM/Transport layer receives the various segments (if there are more than one) on the input resource and will reconstruct the entire Distribution before proceeding.

DELIVER DISTRIBUTION: The Remote CM/Session layer attempts to deliver the Distribution to the destination End User. If the Remote CM/Session layer cannot deliver the Distribution to the destination End User at this point, then the Distribution is disposed of according to the local system conventions at the Remote Communications Manager.

RECEIVE-AND-WAIT (IRID) (LOCAL CM) The Local Communications Manager has set up to receive on the Local Communications Manager input resource (IRID).

SEND CONFIRM ON DELIVERY: If the Remote CM/Session layer is able to deliver the Distribution to the Destination End User, then the Remote CM/Session layer must SEND a positive CONFIRM ON DELIVERY NOTICE to the Local CM/Session layer indicating that the Distribution was successfully delivered. If, for any reason, the Remote CM/Session layer cannot deliver the Distribution to the Destination End User, then the Remote CM/Session layer must SEND a negative CONFIRM ON DELIVERY NOTICE to the Local CM/Session layer indicating that the Remote CM/Session layer was unable to deliver the Distribution and has discarded it. The Distribution is referred to by its CM-DISTRIBUTION-ID.

NOTIFY ORIGIN END USER OF POSITIVE OR NEGATIVE DELIVERY CONFIRMATION: When the Local CM/Session layer receives the positive or negative CONFIRM ON DELIVERY NOTICE from the Remote CM/Session layer then the Local CM/Session layer notifies the Originating End User. The Distribution is referred to by its EU-DISTRIBUTION-ID.

14.2.5.4. Data Exchange Category 4

Data Exchange Category 4 includes Asynchronous distributions with Full Assurance and Confirm on Delivery notification or Exception delivery notification or None.

Figure 40:
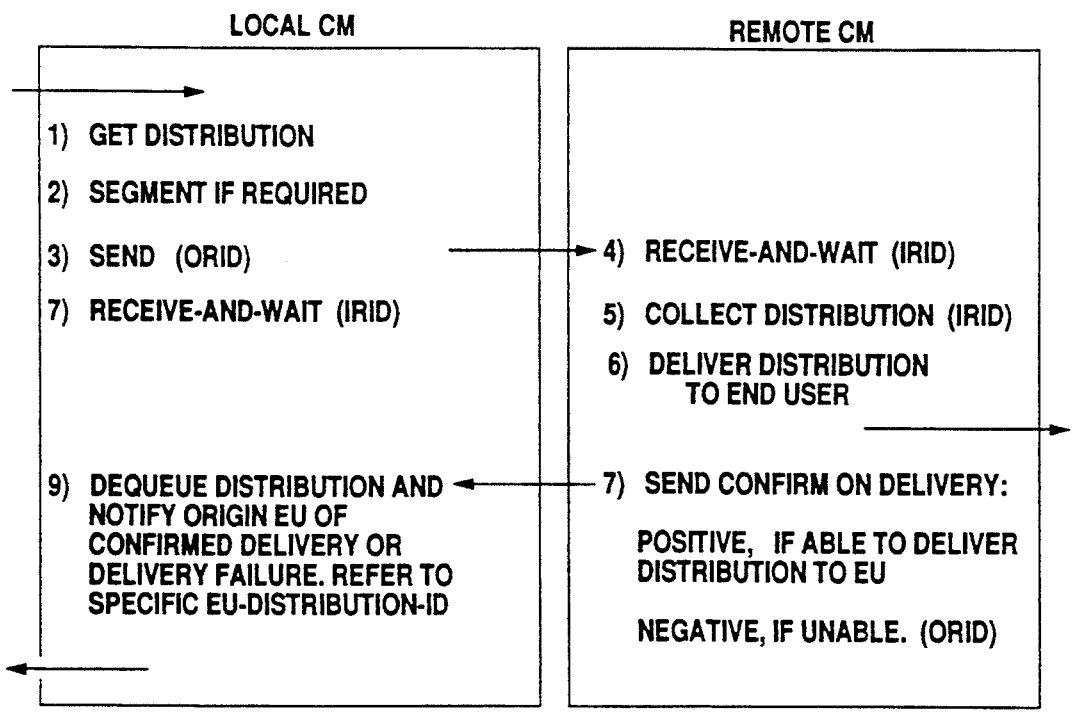
FIG. 40 illustrates category 4 data exchange.

FIG. 40 depicts the generalized data flow in a Category 4 DATA EXCHANGE. The following discussion refers to the items in FIG. 40.

GET DISTRIBUTION: The Local CM/Transport layer, after checking the various Communications Manager queues and priorities within those queues, will determine which Distribution is the next sequential Distribution to be sent.

SEGMENT IF REQUIRED: When the next Distribution to be sent is identified, the Local CM/Transport layer must determine if the size of the Distribution exceeds the maximum CMIU size which the Remote Communications Manager may receive. If so, the Local CM/Transport layer segments the Distribution into appropriately sized CMIUs and indicate the segment numbers to the Remote Communications Manager via the use of the structured introducer of the CMIU PREFIX (see Section 14.1 for header formats).

SEND (ORID): The Local CM/Network layer now SENDs the Distribution to the Remote Communications Manager on the Local CM's output resource (ORID).

RECEIVE-AND-WAIT (IRID) (REMOTE CM): The Remote Communications Manager has set up to receive on the Remote Communications Manager input resource (IRID).

COLLECT DISTRIBUTION (IRID): The Remote CM/Transport layer receives the various segments (if there are more than one) on the input resource and reconstructs the entire Distribution before proceeding.

DELIVER DISTRIBUTION: The Remote CM/Session layer attempts to deliver the Distribution to the destination End User. If the Remote CM/Session layer cannot deliver the Distribution to the End User, the Remote CM/Session layer discards the Distribution and notify the Local CM/Session layer.

SEND DELIVERY CONFIRMATION (ORID) The Remote CM/Session layer SENDs an ACKNOWLEDGE to the Local CM/Session layer on the Remote output resource (ORID). This ACKNOWLEDGE is considered an "INTERNAL CONFIRM" as well as a positive or negative CONFIRM ON DELIVERY NOTICE. The "INTERNAL CONFIRM" serves to notify the Local CM/Session layer that the Remote CM/Session layer has successfully received the indicated Distribution. The CONFIRM ON DELIVERY NOTICE is delivered to the Local CM/Session layer as an indication of the delivery status of the Distribution identified in the CM-DISTRIBUTION-ID.

RECEIVE-AND-WAIT (IRID) (LOCAL CM): The Local Communications Manager has set up to receive on the Local Communications Manager input resource (IRID).

DEQUEUE DISTRIBUTION: The ACKNOWLEDGE with "INTERNAL CONFIRM". when received at the Local CM/Session layer indicates that the Distribution has been successfully received in its entirety at the Remote Communications Manager. If delivery confirmation of none is specified, then the Local CM/Session layer checks to see if the Distribution was delivered to the destination End User. If this is the case then the Local CM/Session layer deletes this Distribution from queue. If the Remote CM/Session layer is unable to deliver the Distribution then the Local CM/Session layer disposes of the Distribution using local system conventions.

If EXCEPTION DELIVERY notification is specified and the Remote CM/Session layer indicates successful delivery to the destination End User, then the Local CM/Session layer deletes this Distribution from queue. If the Remote CM/Session layer was unable to deliver the Distribution, then the Local CM/Session layer notifies the originating End User of the delivery failure and also returns the associated EU-DISTRIBUTION-ID to the originating End User.

If CONFIRM ON DELIVERY notification is specified and the Remote CM/Session layer indicates successful delivery to the destination End User, then the Local CM/Session layer deletes this Distribution from queue and notify the originating End User that the Distribution indicated by the EU-DISTRIBUTION-ID was successfully delivered. If the Remote CM/Session layer was unable to deliver the Distribution then the Local CM/Session layer notifies the originating End User of the delivery failure and will also return the associated EU-DISTRIBUTION-ID to the originating End User.

14.3. LU 6.2 Verbs

The Communications Manager implementations under the present invention can make use of the LU 6.2 verbs defined in Table 14.3. The verbs used are part of the BASIC (vs. MAPPED) subset of verbs. The subset does, however, include verbs not in the base (mandatory) set as defined for all IBM developed products implementing LU 6.2 support. Implementations using products not supporting the recommended verb subset will require alternative solutions.

This section contains a general description of the selected verbs and parameters. The detail description of the verbs can be found in "Chapter 3 Transaction Program Verbs" in the IBM Transaction Programmer's Reference Manual for LU 6.2 GC30-3084-1, incorporated herein by reference.

Table 14.3 contains a summary of the Communications Manager use of LU 6.2 verbs. Table 14.4 is a summary of the LU 6.2 verbs and parameters as defined for Communications Manager implementations.

TABLE 14.3

| CM USE OF LU 6.2 VERBS | | | |
|---|---|---|---|
| BASIC LU 6.2 VERBS | BASE SET | CM USE | COMMENTS |
| ALLOCATE | YES | YES | |
| BACKOUT | NO | NO | |
| CONFIRM | YES | NO | |
| CONFIRMED | YES | NO | |
| DEALLOCATE | YES | YES | |
| FLUSH | NO | YES | Check availability |
| GET_ATTRIBUTES | YES | YES | |
| GET_TYPE | NO | NO | |
| POST_ON_RECEIPT | NO | YES | Check availability |
| PREPARE_TO_RECEIVE | NO | NO | |
| RECEIVE_AND_WAIT | YES | YES | |
| REQUEST_TO_SEND | YES | NO | |
| SEND_DATA | YES | YES | |
| SEND_ERROR | YES | NO | |
| SYNCPT | NO | NO | |
| WAIT | NO | YES | Check availability |

TABLE 14.4

| CM USE OF LU 6.2 VERBS AND PARAMETERS | | | |
|---|---|---|---|
| LU 6.2 VERBS & PARAMETERS | BASE SET | CM USE | COMMENTS |
| ALLOCATE | YES | YES | |
|   LU_NAME (OWN) | NO | NO | |
|   LU_NAME (OTHER(variable)) | YES | YES | |
|   MODE_NAME ('SNASVCMG') | NO | NO | |
|   MODE_NAME (variable) | YES | YES | |
|   TPN | YES | YES | |
|   TYPE (BASIC_CONVERSATION) | YES | YES | |
|   TYPE (MAPPED_CONVERSATION) | NO | NO | |
|   RETURN_CONTROL (WHEN_SESSION_ALLOCATED) | YES | YES | |
|   RETURN_CONTROL (DELAYED ALLOCATION PERMITTED) | NO | YES | Note 1 |
|   RETURN_CONTROL (IMMEDIATE) | NO | NO | |
|   SYNC_LEVEL (NONE) | YES | YES | |
|   SYNC_LEVEL (CONFIRM) | YES | NO | Note 2 |
|   SYNC_LEVEL (SYNCPT) | NO | NO | |
|   SECURITY (SAME) | NO | NO | |
|   SECURITY (PGM(USER_ID(vbl) PASSWORD(vbl))) | NO | NO | |
|   PIP (NO) | YES | YES | |
|   PIP (YES(variable)) | NO | NO | |
|   RESOURCE | YES | YES | |
|   RETURN CODE | YES | YES | |
| BACKOUT | NO | NO | |
| CONFIRM | YES | NO | Note 2 |
| CONFIRMED | YES | NO | Note 2 |
| DEALLOCATE | YES | YES | |
|   RESOURCE | YES | YES | |
|   TYPE (SYNC_LEVEL) | YES | YES | Note 3 |
|     (FLUSH) | YES | YES | |
|     (ABEND_PROG) | YES | YES | |
|     (ABEND_SVC) | NO | NO | |
|     (ABEND_TIMER) | NO | NO | |
|     (LOCAL) | YES | YES | |
|   LOG_DATA | | | |
|   RETURN_CODE | | | |
| FLUSH | NO | YES | Note 1 |
|   RESOURCE | NO | YES | Note 1 |
| GET_ATTRIBUTES | YES | YES | |
|   RESOURCE | YES | YES | |
|   OWN_FULLY_QUALIFIED_LU_NAME | YES | NO | Note 2 |
|   PARTNER_LU_NAME | YES | YES | |
|   PARTNER_FULLY_QUALIFIED_LU_NAME | YES | NO | Note 2 |
|   MODE_NAME | YES | YES | |
|   SYNC LEVEL | YES | YES | |
| GET TYPE | NO | NO | |

TABLE 14.4-continued
CM USE OF LU 6.2 VERBS AND PARAMETERS

| LU 6.2 VERBS & PARAMETERS | BASE SET | CM USE | COMMENTS |
|---|---|---|---|
| POST_ON_RECEIPT | NO | YES | Note 1 |
| RESOURCE | NO | YES | Note 1 |
| FILL (BUFFER) | NO | NO | |
| (LL) | NO | YES | Note 1 |
| LENGTH | NO | YES | Note 1 |
| PREPARE_TO_RECEIVE | NO | NO | |
| RECEIVE_AND_WAIT | YES | YES | |
| RESOURCE | YES | YES | |
| FILL (BUFFER) | YES | NO | Note 2 |
| (LL) | YES | YES | |
| LENGTH | YES | YES | |
| RETURN_CODE | YES | YES | |
| REQUEST_TO_SEND_RECEIVED | YES | NO | Note 2 |
| DATA | YES | YES | |
| WHAT_RECEIVED | YES | YES | |
| REQUEST_TO_SEND | YES | NO | |
| SEND_DATA | YES | YES | |
| RESOURCE | YES | YES | |
| DATA | YES | YES | |
| LENGTH | YES | YES | |
| RETURN_CODE | YES | YES | |
| REQUEST_TO_SEND_RECEIVED | YES | NO | Note 2 |
| SEND_ERROR | YES | NO | Note 2 |
| SYNCPT | NO | NO | |
| WAIT | NO | YES | Note 1 |
| RESOURCE_LIST | NO | YES | Note 1 |
| RETURN_CODE | NO | YES | Note 1 |
| RESOURCE_POSTED | NO | YES | Note 1 |

Notes from Table 14.4 Summary of Communications Manager use of LU 6.2 Verbs and Parameters:
1. These verbs and/or parameters are NOT part of the base set of LU 6.2 verbs as defined by IBM in the Transaction Programmer's Reference Manual for LU Type 6.2. The Communications Manager implementation, however, has made use of these options. A description of the Communications Manager use is included with the verb definitions in this Section.
2. These verbs and/or parameters ARE part of the base set of LU 6.2 verbs but ARE NOT used in the Communications Manager implementations.
3. The only TYPE (SYNC_LEVEL) which can be implied with the DEALLOCATE verb is SYNC_LEVEL = NONE. Neither CONFIRM nor SYNCPT are supported by the Communications Manager implementations.

14.3.1. ALLOCATE

ALLOCATE (presented in more detail in Table 14.5) allocates a session between the local LU and a remote LU, and on that session allocates a BASIC Conversation between the local Communications Manager and a partner Communications Manager.

TYPE specifies the type of conversation to be allocated.

BASIC_CONVERSATION specifies to allocate a basic conversation. The Communications Manager Pair manages any necessary mapping via the use of headers structured in a manner similar to those defined in Docu-

TABLE 14.5
ALLOCATE VERB

| | Supplied Parameters |
|---|---|
| ALLOCATE | LU_NAME ( OTHER ( variable ) ) |
| | MODE_NAME ( variable ) |
| | TPN ( variable ) |
| | TYPE ( BASIC_CONVERSATION) |
| | RETURN_CONTROL ( WHEN_SESSION_ALLOCATED ) |
| | ( DELAYED_ALLOCATION_PERMITTED ) |
| | SYNC_LEVEL ( NONE ) |
| | PIP ( NO ) |
| | Returned Parameters |
| | RESOURCE ( variable ) |
| | RETURN_CODE ( variable ) |

14.3.1.1. Supplied Parameters

LU_NAME specifies the variable containing then name of the remote LU at which the partner Communications Manager (TPN) is located. OTHER specifies the partner Communications Manger is not located at the same LU as the local Communications Manager but is located at another LU.

MODE_NAME specifies the variable containing the mode name designating the network properties for the session to be allocated for the conversion.

TPN (Transaction Program Name) specifies the variable containing the name of the partner Communications Manager. A Communications Manager is always composed of a SEND and a RECEIVE TPN.

ment Interchange Architecture (DIA). See Section 13—Communications Manager Interchange Unit Format.

RETURN_CONTROL specifies when the local LU is to return control to the local Communications Manager. Choice is implementation dependent. Parameters include: WHEN_SESSION_ALLOCATED; and DELAYED_ALLOCATION_PERMITTED.

SYNC_LEVEL specifies the synchronization level that the Communications Managers can use on this conversation.

NONE specifies that Communications Managers does not utilize CONFIRM or SYNCPOINT processing.

PIP specifies program initialization parameters for the remote Communications Manager.

NO specifies the Communications Managers will not use initialization parameters.

14.3.1.2. Returned Parameters

RESOURCE specifies the variable in which the Output RESOURCE ID (ORID) is returned. The ORID is used in all other verbs issued by the Communications Manager to the LU in order to identify the specific Conversation/Session Resource associated with a given Partner LU NAME/TPN combination (i.e., Communications Manager).

RETURN_CODE specifies the variable in which a return code is returned. The return code indicates the results of parameter checking and in the case of Allocate based on what is specified in the RETURN_CONTROL parameter may indicate ALLOCATION_FAILURE or ALLOCATION_ERROR.

14.3.2. DEALLOCATE

DEALLOCATE (presented in more detail in Table 14.6) deallocates the specified conversation between the local Communications Manager and the partner Communications Manager.

TABLE 14.6

| DEALLOCATE VERB | |
|---|---|
| | Supplied Parameters |
| DEALLOCATE | RESOURCE ( variable ) |
| | TYPE ( SYNC_LEVEL ) |
| | ( FLUSH ) |
| | ( ABEND_PROG ) |
| | ( LOCAL ) |
| | LOG_DATA ( variable ) |
| | Returned Parameters |
| | RETURN_CODE ( variable ) |

14.3.2.1. Supplied Parameters

RESOURCE specifies the variable containing the output RESOURCE ID (ORID) of the conversation between the local Communications Manager and the partner Communications Manager to be deallocated TYPE specifies the type of deallocation to be performed. Choice is implementation dependent. Parameters include: SYNC_LEVEL; FLUSH; ABNED_PROG; and LOCAL.

LOG_DATA specifies the variable containing the error information to placed on the Local Communications Manager system error Log. This parameter is product dependent and specific to implementation.

14.3.2.2. Returned Parameters

RETURN CODE specifies the variable in which a return code is returned to the Communications Manager indicating the results of the deallocate. 14.3.3. FLUSH FLUSH (presented in more detail in Table 14.7) flushes the local LUs send buffer. Used when the Communications Manager has completed SENDing from all priority queues or immediately after the High Priority Level 0 queue between Communications Manager's has been drained.

TABLE 14.7

| FLUSH VERB | |
|---|---|
| | Supplied Parameters |
| FLUSH | RESOURCE ( variable ) |

14.3.3.1. Supplied Parameters

RESOURCE specifies the variable containing the output RESOURCE ID (ORID) of the conversation between the local Communications Manager and the partner Communications Manager.

14.3.4. POST_ON_RECEIPT

POST_ON_RECEIPT (presented in more detail in Table 14.8) requests that the LU notify the Communications Manager when data is received on the specified conversation from the Partner Communications Manager.

TABLE 14.8

| POST-ON-RECEIPT VERB | |
|---|---|
| | Supplied Parameters |
| POST_ON_RECEIPT | RESOURCE ( variable ) |
| | FILL ( LL ) |
| | LENGTH ( variable ) |

14.3.4.1. Supplied Parameters

RESOURCE specifies the variable containing the input RESOURCE ID (IRID) of the conversation between the local Communications Manager and the partner Communications Manager from which the data is expected FILL specifies when to notify the Communications Manager.

LL specifies that the LU will notify the Communications Manager of the receipt of data based on logical record length or LENGTH, which ever occurs first.

LENGTH specifies the variable containing the maximum length of a Distribution Interchange Unit that the receiving Communications Manager can accept as agreed upon between partner Communications Manager's during the CM-CM initialization sequence.

14.3.5. RECEIVE_AND_WAIT

RECEIVE_AND_WAIT (presented in more detail in Table 14.9) requests that the LU deliver received data from the Partner Communications Manager associated with the specified conversation.

TABLE 14.9

| RECEIVE_AND_WAIT VERB | |
|---|---|
| | Supplied Parameters |
| RECEIVE_AND_WAIT | RESOURCE ( variable ) |
| | FILL ( LL ) |
| | Supplied and Returned Parameters |
| | LENGTH ( variable ) |
| | Returned Parameters |
| | RETURN_CODE ( variable ) |
| | DATA ( variable ) |
| | WHAT_RECEIVED ( variable ) |

14.3.5.1. Supplied Parameters

RESOURCE specifies the variable containing the input RESOURCE ID (IRID) of the conversation between the local Communications Manager and the partner Communications Manager of which the data is desired.

FILL specifies when to notify the Communications Manager.

LL specifies that the LU notifies the Communications Manager of the receipt of data based on logical record length or LENGTH, which ever occurs first.

14.3.5.2. Supplied and Returned Parameters

LENGTH specifies the variable containing the maximum Distribution segment size as agreed upon between partner Communications Manager's during the CM-CM initialization sequence. When the Communications Manager is notified this variable is the actual amount of data received.

14.3.5.3. Returned Parameters

RETURN_CODE specifies the variable in which a return code is returned indicating the results of parameter checking.

DATA specifies the location in which the Distribution will be returned by the LU to the Communications Manager.

WHAT_RECEIVED specifies the variable in which an indicator of what was received is returned. This will always indicate DATA_COM-PLETE unless an exception has occurred.

14.3.6. SEND_DATA

SEND_DATA (presented in more detail in Table 14.10) sends data to the remote Communications Manager. The data consists of logical records formatted as Distribution Interchange Units.

TABLE 14.10

| SEND_DATA VERB | |
|---|---|
| | Supplied Parameters |
| SEND_DATA | RESOURCE ( variable ) |
| | DATA ( variable ) |
| | LENGTH ( variable ) |
| | Returned Parameters |
| | RETURN_CODE ( variable ) |

14.3.6.1. Supplied Parameters

RESOURCE specifies the variable containing the output RESOURCE ID (ORID) of the conversation between the local Communications Manager and the partner Communications Manager on which the data is to be sent.

DATA specifies the location containing the CMIU to be sent by the LU to the remote Communications Manager. The data includes a logical record. The logical record includes a two-byte length field followed by the data. The length of the data field can range from two to 32765 bytes. The length of the logical record includes the two-byte length field plus the length of the data (i.e. length of data plus two). The length of the data includes all of the CMIU header information plus the End User supplied Distribution Unit.

LENGTH specifies the variable containing the length of the data to be sent. It must not exceed the maximum CMIU Unit size as agreed upon between partner Communications Manager's during the CM-CM initialization sequence.

14.3.6.2. Returned Parameters

RETURN—CODE specifies the variable in which a return code is returned indicating the results of parameter checking.

14.3.7. WAIT

WAIT (presented in more detail in Table 14.11) is issued after the Communications Manager has issued POST_ON_RECEIPT in order to wait for Posting to occur on any Conversation from among a list of Conversations.

TABLE 14.11

| WAIT VERB | |
|---|---|
| | Supplied Parameters |
| WAIT | RESOURCE_LIST ( variable 1 variable 2 ... etc ) |
| | Returned Parameters |
| | RETURN_CODE ( variable ) |
| | RESOURCE_POSTED ( variable ) |

14.3.7.1. Supplied Parameters

RESOURCE_LIST specifies the variables containing the input RESOURCE_IDs (IRIDs) for all pending Communications Manager input conversations.

14.3.7.2. Returned Parameters

RETURN_CODE specifies the variable in which a return code is returned indicating the results of parameter checking.

RESOURCE_POSTED specifies the variable in which specific RESOURCE IDs (associated with a specific Partner Communications Manager) are returned which have data pending.

Although the present invention has been described with reference to a particular preferred embodiment, it will be understood by those skilled in the art that modifications, deletions or additions can be made to the disclosed preferred embodiment without departing from the spirit and scope of the present invention.

What is claimed:

1. A method of communicating between communications managers of a distributed heterogeneous network, each communications manager being connected to a respective plurality of privileged and non-privileged end users, comprising:

transferring information distribution units from an origin non-privileged end user to a corresponding communications manager, each information distribution unit including a first priority designation and indicia of a destination non-privileged end user;

transferring system management distribution units from a privileged end user to said corresponding communications manager, each system management distribution unit including a second priority designation greater than or equal to said first priority designation and indicia of a destination privileged end user;

for each of said information and system management distribution units, determining respective adjacent communications managers along at least one path between respective origin privileged or non-privileged end users and respective destination privileged or non-privileged end users;

configuring each of said information and system management distribution units according to a convention of network protocol stacks between said corresponding communications manager and said respective adjacent communications managers, at least two of said network protocol stacks capable of being different from one another; and transmitting said information and system management distribution units to said respective adjacent communications managers according to priority designations included in said information and system management distribution units.

2. The method of claim 1, wherein said transmitting step comprises transmitting said system management distribution units before said information distribution units.

3. The method of claim wherein said indicia of said destination privileged end user includes indicia of a destination communications manager connected to said destination privileged end user.

4. The method of claim 3, wherein said indicia of said destination privileged end user is in mnemonic form.

5. The method of claim 3, wherein said indicia of said destination privileged end user is in character form.

6. The method of claim 3, wherein said indicia of said destination privileged end user is in numeric form.

7. The method of claim 3, further comprising:

determining within each respective adjacent communications manager whether said indicia of said destination communications manager is indicative of said respective adjacent communications manager;
   if so, transferring said distribution unit to said destination end user connected to said adjacent communications manager; and
   if not,
   determining within said adjacent communications manager a next adjacent communications manager along a path between said origin end user and said destination end user,
   configuring each said distribution unit according to a convention of a network protocol stack between said adjacent communications manager and said next adjacent communications manager, and
   transmitting said distribution units to said next adjacent communications manager according to priority designations included in said distribution units.

8. The method of claim 1, wherein said indicia of said destination non-privileged end user includes indicia of a destination communications manager connected to said destination non-privileged end user.

9. The method of claim 8, further comprising:
determining within each respective adjacent communications manager whether said indicia of said destination communications manager is indicative of said respective adjacent communications manager;
   if so, transferring said distribution unit to said destination end user connected to said adjacent communications manager; and
   if not,
   determining within said adjacent communications manager a next adjacent communications manager along a path between said origin end user and said destination end user,
   configuring each said distribution unit according to a convention of a network protocol stack between said adjacent communications manager and said next adjacent communications manager, and
   transmitting said distribution units to said next adjacent communications manager.

10. The method of claim 1, further comprising:
determining, within each said respective adjacent communications manager, whether said destination end user is connected to said adjacent communications manager;
   if so, transferring said distribution unit to said destination end user connected to said adjacent communications manager; and
   if not, determining within said adjacent communications manager a next adjacent communications manager along a path between said origin end user and said destination end user, configuring each said distribution unit according to conventions of a network protocol stack between said adjacent communications manager and said next adjacent communications manager, and transmitting said distribution unit to said next adjacent communications manager.

11. The method of claim 1, further comprising:
storing management information related to each communications manager in a respective management information base;
   modifying said management information base with information contained in a relevant system management distribution unit; and
   preventing modification of said management information base by information contained within said information distribution units.

12. A method of communicating between communications managers of a distributed heterogeneous network, each communications manager being connected to a respective plurality of privileged and non-privileged end users, comprising;
transferring information distribution units from an origin non-privileged end user to a corresponding communications manager, each said information distribution unit including a first priority designation and indicia of a destination non-privileged end user;
transferring system management distribution units from a privileged end user to said corresponding communications manager, each said system management distribution unit including a second priority designation greater than or equal to said first priority designation and indicia of a destination privileged end user;
segmenting each said information and system management distribution unit into information packets, each information packet including said indicia of a respective destination privileged or non-privileged end user and including said priority designation;
for each of said information packets, determining respective adjacent communications managers along at least one path between respective origin privileged or non-privileged end users and respective destination privileged or non-privileged end users;
configuring each of said information packets according to conventions of network protocol stacks between said corresponding communications manager and each said respective adjacent communications managers, at least two of said network protocol stacks capable of being different from one another; and
transmitting said information packets to said respective adjacent communications managers according to said priority designations included in said information packets.

13. The method of claim 12, said segmenting step comprising:
dividing each said distribution unit into segments of a length determined according to said conventions of said network protocol stack.

14. The method of claim 12, said segmenting step comprising:
providing an order indication in each information packet indicative of an order of said information packet within said distribution unit being segmented.

15. The method of claim 14, further comprising:
assembling, within destination communications managers connected to said destination end users, said information packets into said distribution units according to order indications included in each information packet.

16. A method of communicating between communications managers of a distributed heterogeneous network, each communications manager being connected to a respective plurality of privileged and non-privileged end users, comprising:
transferring information distribution units from an origin non-privileged end user to a corresponding origin communications manager, each said information distribution unit including a first priority designation and indicia of a destination communications manager to which a destination non-privileged end user is connected;

transferring system management distribution units from a privileged end user to said corresponding origin communications manager, each said system management distribution unit including a second priority designation greater than or equal to said first priority designation and indicia of a destination communications manager to which a destination privileged end user is connected;

for each of said information and system management distribution units, determining respective adjacent communications managers along at least one path between said origin communications manager and said destination communications managers;

configuring each of said information and system management distribution units according to conventions of network protocol stacks between said corresponding origin communications manager and each said respective adjacent communications managers, at least two of said network protocol stacks capable of being different from one another; and transmitting said information and system management distribution units to said respective adjacent communications managers according to said priority designations.

17. The method of claim 16, further comprising:

determining within each respective adjacent communications manager whether said indicia of said destination communications manager is indicative of said respective adjacent communications manager;

if so, transferring said distribution unit to said destination end user connected to said adjacent communications manager; and if not,
  determining within said adjacent communications manager a next adjacent communications manager along a path between said origin communications manager and said destination communications manager,
  configuring each said distribution unit according to conventions of a network protocol stack between said adjacent communications manager and said next adjacent communications manager, and
  transmitting said distribution units to said next adjacent communications manager.

18. An apparatus for use in a distributed heterogeneous communications network for communicating between communications managers of the network, each communications manager being connected to a respective plurality of privileged and non-privileged end users, comprising:

a first interface for transferring information distribution units from an origin non-privileged end user to an origin communications manager connected to said non-privileged end user, each information distribution unit including a first priority designation and indicia of a destination non-privileged end user;

a second interface for transferring system management distribution units from a privileged end user to said origin communications manager connected to said privileged end user, each system management distribution unit including a second priority designation greater than or equal to said first priority designation and indicia of a destination privileged end user;

means, within said origin communications manager, for determining, for each of said information and system management distribution units, respective adjacent communications managers along communications paths between respective origin privileged or non-privileged end users and respective destination privileged or non-privileged end users;

network protocol stack interface means for configuring each of said information and system management distribution units according to conventions of network protocol stacks between said origin communications manager and said respective adjacent communications managers, at least two of said network protocol stacks capable of being different from one another; and means for transmitting said information and system management distribution units from said origin communications manager to said respective adjacent communications managers in accordance with said conventions of said network protocol stacks and in accordance with priority designations included in said information and system management distribution units.

19. The apparatus of claim 18, wherein said indicia of said destination end user includes indicia of a destination communications manager connected to said destination end user.

20. The apparatus of claim 19, further comprising:

means, within each respective adjacent communications manager responsive to an indication that said destination communications manager is the same as said respective adjacent communications manger, for transferring said distribution unit to said destination end user connected to said adjacent communications manager; and means, within each respective adjacent communications manager and responsive to an indication that said destination communications manager is not the same as said respective adjacent communications manager, for determining respective next adjacent communications managers along communications paths between said origin end user and said destination end users, for configuring each said distribution unit according to conventions of network protocol stacks between said adjacent communications manager and said respective next adjacent communications manager, and for transmitting said distribution units from said adjacent communications manager to said respective next adjacent communications manager according to said conventions of said network protocol stacks and according to priority designations included in said distribution units.

* * * * *

UNITED STATES PATENT AND TRADEMARK OFFICE
CERTIFICATE OF CORRECTION

PATENT NO. : 5,317,568

DATED : May 31, 1994

INVENTOR(S) : Bixby et al.

It is certified that error appears in the above-identified patent and that said Letters Patent is hereby corrected as shown below:

In claim 3, column 100, line 58 change "claim wherein" to --claim 1, wherein--.

In claim 20, column 104, line 37 change "manger" to --manager--.

Signed and Sealed this

Thirtieth Day of August, 1994

Attest:

BRUCE LEHMAN

*Attesting Officer*    *Commissioner of Patents and Trademarks*